US008057308B2

(12) United States Patent
Kaminkow et al.

(10) Patent No.: US 8,057,308 B2
(45) **Date of Patent: *Nov. 15, 2011**

(54) GAMING SYSTEM HAVING MULTIPLE GAMING DEVICES THAT SHARE A MULTI-OUTCOME DISPLAY

(75) Inventors: Joseph E. Kaminkow, Reno, NV (US); Anthony J. Baerlocher, Reno, NV (US); Zeke Brill, Reno, NV (US); Hans Elias, Reno, NV (US); Paulina Rodgers, Reno, NV (US); Kehl T. LeSourd, Reno, NV (US); Eric L. Wagner, Sparks, NV (US); Christopher D. Carlisle, Reno, NV (US); Kirk A. Tedsen, Reno, NV (US); Michael MacVittie, Reno, NV (US)

(73) Assignee: IGT, Reno, NV (US)

( * ) Notice: Subject to any disclaimer, the term of this patent is extended or adjusted under 35 U.S.C. 154(b) by 377 days.

This patent is subject to a terminal disclaimer.

(21) Appl. No.: 11/830,085

(22) Filed: Jul. 30, 2007

(65) Prior Publication Data

US 2008/0070702 A1 Mar. 20, 2008

Related U.S. Application Data

(63) Continuation of application No. 11/683,884, filed on Mar. 8, 2007, now Pat. No. 7,666,092, which is a continuation of application No. 11/212,261, filed on Aug. 26, 2005, now Pat. No. 7,311,604.

(60) Provisional application No. 60/606,239, filed on Sep. 1, 2004.

(51) Int. Cl.
*A63F 13/00* (2006.01)

(52) U.S. Cl. ............................... 463/46; 463/20; 463/29

(58) Field of Classification Search .................... 463/29, 463/20, 46
See application file for complete search history.

(56) References Cited

U.S. PATENT DOCUMENTS

D109,522 S 5/1938 Perkins
(Continued)

FOREIGN PATENT DOCUMENTS

AU 199716432 9/1997
(Continued)

OTHER PUBLICATIONS

77's Above Advertisement published by Bell-Fruit Games prior to Sep. 30, 2004.

(Continued)

*Primary Examiner* — Dmitry Suhol
*Assistant Examiner* — Ankit Doshi
(74) *Attorney, Agent, or Firm* — K&L Gates LLP

(57) ABSTRACT

A gaming device system in which a plurality of gaming devices are linked by a common bonus event is provided. In one embodiment, the linked gaming device system includes a shared symbol generation display that is positioned adjacent to each of a plurality of associated gaming devices and has a plurality of sections and values displayed at each section. Upon a triggering of the bonus event, any player eligible to participate in the bonus may achieve an outcome generated from the bonus event including the shared display. When the shared display is activated, it simultaneously generates a separate or individual outcome associated with each of the gaming devices. The outcomes are spatially related to one another so that a random generation of an outcome associated with one gaming device automatically generates random outcomes associated with each gaming device. Each gaming device however receives the outcome only if it has participated in the random generation.

15 Claims, 47 Drawing Sheets

U.S. PATENT DOCUMENTS

| | | | | |
|---|---|---|---|---|
| 3,645,531 | A | 2/1972 | Wright | |
| D228,905 | S | 10/1973 | Anderson, Jr. | |
| D252,527 | S | 7/1979 | Huffhines | |
| 4,335,809 | A | 6/1982 | Wain | |
| 4,614,342 | A | 9/1986 | Takashima | |
| 4,678,191 | A | 7/1987 | Mills et al. | |
| 4,805,907 | A | 2/1989 | Hagiwara | |
| 4,837,728 | A | 6/1989 | Barrie et al. | |
| D303,154 | S | 8/1989 | Kwake | |
| 4,976,438 | A | 12/1990 | Tashiro et al. | |
| 5,016,880 | A | 5/1991 | Berge | |
| 5,046,736 | A | 9/1991 | Bridgeman et al. | |
| 5,083,800 | A | 1/1992 | Lockton | |
| 5,116,055 | A | 5/1992 | Tracy | |
| 5,120,060 | A | 6/1992 | Parker et al. | |
| 5,167,413 | A | 12/1992 | Fulton | |
| 5,188,363 | A | 2/1993 | Marnell, II et al. | |
| 5,221,083 | A | 6/1993 | Dote | |
| 5,242,163 | A | 9/1993 | Fulton | |
| D344,296 | S | 2/1994 | McKay et al. | |
| 5,292,127 | A | 3/1994 | Kelly et al. | |
| 5,320,351 | A | 6/1994 | Suzuki | |
| 5,382,940 | A | 1/1995 | Takemoto et al. | |
| 5,411,270 | A | 5/1995 | Naka et al. | |
| 5,431,492 | A | 7/1995 | Rothschild et al. | |
| D364,479 | S | 11/1995 | Gilbert | |
| D373,132 | S | 8/1996 | Baillie-Hamilton et al. | |
| 5,560,603 | A | 10/1996 | Seelig et al. | |
| 5,564,700 | A | 10/1996 | Celona | |
| 5,580,309 | A | 12/1996 | Piechowiak et al. | |
| 5,605,506 | A | 2/1997 | Hoorn et al. | |
| 5,611,730 | A | 3/1997 | Weiss | |
| 5,622,366 | A | 4/1997 | Inoue | |
| 5,634,639 | A | 6/1997 | Tokito et al. | |
| 5,639,089 | A | 6/1997 | Matsumoto et al. | |
| 5,655,961 | A | 8/1997 | Acres et al. | |
| D383,171 | S | 9/1997 | Hanscom | |
| 5,664,998 | A | 9/1997 | Seelig et al. | |
| 5,674,127 | A | 10/1997 | Horstmann et al. | |
| 5,695,400 | A | 12/1997 | Fennell, Jr. et al. | |
| 5,702,304 | A | 12/1997 | Acres et al. | |
| 5,741,183 | A | 4/1998 | Acres et al. | |
| 5,752,882 | A | 5/1998 | Acres et al. | |
| 5,755,619 | A | 5/1998 | Matsumoto et al. | |
| 5,770,533 | A | 6/1998 | Franchi | |
| 5,772,509 | A | 6/1998 | Weiss | |
| 5,779,544 | A | 7/1998 | Seelig et al. | |
| D396,888 | S | 8/1998 | Hayashi | |
| 5,788,573 | A | 8/1998 | Baerlocher et al. | |
| 5,816,920 | A | 10/1998 | Hanai | |
| 5,820,459 | A | 10/1998 | Acres et al. | |
| 5,823,874 | A | 10/1998 | Adams | |
| 5,823,879 | A | 10/1998 | Goldberg et al. | |
| 5,830,063 | A | 11/1998 | Byrne | |
| 5,836,817 | A | 11/1998 | Acres et al. | |
| 5,839,955 | A | 11/1998 | Mangano et al. | |
| 5,848,932 | A | 12/1998 | Adams | |
| 5,857,110 | A | 1/1999 | Sakakibara et al. | |
| 5,876,284 | A | 3/1999 | Acres et al. | |
| 5,879,235 | A | 3/1999 | Kaneko et al. | |
| 5,882,261 | A | 3/1999 | Adams | |
| D410,256 | S | 5/1999 | Uehara et al. | |
| 5,911,418 | A | 6/1999 | Adams | |
| 5,924,927 | A | 7/1999 | Matsuura et al. | |
| 5,947,820 | A | 9/1999 | Morro et al. | |
| D415,211 | S | 10/1999 | Yamaguchi | |
| 5,967,820 | A | 10/1999 | Siegal et al. | |
| 5,976,015 | A | 11/1999 | Seelig et al. | |
| 5,976,019 | A | 11/1999 | Ikeda et al. | |
| 5,984,782 | A | 11/1999 | Inoue | |
| 5,997,400 | A | 12/1999 | Seelig et al. | |
| 6,012,982 | A | 1/2000 | Piechowiak et al. | |
| D421,068 | S | 2/2000 | Yamaguchi | |
| 6,019,369 | A | 2/2000 | Nakagawa et al. | |
| 6,023,729 | A | 2/2000 | Samuel et al. | |
| 6,027,115 | A | 2/2000 | Griswold et al. | |
| 6,033,307 | A | 3/2000 | Vancura | |
| 6,039,649 | A | 3/2000 | Schulze | |
| 6,043,615 | A | 3/2000 | Forbes | |
| 6,059,289 | A | 5/2000 | Vancura | |
| 6,059,658 | A | 5/2000 | Mangano et al. | |
| 6,068,553 | A | 5/2000 | Parker | |
| 6,077,162 | A | 6/2000 | Weiss | |
| 6,080,061 | A * | 6/2000 | Watanabe et al. | 463/16 |
| 6,082,734 | A * | 7/2000 | Uehara et al. | 273/142 E |
| 6,089,978 | A | 7/2000 | Adams | |
| 6,105,962 | A | 8/2000 | Malavazos et al. | |
| 6,117,009 | A | 9/2000 | Yoseloff | |
| 6,142,873 | A | 11/2000 | Weiss et al. | |
| 6,152,823 | A | 11/2000 | Lacoste et al. | |
| 6,159,098 | A | 12/2000 | Slomiany et al. | |
| 6,162,121 | A | 12/2000 | Morro et al. | |
| 6,162,122 | A | 12/2000 | Acres et al. | |
| 6,168,520 | B1 | 1/2001 | Baerlocher et al. | |
| 6,183,366 | B1 | 2/2001 | Goldberg et al. | |
| 6,193,606 | B1 | 2/2001 | Walker et al. | |
| D439,282 | S | 3/2001 | Yamaguchi | |
| 6,201,532 | B1 | 3/2001 | Tode et al. | |
| 6,210,275 | B1 | 4/2001 | Olsen | |
| 6,210,277 | B1 | 4/2001 | Stefan | |
| 6,217,448 | B1 | 4/2001 | Olsen | |
| 6,224,482 | B1 | 5/2001 | Bennett | |
| 6,224,483 | B1 | 5/2001 | Mayeroff | |
| 6,224,484 | B1 | 5/2001 | Okuda et al. | |
| 6,264,560 | B1 | 7/2001 | Goldberg et al. | |
| 6,280,325 | B1 | 8/2001 | Fisk | |
| 6,302,790 | B1 | 10/2001 | Brossard | |
| 6,309,299 | B1 | 10/2001 | Weiss | |
| D451,153 | S | 11/2001 | Hedrick et al. | |
| D451,558 | S | 12/2001 | Sano | |
| 6,324,791 | B1 | 12/2001 | Azpiroz Villar | |
| 6,334,814 | B1 | 1/2002 | Adams | |
| 6,336,863 | B1 | 1/2002 | Baerlocher et al. | |
| 6,338,678 | B1 | 1/2002 | Seelig et al. | |
| 6,358,149 | B1 | 3/2002 | Schneider et al. | |
| 6,364,314 | B1 | 4/2002 | Canterbury | |
| 6,364,767 | B1 | 4/2002 | Brossard et al. | |
| 6,364,768 | B1 | 4/2002 | Acres et al. | |
| 6,371,852 | B1 | 4/2002 | Acres | |
| 6,375,567 | B1 | 4/2002 | Acres | |
| 6,375,569 | B1 | 4/2002 | Acres | |
| 6,386,974 | B1 | 5/2002 | Adams | |
| 6,409,595 | B1 | 6/2002 | Uihlein et al. | |
| 6,416,408 | B2 | 7/2002 | Tracy et al. | |
| D462,397 | S | 9/2002 | Baker et al. | |
| 6,450,884 | B1 | 9/2002 | Seelig et al. | |
| 6,464,582 | B1 | 10/2002 | Baerlocher et al. | |
| 6,464,586 | B1 | 10/2002 | Kamata et al. | |
| 6,475,090 | B2 | 11/2002 | Roelofs | |
| 6,491,584 | B2 | 12/2002 | Graham et al. | |
| 6,506,117 | B2 | 1/2003 | DeMar et al. | |
| D475,091 | S | 5/2003 | Tsuda | |
| 6,565,434 | B1 | 5/2003 | Acres | |
| 6,572,471 | B1 | 6/2003 | Bennett | |
| 6,572,473 | B1 | 6/2003 | Baerlocher | |
| 6,575,832 | B1 | 6/2003 | Manfredi et al. | |
| 6,607,195 | B2 | 8/2003 | Vancura | |
| 6,629,887 | B1 * | 10/2003 | Todaiji et al. | 463/2 |
| 6,648,753 | B1 | 11/2003 | Tracy et al. | |
| 6,656,048 | B2 | 12/2003 | Olsen | |
| 6,659,866 | B2 * | 12/2003 | Frost et al. | 463/17 |
| 6,663,488 | B1 | 12/2003 | Adams | |
| D486,869 | S | 2/2004 | Webb et al. | |
| 6,692,354 | B2 | 2/2004 | Tracy et al. | |
| D487,582 | S | 3/2004 | McGahn et al. | |
| 6,705,944 | B2 | 3/2004 | Luciano | |
| 6,712,693 | B1 | 3/2004 | Hettinger | |
| 6,712,702 | B2 | 3/2004 | Goldberg et al. | |
| 6,715,756 | B2 | 4/2004 | Inoue | |
| 6,722,976 | B2 | 4/2004 | Adams | |
| 6,726,563 | B1 | 4/2004 | Baerlocher et al. | |
| 6,780,105 | B1 | 8/2004 | Kaminkow | |
| 6,848,991 | B2 | 2/2005 | Kusuda | |
| 6,869,361 | B2 | 3/2005 | Sharpless et al. | |
| 6,887,154 | B1 | 5/2005 | Luciano, Jr. et al. | |
| 6,899,625 | B2 | 5/2005 | Luciano, Jr. et al. | |
| 7,169,045 | B2 | 1/2007 | Nordman | |

| | | | | |
|---|---|---|---|---|
| 7,192,347 | B1 | 3/2007 | Marks et al. | |
| 7,311,598 | B2 * | 12/2007 | Kaminkow et al. | 463/16 |
| 7,311,604 | B2 * | 12/2007 | Kaminkow et al. | 463/20 |
| 7,427,236 | B2 * | 9/2008 | Kaminkow et al. | 463/26 |
| 7,448,949 | B2 * | 11/2008 | Kaminkow et al. | 463/26 |
| 2001/0003709 | A1 | 6/2001 | Adams | |
| 2001/0004606 | A1 | 6/2001 | Tracy et al. | |
| 2001/0004607 | A1 | 6/2001 | Olsen | |
| 2001/0018361 | A1 | 8/2001 | Acres | |
| 2002/0039923 | A1 | 4/2002 | Cannon et al. | |
| 2002/0052234 | A1 | 5/2002 | Adams | |
| 2002/0055381 | A1 | 5/2002 | Tarantino | |
| 2002/0103029 | A1 | 8/2002 | Finlayson et al. | |
| 2002/0142826 | A1 | 10/2002 | Adams | |
| 2002/0142830 | A1 | 10/2002 | Adams | |
| 2002/0151342 | A1 | 10/2002 | Tracy et al. | |
| 2002/0169017 | A1 | 11/2002 | Visoenik | |
| 2002/0177483 | A1 | 11/2002 | Cannon | |
| 2002/0198038 | A1 | 12/2002 | Adams | |
| 2003/0011127 | A1 | 1/2003 | Vancura et al. | |
| 2003/0013520 | A1 | 1/2003 | Adams | |
| 2003/0036430 | A1 | 2/2003 | Cannon | |
| 2003/0040355 | A1 | 2/2003 | Baerlocher | |
| 2003/0045360 | A1 | 3/2003 | Hora | |
| 2003/0060277 | A1 | 3/2003 | Webb et al. | |
| 2003/0064796 | A1 | 4/2003 | Glavich et al. | |
| 2003/0087689 | A1 | 5/2003 | Adams | |
| 2003/0100361 | A1 | 5/2003 | Sharpless et al. | |
| 2003/0114216 | A1 | 6/2003 | Adams | |
| 2003/0119581 | A1 | 6/2003 | Cannon et al. | |
| 2003/0148804 | A1 | 8/2003 | Ikeya et al. | |
| 2003/0148809 | A1 | 8/2003 | Nelson | |
| 2003/0157979 | A1 | 8/2003 | Cannon et al. | |
| 2003/0181234 | A1 | 9/2003 | Falciglia, Sr. | |
| 2003/0190957 | A1 | 10/2003 | Tanskanen | |
| 2003/0199316 | A1 | 10/2003 | Miyamoto et al. | |
| 2003/0220139 | A1 * | 11/2003 | Peterson | 463/30 |
| 2003/0224852 | A1 | 12/2003 | Walker et al. | |
| 2003/0236110 | A1 | 12/2003 | Beaulieu et al. | |
| 2004/0002372 | A1 | 1/2004 | Rodgers et al. | |
| 2004/0009807 | A1 | 1/2004 | Miller et al. | |
| 2004/0018871 | A1 | 1/2004 | Seelig et al. | |
| 2004/0033831 | A1 | 2/2004 | Tarantino | |
| 2004/0038728 | A1 | 2/2004 | Adams | |
| 2004/0038734 | A1 | 2/2004 | Adams | |
| 2004/0048645 | A1 | 3/2004 | Webb et al. | |
| 2004/0051240 | A1 | 3/2004 | Adams | |
| 2004/0053660 | A1 | 3/2004 | Webb et al. | |
| 2004/0053665 | A1 | 3/2004 | Baerlocher | |
| 2004/0082378 | A1 | 4/2004 | Peterson et al. | |
| 2004/0102237 | A1 | 5/2004 | Baerlocher | |
| 2004/0102243 | A1 | 5/2004 | Olsen | |
| 2004/0121838 | A1 | 6/2004 | Hughs-Baird et al. | |
| 2004/0147306 | A1 | 7/2004 | Randall et al. | |
| 2004/0162128 | A1 | 8/2004 | Baerlocher et al. | |
| 2004/0204235 | A1 | 10/2004 | Walker et al. | |
| 2004/0266512 | A1 | 12/2004 | Kaminkow | |
| 2005/0059474 | A1 | 3/2005 | O'Halloran | |
| 2005/0079911 | A1 | 4/2005 | Nakatsu | |
| 2005/0101384 | A1 | 5/2005 | Parham | |
| 2005/0137014 | A1 | 6/2005 | Vetelainen | |
| 2005/0148383 | A1 | 7/2005 | Mayeroff | |
| 2005/0153780 | A1 | 7/2005 | Gauselmann | |
| 2005/0181856 | A1 | 8/2005 | Cannon et al. | |
| 2005/0218590 | A1 | 10/2005 | O'Halloran et al. | |
| 2005/0233803 | A1 | 10/2005 | Yang | |
| 2006/0009283 | A1 | 1/2006 | Englman et al. | |
| 2006/0069619 | A1 | 3/2006 | Walker et al. | |
| 2006/0240889 | A1 | 10/2006 | Walker et al. | |
| 2006/0247012 | A1 | 11/2006 | Walker et al. | |
| 2007/0060316 | A1 | 3/2007 | Walker et al. | |

FOREIGN PATENT DOCUMENTS

| | | |
|---|---|---|
| AU | 199650327 | 10/1997 |
| EP | 0 981 119 | 2/2000 |
| EP | 1 186 329 | 2/2002 |
| EP | 1 513 116 | 3/2005 |
| GB | 2 098 776 | 11/1982 |
| GB | 2 322 217 | 12/1997 |
| GB | 2 201 821 | 9/1998 |
| GB | 2 387 950 | 10/2003 |
| WO | WO 99/03078 | 1/1999 |
| WO | WO 00/32286 | 6/2000 |

OTHER PUBLICATIONS

The $1,000,000 Pyramid Game Advertisement, published by IGT in 2001.

The $1,000,000 Pyramid Video Slots Game Advertisement, published by IGT in 2003.

2nd Chance 7s Article, published by Strictly Slots in Nov. 2000.

Alice in Cardland Advertisement, published by Eolith prior to Sep. 30, 2004.

American Bandstand Advertisement, published by IGT in 2001.

Astra Article, published in Coinslot Industry in Jan. 2003.

Atronic Merchandising Advertisement, written by Atronic, published in 2004.

Atronic WAPs Advertisement, published by Atronic in 2004.

Austin Powers in Goldmember™ Advertisement, published by IGT in 2003.

Austin Powers in Goldmember Article, published by Strictly Slots in Mar. 2004.

Austin Powers in Goldmember Video Slots Game Advertisement, published by IGT in 2001.

Bad Boys Jackpot Advertisement, published by R. Franco in 2004.

Bands of Gold Advertisement, written by Euro Games, published prior to Sep. 30, 2004.

Barnyard Game Advertisement, published by Aristocrat prior to Sep. 30, 2004.

The Beverly Hillbillies Video Slots advertisement, published by IGT in 2002.

The Beverly Hills Video Slots Advertisement, published by IGT in 2003.

The Beverly Hillbillies Video Slots Article, published by Strictly Slots in Jan. 2002.

Big Monte Game Advertisement, published by Bally Gaming in 2003.

Big Shot Game Advertisement, published by Aristocrat in 2002.

Big Top Keno Advertisement, published by Aristocrat in Oct. 2000.

Blazing Sevens Wheel of Gold Advertisement, published prior to Sep. 30, 2004.

Bonus Road Rally Game Advertisement, published by A. C. Coin & Slot Service Company in 1997.

Bonus Roulette Advertisement, written by R. Franco, published prior to Sep. 30, 2004.

Buck's Roulette Advertisement, written by R. Franco, published prior to Sep. 30, 2004.

Captain Scarlet Advertisement, written by ACE Coin Equipment, published in 2004.

Carousel Advertisement, written by Empire Games Limited, published prior to Sep. 30, 2004.

Cartoon Jackpots Advertisement, written by Bally Gaming Systems in 2004.

Cash Bazaar Advertisement, published by Bell-Fruit Games in 2003.

Cash Express Game Advertisement, published by Aristocrat in 2001.

Cash Express Game Advertisement, published by Aristocrat in 2002.

Cash Express How to Play Guide Advertisement, published by Aristocrat prior to Sep. 30, 2004.

Cash Express Game Advertisement, published by Aristocrat, prior to Sep. 30, 2004.

Cash for Life and Sale of the Century Articles, published by Strictly Slots in Jun. 2003.

Cash for Life Triple Spin Bonus Article, published in Strictly Slots in Feb. 2003.

Cash Wheel Advertisement, published by Bell-Fruit Games prior to Sep. 30, 2004.

Cash Wheel Advertisement, published by Maygay in Feb. 2002.

Casino Beaver Las Vegas! Advertisement, published by Global Games, published prior to Sep. 30, 2004.

Circus Advertisement, written by R. Franco, published prior to Sep. 30, 2004.

Classic Pot of Gold Advertisement, written by ACE Coin Equipment, published prior to Sep. 2003.
Club Dungeons & Drag Queens Game Advertisement, published by Global Games prior to Sep. 30, 2004.
Clue Most Wanted Game Advertisement, published by Mikohn in 2003.
Cyclone Advertisement, written by Innovative Concepts in Entertainment, published prior to Sep. 30, 2004.
Cyclone Jackpots Advertisement, written by Sigma Game, published Jan. 2001.
Dance To It! Article, published by Strictly Slots in Jan. 2002.
Daytona Gold Advertisement, written by JPM, published prior to Sep. 30, 2004.
Derby Champion Advertisement, written by Chang Myung Co., Ltd., published prior to Sep. 30, 2004.
Diamond Zone Advertisement, written by Project, published prior to Sep. 30, 2004.
Dice Roulette Advertisement, published by General Automatic Amusement, published prior to Sep. 30, 2004.
Dice Shaker Advertisement, written by Elaut, published prior to Sep. 30, 2004.
Doctor Dosh Advertisement, published by Bell-Fruit Games prior to Sep. 30, 2004.
Double Spin Slotto Advertisement, written by AC Coin & Slot, published in 2004.
Dream Catcher Treasure Wheel Advertisement, written by Sigma Game, published Jan. 2001.
Dungeons and Drag Queens Game Advertisement, published by Global Games prior to Sep. 30, 2004.
Elvira Advertisement, published by IGT in 2003.
Elvira Game advertisement, published by IGT in 2002.
Elvira Mistress of the Dark Advertisement, published by IGT prior to Jun. 30, 2004.
Elvis Advertisement, published by IGT in 1999.
Flash! Advertisement, published by Cyberdyne Gaming prior to Sep. 30, 2004.
Flush Attack Article, published by Strictly Slots in Feb. 2002.
Frank Sinatra Gaming Advertisement, published by IGT in Sep. 30, 2004.
Fruitsusir game Advertisement, written by Red Gaming, published prior to Sep. 30, 2004.
Games and Technology Article and Photograph, published by International Gaming and Wagering Business in Jan. 2003.
The Game of Life Advertisement, published by Sigma prior to Sep. 30, 2004.
The Game of Life Video Slot Game Advertisement, published by Sigma, 2004.
Games Station Advertisement, written by Atronic International, published Feb. 2003.
Game Time International Gaming Advertisements, published in Aug. 2004.
Golden Dice Advertisement, written by Cadillac Jack, published in 2004.
Golden Dragon Game Description, published by Barcrest Games prior to Sep. 30, 2004.
Golden Roulette Advertisement, written by Cadillac Jack, published in 2004.
Harley Davidson Video Slots Advertisements, published by IGT in 2002.
Holy Smoke! Advertisement, written by Impuse Gaming, published prior to Sep. 30, 2004.
Hollywood Squares Prize Spin Advertisement, written by WMS Gaming Inc., published in 2004.
Hollywood Squares Tour of Stars Article, published by Compton Dancer Consulting, Inc. in Oct. 2003.
Hybrid Combining the Best of Both Slot Worlds! Advertisement, written by Bally Gaming Systems, published in 2004.
Hypnotic Advertisement and Game Description, published by Barcrest Games prior to Sep. 30, 2004.
IGT World of Games MegaJackpots Video Slots Advertisement, written by IGT, published in 2004.
IGT World of Games Class II and Central Determination Games Advertisement, written by IGT, published in 2004.
Jackpot Carnival Advertisement, written by Aristocrat in the Gaming Entertainers Magazine 2003, published in 2003.
King Cash Slots Game Advertisement, published by IGT in 2003.
Let Freedom Ring Advertisement written by Rocket Gaming Systems, published in 2004.
Life's Little Games Article, published by Strictly Slots in Jun. 2002.
Lucky Belle Game Advertisement, published by Amatic Industries prior to Sep. 30, 2004.
Lucky Wheel Advertisement, written by Carat Gaming Technology, published prior to Sep. 30, 2004.
Lucky Wheel Game Advertisement, published by Strictly Slots in Mar. 2004.
M*A*S*H Video Slots Game Advertisement, published by IGT in 2003.
Magic Roulette De Luxe Advertisement, published by IAMC in 2004.
Mayan Wheel of Gold Article, published by Strictly Slots prior to Sep. 30, 2004.
Money Bags Game Advertisement, published by Acres Gaming prior to Sep. 30, 2004.
Monte Carlo Advertisement, written by Bally Gaming Systems, published in 2004.
Monte Carlo Advertisement, published by Bally Gaming Systems prior to Sep. 30, 2004.
Monte Carlo Game Advertisement, published by Bally Gaming Systems in 2003.
Note Runner Advertisement, written by Extreme Gaming, published prior to Sep. 30, 2004.
On the Money Article, published by Strictly Slots in Dec. 2000.
Party Games Advertisement, published by Astra in 2003.
Party Time Bingo Advertisement, published by Astra Games Limited prior to Sep. 30, 2004.
Pick a Prize Advertisement, published by Acres Gaming Incorporated prior to Sep. 30, 2004.
Quarter Mania Slots Advertisement, published by IGT prior to Jun. 30, 2002.
Quarter Millions Advertisement, written by Bally Gaming, Inc. in 2003.
Quarter Millions Advertisement, written by Bally Gaming, Inc. in 2004.
Quarter Millions Article, published by Strictly Slots in Apr. 2004.
R&B Game Advertisement, published by A. C. Coin & Slot prior to Sep. 30, 2004.
RNGs and Multi-Coin Plays Article, published by Strictly Slots in Aug. 2004.
Rapid Roulette Game Advertisement, published by John Huxley in 2003.
Rapid Roulette Product Overview Game Advertisement, published by John Huxley in 2002.
Reel Slots Advertisement, published by Sigma prior to Sep. 30, 2004.
Ring-a-Bell Game Advertisement, published by JPM prior to Sep. 30, 2004.
Ring of Fire Game Advertisement, published by Amatic Industries prior to Sep. 30, 2004.
Roulette Advertisement, published by Atronic in 1999.
Roulette Grand Jeu Advertisement, published by Amatic Industries prior to Sep. 30, 2002.
Roulette Grand Jeu Game Description and Advertisement, published by Amatic Industries prior to Sep. 30, 2004.
Roulette Prestige Advertisement, written by IAMC, published in 2004.
Round and Round Advertisement, written by R. Franco, published prior to Sep. 30, 2004.
Royal Roulette Advertisement, written by Impulse Gaming, published prior to Sep. 30, 2004.
Run for Your Money Game Advertisement, published by IGT prior to Sep. 30, 2004.
Run for Your Money Game Advertisement, published by IGT in 1998.
S2000 Slotto Advertisement, written by AC Coin & Slot, published in 2004.
SCX Stepper Advertisement, written by Aristocrat, published in 2004.

Seeben Gaming Machine Advertisement, published in Oct. 2004.
Shaking Dice Advertisement, published by General Automatic Amusement prior to Sep. 30, 2004.
Show News IGT Jan. 2003 Advertisements, published by IGT, 2003.
Showtime Advertisement, written by Red Gaming, published prior to Sep. 30, 2004.
Sinatra Video Slot Advertisement, published by IGT in 2003.
Slot Machines [In Part], written by Marshal Fey, published 1997.
Slotopoly Game Advertisement, published by IGT prior to Sep. 30, 2004.
Slotopoly—Wheel of Gold Game Advertisement, published by IGT prior to Sep. 30, 2004.
Spin-A-Lot Advertisement, published by Acres Gaming prior to Sep. 30, 2004.
Spintastic! Article, published by Casino Data Systems prior to Sep. 30, 2004.
Super Reel Advertisement, published by Electrocoin Gaming prior to Sep. 30, 2004.
Texas Tea Game Description, published by IGT in 2000.
Texas Tea Game Advertisement website page http://www.igt.com/games/new_games/texastea.html, printed on Mar. 21, 2001.
Texas Tea Game Advertisement, published by IGT prior to Sep. 30, 2004.
Top Secret 2 Advertisement, written by Unidesa Gaming, published in 2004.
Treasure Wheel Double Jackpot Advertisement, published by Sigma prior to Sep. 30, 2004.
Treble Chance Advertisement, published by Astra in Jan. 2003.2.
Tutankamon Advertisement, written by R. Franco, published in 2004.
Twinkle Dome Advertisement, written by Manjyudo Co, published prior to Sep. 30, 2004.
Victory Advertisement, written by Elaut, published prior to Sep. 30, 2004.
Victory Game Advertisement, published by General Automatic Amusement prior to Sep. 30, 2004.
Wheel and Deal Article, published by Strictly Slots in Dec. 2001.
Wheel of Adventure Advertisement, published by John Huxley prior to Sep. 30, 2004.
Wheel of Fortune Classic Gaming Machine Photograph, available prior to Sep. 30, 2004.
Wheel of Fortune Game Advertisement, published by General Automatic Amusement prior to Sep. 30, 2004.
Wheel of Fortune Game Advertisement, published by IGT in 1998.
Wheel of Fortune Slots S2000 Series Advertisement, published by IGT in 2002.
Wheel of Fortune Game Show Web Page http://www.wheeloffortuneinfo.com/index.html, printed on Jan. 10, 2006.
Wheel of Fortune Lucky Spin Advertisement, published by IGT, published prior to Sep. 30, 2004.
Wheel of Fortune Special Edition Advertisement, written by IGT, published in 2004.
Wheel of Fortune Special Edition Classic Spin Video Slots Advertisement, written by IGT, published before Sep. 30, 2004.
Wheel of Fortune Triple Action Article, published in Strictly Slots in Feb. 2004.
Wheel of Fortune Video Advertisement, published by IGT in 1999.
Wheel of Fortune Video Slots Advertisement, published by IGT in 2002.
Wheel of Fortune Video Slots Advertisement, published by IGT prior to Sep. 30, 2004.
Wheel of Gold Advertisement, published by Anchor in 1995.
Wheel Spins Bonus (Video Wheel of Fortune) Article, written by IGT, published before Sep. 30, 2004.
Wild Race Advertisement, written by Unidesa Gaming & Systems, published in 2004.
Winning Ways Advertisement, published by Vivid prior to Sep. 30, 2004.
Xtreme Gear Advertisement, written by R. Franco, published prior to Sep. 30, 2004.
ZeroLabs Advertisement, written by ZeroLabs, published in 2004.
Zorro Advertisement, written by Aristocrat, published in 2004.
Office Action dated Aug. 21, 2009 for U.S. Appl. No. 11/830,070.
Office Action dated Sep. 2, 2009 for U.S. Appl. No. 11/830,079.
GameTek, "Wheel of Fortune," 1989, arcadehistory, <http://www.arcade-history.com/?n=wheel-of-fortune&page=detail&id=3157> (2 pages).
"Wheel of Fortune picture," <http://upload.wikimedia.org/wikipedia/en/5/59/Wheelbackdrops.png> (1 page).
Office Action dated Mar. 19, 2010 for U.S. Appl. No. 11/830,079. (18 pages).

* cited by examiner

| | | |
|---|---|---|
| A1-500 | B1-150 | C1-100 |
| A2-400 | B2-80 | C2-250 |
| A3-600 | B3-125 | C3-1000 |
| A4-40 | B4-500 | C4-50 |
| A5-150 | B5-300 | C5-400 |
| A6-40 | B6-1000 | C6-75 |
| A7-200 | B7-60 | C7-300 |
| A8-180 | B8-75 | C8-150 |
| A9-300 | B9-175 | C9-90 |
| 268 | 274 | 268 |

A → 400 (.20) = 80

B → 315 (.30) = 95

C → 200 (.50) = <u>100</u>

Total Expected Value = 275

FIG. 23

States

250

| State 252 | Indicator 60 | Plasma Pointers 66 | Plasma Message for Gaming Device 66 | Player Station Message/Display 10a |
|---|---|---|---|---|
| 1. Base Game | Off | Dim/Color Outline | Good Luck 254 | Base Game |
| 2. Bonus Initiation | Off | Dim/Slow Flash Highlights | Bonus Initiated 258 | Transition Screens 258 |
| 3. Bonus Init. During Wheel Spin | Off | Dim | Wait for Next Spin 262 | Transitions Screens/Base Game 258 |
| 4. Bonus Eligible (Option) (No CD) | Dim | Dim/Slow Flash Highlight | Press "Play Bonus" 266 | Press "Play Bonus" 266 |
| 5. Bonus Eligible (Option) (w/CD) | Dim | Dim/Slow Flash Highlight | Care to Join in? 268 | Press "Play Bonus" to join in 266/268 |
| 6. Declined Option (w/CD) | Dim | Dim/Slow Flash Highlight | Waiting for next Spin 262 | Wait for the next Wheel Spin 262 |
| 7. Bonus Participant (Countdown) | Lit (Slow Flash) | Lit (Slow Flash) w/Highlight | x seconds to Wheel Spin 270 | x Seconds to Wheel Spin 270 |
| 8. Wheel Spinning | Fully Lit | Fully Lit | Watch the Wheel/Blur 264 | Stand Up/Watch the Wheel 269 |
| 9. Wheel Stops (Win Cycle) | Full Color Flash | Full Color Flash | You've won X Credits 276 | Celebration 276 |
| 10. Idle | Off | Dim Color Outline | Please join us 256 | Attract Screens 256 |
| 11. All Games Idle | Flash Sync w/Sign | NA | Full Screen Attract 280 | Attract Screens 256 |

State 2- Bonus Initiation

State 3- Bonus Initiation During Wheel Spin

State 4- Bonus Eligible (Option) (No CD)

State 5- Bonus Eligible (w/Countdown)

State 6- Declined Participation (Waiting During Countdown)

State 7- Bonus Participant (Waiting During Countdown)

GAMING SYSTEM HAVING MULTIPLE GAMING DEVICES THAT SHARE A MULTI-OUTCOME DISPLAY

PRIORITY CLAIM

This application is a continuation application of, claims priority to and the benefit of U.S. patent application Ser. No. 11/683,884, filed Mar. 8, 2007, which is a continuation application of, claims priority to and the benefit of U.S. patent application Ser. No. 11/212,261, filed Aug. 26, 2005, which is a non-provisional application of, claims priority to and the benefit of U.S. Provisional Application No. 60/606,239 filed Sep. 1, 2004, the entire contents of which are incorporated herein.

CROSS-REFERENCE TO RELATED APPLICATIONS

This application relates to the following commonly owned patent applications: "GAMING SYSTEM HAVING MULTIPLE GAMING DEVICES THAT SHARE A MULTI-OUTCOME DISPLAY," Ser. No. 11/213,536, now U.S. Pat. No. 7,311,598; "GAMING SYSTEM HAVING MULTIPLE GAMING DEVICES THAT SHARE A MULTI-OUTCOME DISPLAY," Ser. No. 11/212,404, now U.S. Pat. No. 7,427,236; "GAMING SYSTEM HAVING MULTIPLE GAMING DEVICES THAT SHARE A MULTI-OUTCOME DISPLAY," Ser. No. 11/830,054, now U.S. Pat. No. 7,448,949; "GAMING SYSTEM HAVING MULTIPLE GAMING DEVICES THAT SHARE A MULTI-OUTCOME DISPLAY," Ser. No. 11/830,070, and "GAMING SYSTEM HAVING MULTIPLE GAMING DEVICES THAT SHARE A MULTI-OUTCOME DISPLAY," Ser. No. 11/830,079.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards.

Secondary or bonus games are also well known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicate this trigger to the player through one or more visual and/or audio output devices, such as the reels, lights, speakers, video screens, etc. Part of the enjoyment and excitement of playing certain gaming machines is the occurrence or triggering of a secondary or bonus game (even before the player knows how much the bonus award will be). In other words, obtaining a bonus award is part of the enjoyment and excitement for players of gaming machines.

Certain secondary or bonus games are activated automatically. Other secondary or bonus games require player activation. Once activated, certain secondary or bonus games play to the end or final bonus award automatically. Other secondary or bonus games require at least some level of player interaction which may vary. In certain secondary or bonus games, the player may need to pick selections. In some secondary or bonus games, the player is required to make one or more decisions, such as whether to risk one amount for a higher amount. From the triggering of these secondary or bonus games to the end of these secondary or bonus games, the player is generally provided indications, instructions and information about the play of these secondary or bonus games. These indications, instructions and information inform the player of how and why the player is obtaining or has obtained any award(s) in the secondary or bonus game. Gaming machines often include a display device, such as one or more reels, wheels, dice, video display screens, to display how and why the player is obtaining the secondary or bonus award.

Certain awards are also available to multiple gaming machines or groups of gaming machines. These awards are sometimes displayed on a single display for multiple gaming machines. For instance, progressive awards associated with gaming machines are also known. A progressive award is an award amount which includes an initial amount funded by a casino and an additional amount funded through a portion of each wager made on the progressive award associated gaming machine. For example, 1% of each wager on the primary game of the gaming machine may be allocated to the progressive award or progressive award fund. Individual progressive slot machines have a self-contained jackpot, wherein the jackpot grows with every play. A linked progressive gaming system includes two or more slot machines connected to a common jackpot, each of which individually contribute to the jackpot.

The progressive award grows in value as more players play the gaming machine and more portions of the players' wagers are allocated to the progressive award. The jackpots can reach sizeable amounts such as $1 million or much higher amounts before a player hits or wins the jackpot. Such sizeable jackpots are very attractive to players. As the jackpot grows, so does the overall expected payout percentage of the game. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award as described above.

The multiple gaming machines which may win a progressive award may be in the same bank of machines, in the same casino, in the same gaming establishment (usually through a local area network ("LAN")), in two or more different casinos or in two or more different gaming establishments (usually through a wide area network ("WAN")). Such progressive awards are sometimes called local area progressives ("LAP") and wide area progressives ("WAP"), respectively.

Regardless of the type of progressive, known gaming machines typically require the player to play the maximum bet to be eligible to win the progressive jackpot. Even on a single payline dollar machine, the maximum bet can be $5 (max bet on many slot machines is 5 credits per payline). Many players who are not willing to wager the required amount, or not consistently willing to wager such an amount, are thus excluded from having an opportunity to win the progressive jackpot and enjoy its associated payout increase. A known progressive slot machine that requires a max bet to enable the player to win a jackpot is the Megabucks® gaming machine distributed by IGT, the assignee of the present application.

Another known progressive slot machine is disclosed in U.S. Pat. No. 5,947,820 (hereafter "the '820 patent"), which issued on Aug. 4, 1998, which is also assigned to IGT. The '820 patent discloses a jackpot which can be preset to an amount more than any other progressive award of the associated game. In one embodiment, the top award jackpot is a progressive value that increases as a function of each coin deposited in the machine. The '820 patent discloses a gaming machine, that in one embodiment, enables the player to win the progressive jackpot by successfully entering a bonus game and successfully playing the bonus game.

The '820 patent also describes a secondary progressive game, wherein the player obtains letters of a phrase or pieces of a puzzle by randomly generating letter or puzzle piece outcomes. As the player accumulates letters or pieces, the game accumulates a bonus value. If the player completes the phrase or puzzle, the game enables the player to play a second bonus game. In the secondary bonus game, the game designates the number of picks that the player has from a progressive award pool based on the bonus value, e.g., one pick if the bonus value is less than 2000 credits, two picks if the bonus value is between 2000 and 2999, etc.

The jackpot progressive enables multiple players to build a potential award as game play continues. Players enjoy progressive award building games because they add variety to the gaming experience and for the potential to win a large or unexpected award.

As described above, individual games such as slot machines have been linked via progressive play through collective wager contributions and pool building. The bonus or secondary game has also served as a linking device, allowing the base game to be played individually, while linking the base game to the progressive pool. These known games have been highly successful for at least the reasons described above. Bingo and keno are two other examples of games that have outcome displays with multiple potential outcomes. In those games, the same random outcome is generated and displayed to each of the participating players. Those games are fun and exciting, in part, because two or more players such as friends, related players or unrelated players can play the same game at the same time. Keno and Bingo can be considered linked because a single result is shared by multiple players. A need exists however to improve the nature of sharing between multiple individually played gaming machines.

SUMMARY

One embodiment of the present invention provides a gaming device system having a plurality of gaming devices or gaming machines linked by a common gaming event, wherein the event generates a separate or individual outcome for each linked or associated gaming device. In one embodiment, the separate outcomes are simultaneously generated or displayed to each player of each gaming device. In one embodiment, each gaming device includes at least one primary or base game operable upon a wager by a player. Upon triggering the bonus event, each player playing one of the gaming devices takes part in the bonus event to achieve an individual or separate outcome, such as an award outcome.

In one embodiment, the bonus event or the bonus game of the gaming device system includes an electromechanical shared multi-outcome symbol display that is positioned adjacent to each of a plurality of associated gaming devices. In one such embodiment, the shared multi-outcome symbol display (referred to herein as the shared display) is a relatively large, substantially horizontally disposed wheel having a plurality of individual sections and symbols which represent the individual outcomes in the form of values displayed at each section. In one such embodiment, the gaming devices are positioned and spaced apart substantially equally about the perimeter of the wheel. The individual outcome or values on the wheel are fixed relative to each other. After at least one of the gaming devices achieves a certain outcome such as a bonus trigger, in its respective base game, the gaming device system activates the wheel (i.e., causes the wheel to spin) and simultaneously generates a separate or individual outcome associated with each of the gaming devices.

The outcomes can be the same for two or more of the gaming devices or can be different for two or more or each of the gaming devices. In one embodiment, the shared display generates and associates an individual outcome with each associated gaming device. Each gaming device that participates in the bonus event is provided the individual outcome associated with that gaming device. Each gaming device that does not participate in the bonus event is not provided the outcome associated with that gaming device.

The associated gaming devices or gaming machines are each provided with a bonus indicator, such as one or more lights, an alarm or siren, which visually and/or audibly informs the players to watch for an upcoming outcome generation of the shared display. When multiple gaming devices are eligible to participate in the outcome generation, multiple lights, alarms or sirens are activated, indicating that the next generation will provide outcomes to multiple eligible gaming devices or that the shared display will be activated multiple times.

The present invention includes techniques for randomly generating outcomes for association with each of the participating gaming devices. In one embodiment, the outcomes are divided into groups. One of the groups is randomly generated in a first step and outcomes from the generated group are assigned randomly to the associated gaming devices. The shared display indicates these outcomes to the players.

As described below, multiple display individual configurations are provided in which each player can see the outcomes or awards provided to the players actually participating in the bonus game. In certain embodiments, each player can see each of the outcomes. That is, the player can see the individual outcomes generated for each of the participating gaming devices as well as the individual outcomes generated for each of the non-participating gaming devices. It is believed that a player seeing what the player would have won had the player been a participating player as well as seeing what outcomes other players, including the participating players win, provides much fun, excitement and interest in the gaming experience.

Each associated gaming device has the ability, and in one embodiment equal odds, to independently trigger this shared display event at any suitable time during play of the primary game of the gaming devices. This shared display event is also referred to herein as the shared display bonus, bonus event, shared display game, bonus event associated with the shared display, bonus or bonus game. In an alternative embodiment, play of the shared display bonus is accomplished through a result in a secondary game or other bonus game. In any case, the gaming system of the present invention will encounter situations where:

(i) two or more players will have triggered the shared display bonus before the next shared display generation;

(ii) one or more players will trigger the shared display bonus during a current shared display generation; and (iii) one or more players has triggered the shared display bonus but does not wish to take part in the next spin or bonus generation and other similar overlapping shared display bonus trigger occurrences. To resolve the above listed situations, a suitable queuing method is employed to control the shared display.

In one queuing method, only the gaming device that triggers the generation of the shared display receives or is provided with the outcome of the shared display (e.g., an outcome associated with that gaming device). In this embodiment, multiple players or each of the players at the individual gaming devices see the generated individual outcome associated with their gaming device, but only the triggering player or triggering gaming device actually is provided or achieves the outcome associated with that gaming device. If a second gaming device has also triggered the shared display bonus, the second gaming device initiates the shared display and receives an outcome from the shared display after the first triggering gaming device receives its outcome.

The present invention includes various queuing methods to control two or more gaming devices that (i) become eligible to participate in the shared display bonus and (ii) participate in the same generation of the shared display which simultaneously generate individual outcomes for each of the individual participating gaming machines. To that end, the system includes a plurality of triggering arrangements or events. In a first triggering arrangement, the shared display begins to generate outcomes automatically without any input from the players playing the gaming devices. In a second triggering arrangement, an input from one of the players to start the shared display generation is required. These triggering arrangements apply to various ones of the queuing methods.

In one queuing method, the shared display provides a separate automatically initiated sequence for each gaming device achieving a triggering event. For example, if a player at a first gaming device achieves the triggering event and the shared display begins rotating and continues to rotate, while a player at a second gaming device achieves the triggering event, the shared display stops to produce a first award or award value for the player at the first gaming device and then rotates again and stops to produce an award or award value for the player at the second gaming device. The shared display continues this sequence for each triggering gaming device. This implementation is one way to maximize the visual effect of the present invention by having the shared display such as the wheel active for each bonus event.

In another queuing method, the first gaming device that triggers the shared display bonus controls when the next bonus generation or the next generation of the shared display begins. For example, if three gaming devices have each triggered the shared display bonus, the second and third triggering gaming devices wait until the first gaming device decides to initiate the bonus. When the first gaming device initiates the shared display bonus, the second and third triggering gaming devices are automatically joined in the next shared display generation. In one alternative implementation of this embodiment, the second and third gaming devices are allowed to opt-out of the next shared display generation. Here, if both the second and third gaming devices opt-out of the next shared display generation, the second triggering gaming device becomes the controlling gaming device with the ability to decide when to initiate the next subsequent generation of the shared display. In another alternative implementation, any of the first, second and third triggering gaming devices can initiate the generation of the shared display. Again, the two non-initiating gaming devices are automatically joined in the next generation unless (i) an opt-out option is provided and (ii) one or both non-initiating gaming devices elect to opt-out of the next shared display generation.

In a further queuing method, any of the first, second and third triggering gaming devices can initiate the next generation of the shared display. Here, when any of the gaming devices initiates the bonus, a countdown or time period is provided in which the other two non-initiating gaming devices can elect to join in the next outcome generation of the shared display. Any gaming device that elects not to join in the next generation or that triggers the bonus during the next generation is eligible to initiate the next subsequent generation of the shared display, and so on. In this queuing method, each of the players opt-in instead of opting out. In one implementation, any gaming device that triggers the bonus during the countdown can also opt-into the next generation.

The system of the present invention also includes various methods and apparatuses for organizing and distributing the outcomes such as values displayed on the shared display or wheel. The shared display in one embodiment displays outcomes or values having a fixed relationship to each other. Due to the fixed relationship between the values or other outcomes on the shared display, the random determination of one of the values or other outcomes for one of the gaming devices, e.g., a gaming device at the home position, is also a random determination for each of the remaining gaming devices.

In one embodiment for organizing and distributing the values, the displayed values are grouped into a plurality of outcome groups such as three outcome groups A, B and C. The three groups each include values spaced apart evenly such as every three spaces on the shared display or wheel. In this case, the generation of any particular outcome group A, B or C of values at the home position gaming device is also used as the group of values for each of the remaining gaming devices. The gaming devices are distributed with respect to the shared display the same as the association of the value groups such as every three positions on the display. If the home gaming device or the gaming device at the home position indicates a value that belongs to group A, the next adjacent gaming device indicates the next adjacent value from group A, the second adjacent gaming device indicates the second adjacent value from group A, and so on, so that each gaming device is associated with one of the values from group A.

In one embodiment, the individual values are dispersed relatively evenly among the three groups A, B and C. Each group has some lower values and some higher values. In this case, it makes little difference to the average expected value or to the variety of outcomes to generate any one of the value groups more often than any other of the groups. In an alternative embodiment, the values are distributed differently or non-evenly. For example, the values so that one of the groups, for example, includes a higher proportion of values at both extremes and less middle range values, while the other two groups, for example, include more middle range values. Here, the gaming device implementer may weight the different groups differently to generate outcomes that, on average, (i) are more widely dispersed or (ii) tend to be bunched in the middle.

The present invention also contemplates several ways in which each of the participant gaming machines can share in the outcome(s) or award(s) generated by the shared display, even if most of or all but one of the gaming machines did not achieve the triggering event which activated the shared display. In one embodiment, the shared display outcome or award could be provided to the triggering game player and other outcomes, awards or additional awards (such as one or more free primary game activations or spins) can be provided to the other gaming device players. In another embodiment, the shared display outcome or award could be split equally, split non-equally or split randomly. In another embodiment, the shared display outcome is split so that the triggering gaming device(s) receive a higher percentage share of the outcome or award than the non-triggering gaming devices, which each receive an equal amount or generated amount of the percent of the award remaining after the triggering player receives his or her share. The overall outcome or award or the non-triggering pool can also be split according to the outcomes generated for each participating gaming device. For example, the displayed outcomes on the shared display can be percentages, wherein the players each receive a portion of an overall award according to the percentages they receive. In another embodiment, the triggering game player receives a first percentage such as one-hundred percent of the individual outcome generated for that gaming machine and each other players of the gaming machines receive a second percentage such as ten percent of the individual award generated for that gaming machine.

The present invention also contemplates several embodiments in which a pool is built using a portion of each player's wager. In this embodiment, each participant gaming device achieves an award that is based on the contribution of that gaming device. Contributions to the pool from gaming devices not currently being played can:

(i) be maintained on those gaming devices, i.e., not distributed to the participant gaming devices currently being played; or (ii) be distributed in some appropriate manner to the gaming devices that are being played within the allotted time frames.

As discussed above, in embodiments employing a shared pool, the pool can be distributed to the gaming machines in a variety of ways. In other embodiments, each player's contribution is also modified or multiplied by a value generated by the multi-outcome shared display. The modifier or multiplier can be the same for each of the participant gaming machines, e.g., be the modifier or multiplier associated with the triggering game. The modifier or multiplier is alternatively separate and potentially different for each gaming machine, e.g., is the modifier or multiplier associated with each individual gaming machine.

The bank of gaming devices or machines located spatially near or in association with the shared display provides one apparatus and method for linking the group of gaming machines. The present invention contemplates many others. For example, the present invention contemplates linking games (i) via a local area network ("LAN"), (ii) via a wide area network ("WAN"), or (iii) via one or more LANs and one or more WANs. One embodiment for a WAN is an internet.

The present invention contemplates a gaming device being linked within the casino or gaming establishment to one or more additional gaming devices and/or linked to one or more additional casinos or gaming establishments, each having one or more linked gaming devices. That is, certain embodiments described herein do not employ an electromechanical shared display in the form illustrated below. To the extent those gaming devices use or need a shared display, the display in one embodiment is a video sequence appearing on a video monitor equipped with each of or a plurality of gaming devices.

The present invention also contemplates one or more banks of linked gaming devices being linked within the casino or gaming establishment to one or more additional banks and/or linked to one or more additional casinos or gaming establishments, each having one or more banks of linked gaming machines. Here, the electromechanical shared display is employed to link the bank of gaming machines. That bank in turn is linked to (i) one or more individual gaming machines within the same gaming establishment, (ii) one or more individual gaming machines within one or more different gaming establishments, (iii) one or more banks of gaming machines within the same gaming establishment, and/or (iv) one or more banks of gaming machines within one or more different gaming establishments.

As described below, the present invention contemplates systems and methods for linking machines on at least four different levels. On a first level, the gaming machines are linked by a common shared display that is operable to simultaneously generate an individual and potentially different outcome for each linked gaming machine. On a second level, the gaming machines are linked through a progressive type monetary pool. Each linked, and currently played, game or gaming machine shares in the disbursement of that pool when any of the participant gaming machines generates a bonus trigger. On a third level, the gaming machines are linked both (i) through a progressive type monetary pool, wherein each linked, and currently played game or gaming machine shares in the disbursement of that pool when any of the participant gaming machines generates a bonus trigger and (ii) by a shared electromechanical or simulated outcome display which operates to modify or multiply each gaming machine's disbursement.

On a fourth level, the gaming devices each have or maintain their own jackpot type of award. For example, each gaming device builds its own pool of funds based on a percentage, such as ten percent. Here, the gaming devices do not share monetarily; however, the gaming devices are linked so that a bonus triggering event occurring in any of the linked gaming devices triggers an award or disbursement of funds in each of the linked gaming devices. This fourth level option may or may not employ a shared outcome display. For example, the gaming devices could show a video sequence that is potentially different for each participant game, the same for a bank of gaming devices or the same for each of the participant gaming devices which are linked, e.g., by one or more LAN or WAN. This option solves certain disbursement problems associated with the shared pool when less than all the participant games or gaming devices are being played when the bonus event is triggered. Here, however, a display of the accumulated pool will be less than a display of a pool built from multiple gaming devices.

It should thus be appreciated that in a first primary embodiment, the gaming system of the present invention includes:

(i) a plurality of gaming machines, each gaming machine including a primary game operable upon a wager by a player, each primary game including a secondary display triggering event, each gaming machine including a player activatable secondary display initiating input device;

(ii) a secondary display shared by the gaming machines; and (iii) at least one processor operable to enable a second player of one of the gaming machines on which the secondary triggering event occurs to initiate the shared secondary display before a first player of another one of the gaming machines on which the secondary triggering event occurs and who has not initiated the secondary display even though the gaming machine being played by that first player triggered the secondary display prior to the gaming machine of the second player.

Various alternatives of this first primary embodiment at least include:

(i) each gaming machine including a processor that communicates with a separate processor that controls the shared secondary display;

(ii) the separate processor including a random outcome generator operable to generate outcomes for the shared secondary display;

(iii) the gaming system operable to enable the first player to initiate the shared secondary display before the second player initiates the shared secondary display;

(iv) a countdown started after the shared secondary display is initiated by the first player, and wherein the second player is enabled to join an outcome generation of the shared secondary display within the countdown;

(v) the second player enabled to initiate a subsequent outcome generation of the shared secondary display if the second player does not join the outcome generation of the shared secondary display within the countdown;

(vi) the gaming system operable to enable a third player of one of the gaming machines on which the secondary triggering event occurs to initiate the shared secondary display before either of the first or second players initiates the shared secondary display even though the gaming machines played by the first and second players have triggered the secondary display prior to the gaming machine of the third player;

(vii) the system enabling any of the first, second and third triggering players to bypass a next initiation and outcome generation of the shared secondary display and wait to initiate or join a later outcome generation of the shared secondary display;

(viii) a countdown started after the shared secondary display is initiated by the second player, and wherein the first player is enabled to join an outcome generation of the shared secondary display within the countdown;

(ix) the first player enabled to initiate a subsequent outcome generation of the shared secondary display if the first player does not join the outcome generation of the shared secondary display within the countdown; and (x) the display initiating device further operable to let the first player join the outcome generation of the shared secondary display within the countdown.

In a second primary embodiment, the gaming system of the present invention includes:

(i) a plurality of gaming machines, each gaming machine including a base game operable upon a wager by a player, each base game including a bonus game triggering event, each gaming machine including a player activatable bonus game initiating input device;

(ii) a bonus game shared by the plurality of gaming machines; and (iii) a processor operable to enable the gaming machines to join a group that will play a next bonus event, wherein (a) when a bonus game has been initiated and is currently being played, each gaming machine on which a bonus triggering event subsequently occurs awaits the end of that bonus game play, (b) after that bonus game play ends, any one of the gaming machines on which a bonus triggering event has occurred can initiate the next bonus event, and (c) during a period of time after one of the gaming machines that has achieved the bonus triggering event initiates the bonus game, any other gaming machine on which the bonus triggering event has occurred can join the bonus game.

Various alternatives of this second primary embodiment at least include:

(i) each gaming machine including a bonus event countdown display showing a count to the end of the period of time during which the gaming device can join the bonus game;

(ii) the bonus game including an outcome display shared by the plurality of gaming devices and wherein initiating the bonus game includes initiating an outcome generation by the shared outcome display;

(iii) each gaming machine that has triggered the bonus game being able to bypass at least one play of the bonus game before initiating the bonus game;

(iv) each gaming machine that has triggered the bonus game being able to bypass at least one play of the bonus game before joining the bonus game;

(v) after the bonus game ends, only one of the triggering gaming machines being able to initiate the next bonus event regardless of an order in which the triggering gaming machines achieved the bonus triggering event;

(vi) the triggering gaming machines being able to join the bonus game during the period of time in any order regardless of an order in which the triggering gaming machines achieved the bonus triggering event;

(vii) the bonus game including a generation of an outcome for each gaming machine regardless of whether each machine has initiated or joined the bonus game; and (viii) the gaming system including a display played by the gaming machines joined in a current bonus game and which gaming machines are eligible to play in a future bonus game.

In a third primary embodiment, the gaming system of the present invention includes:

(i) a plurality of gaming devices, each including a primary game operable upon a wager by a player;

(ii) a multi-outcome shared display common to each of the gaming devices, the shared display configured and arranged to simultaneously display in a bonus game a separate outcome for each of the plurality of gaming devices, the outcomes of the shared display having a fixed relationship with respect to each other; and (iii) an award adapted to be provided to a player playing the gaming device that triggers the bonus game, the award based on the outcome generated by the shared display for the triggering gaming device.

Various alternatives of this third primary embodiment at least include:

(i) the primary game selected from the group consisting of: slot, poker, keno, blackjack, craps, bunco, checkers and any combination thereof;

(ii) the gaming devices each operating a same type of primary game;

(iii) the shared display configured and arranged so that the player can see each of the outcomes of the shared display for each of the gaming devices;

(iv) the shared display configured and arranged so that each player playing one of the gaming devices can see at least one outcome of the shared display associated with a different one of the gaming devices;

(v) the shared display configured and arranged so that each player playing one of the gaming devices can see each of the outcomes of the shared display associated with each of the gaming devices;

(vi) the system including a second display positioned with respect to the shared display, the second display showing multiple outcomes of the shared display and the associations of those outcomes with their respective gaming devices;

(vii) the second display configured and arranged to show to each of the players playing the gaming devices, each of the outcomes of the shared display and the associations of those outcomes with their respective gaming devices;

(viii) each gaming device housing a microprocessor, and each microprocessor connected operably to a shared microprocessor that controls the display;

(ix) the shared microprocessor operating a dedicated random outcome generator operable to generate the outcomes of the shared display;

(x) each gaming device housing a microprocessor, one of the microprocessors controlling the shared display, and wherein each of the other microprocessors is connected operably to the microprocessor controlling the shared display;

(xi) the gaming system including a central processor that controls each of the gaming devices and the shared display;

(xii) the outcomes of the shared display spatially fixed with respect to each other;

(xiii) the shared display including a substantially horizontally disposed rotating wheel and the outcomes spaced apart circumferentially with respect to each other on the wheel;

(xiv) each of the gaming devices having the same odds of triggering the bonus game;

(xv) the gaming system including a queuing method employed to control a situation occurring when two or more gaming devices trigger the bonus game prior to a next outcome generation of the shared display;

(xvi) the shared display operated n times with n outcomes generated, one for each of n number of the gaming devices that have at least substantially simultaneously generated their respective bonus-triggering events, and substantially simultaneously can be within any time less than or equal to fifteen seconds or while the shared display is being operated or any other suitable time;

(xvii) the shared display operated with n outcomes generated substantially simultaneously, one for each of n number of the gaming devices that have at least substantially simultaneously generated their respective bonus-triggering events;

(xviii) the shared display operated once with n outcomes generated, one for each of n number of the gaming devices that have at least substantially simultaneously generated their respective bonus-triggering events, wherein "substantially simultaneously" is within any time less than or equal to a designated number of seconds or while the shared display is being operated;

(xix) the gaming devices each operable to play a base game, wherein portions of wagers made in the base games are contributed to a pool, and wherein upon an event occurring in one of the base games, the shared display is operated and an award from the pool is generated for each one of the gaming devices occurring having a positive credit balance, the award for each positive credit balance gaming device based on a percent contribution of the gaming device to the pool;

(xx) the award for each positive credit balance gaming device being also based on an associated one of the outcomes generated by the shared display;

(xxi) the outcomes being multiplier outcomes, one of which is generated by the shared display for each of the awards;

(xxii) the outcomes each being multiplier outcomes, a separate one of which is generated for each of the awards;

(xxiii) upon generation of the event, any percent contribution stored on one of the gaming devices, which does not currently have a credit balance is credited to the award of the base game in which the event occurred; and (xxiv) upon generation of the event, any percent contribution stored on one of the gaming devices, which does not currently have a credit balance is distributed to each of the gaming devices having a positive credit balance.

In a fourth primary embodiment, the gaming system of the present invention includes:

(i) a display shared by multiple gaming devices, the display including multiple outcomes, the display operable to provide a separate randomly generated outcome to each gaming device; and (ii) a processor operable with a random outcome generator to randomly generate one of the outcomes of the shared display for one of the gaming devices, wherein the outcome randomly generated also dictates which outcomes are generated for the remaining gaming devices.

Various alternatives of this fourth primary embodiment at least include:

(i) the outcomes of the shared display having a fixed spatial relationship with one another;

(ii) the multiple display devices located adjacent to the shared display; and (iii) the gaming devices each operable to provide a base game operable upon a wager.

In a fifth primary embodiment, the gaming system of the present invention includes:

(i) a random outcome generating shared display;

(ii) a first set of base game playing gaming devices located adjacent to the shared display and in position to be associated each with one of the outcomes of the shared display; and (iii) a second set of base game playing gaming devices located further away from the shared display than the first set of gaming devices and operable to be associated each with one of the outcomes of the shared display.

Various alternatives of this fifth primary embodiment at least include:

(i) the second set of gaming devices located further away from the shared display than the second set of gaming devices;

(ii) the second set of gaming devices provided in a configuration having a different shape than a shape of a periphery of the shared display; and (iii) the second set of gaming devices located elevationally higher than the first set of gaming devices.

In a sixth primary embodiment, the gaming system of the present invention includes:

(i) a display shared by multiple gaming devices, the shared display including multiple outcomes, the display operable to provide a separate randomly generated outcome to each gaming device; and (ii) a processor operable with a random outcome generator to randomly display an outcome of the shared display for each of the gaming devices, but wherein only those gaming devices participating in a game play involving the shared display receives the displayed outcome.

Various alternatives of this first primary embodiment at least include:

(i) the gaming system including a triggering event in the base games of the gaming devices that enables the gaming devices to participate in the game play involving the shared display; and (ii) the gaming devices each including an input device that enables a player to cause the gaming devices to participate in the game play involving the shared display.

In a seventh primary embodiment, the gaming system of the present invention includes:

(i) a random outcome generating shared display, the shared display generating a separate outcome for each of a plurality of gaming devices; and (ii) a video representation of the shared display generating the separate outcomes, wherein the plurality of gaming devices are located such that players playing the gaming devices can view the video representation of the shared display rather than the actual generation of the separate outcomes.

Various alternatives of this seventh primary embodiment at least include:

(i) the video representation being of a type selected from the group consisting of: a recorded video of the actual generation of the separate outcomes and a simulated video of the actual generation of the separate outcomes; and (ii) the plurality of gaming devices being a first plurality of gaming devices and which includes a second plurality of gaming devices located adjacent to the shared display and in a position to be associated with one of the outcomes of the actual generation of the display.

In an eighth primary embodiment, the gaming system of the present invention includes:

(i) a plurality of gaming devices each under control of:

(a) a processor and (b) a random outcome generator; and (ii) a random outcome generating shared display operable to generate a separate outcome for each of the plurality of gaming devices, the shared display operable with a separate random outcome generator.

Various alternatives of this eighth embodiment at least include:

(i) the shared display being also operable with a separate processor; and (ii) the gaming devices each including a dedicated (a) processor and (b) random outcome generator.

In a ninth primary embodiment, the gaming system of the present invention includes:

(i) a display shared by multiple gaming devices, the display including multiple outcomes, the display operable to provide a separate randomly generated outcome to each gaming device; and (ii) a random outcome generation scheme, wherein the outcomes of the display are placed into different groups, and wherein for activation of the display one of the groups is generated randomly and the outcomes from the generated group are displayed in association with the gaming devices.

Various alternatives of this ninth primary embodiment at least include:

(i) one of the outcomes of the generated group generated randomly to be in association with one of the gaming devices and the remaining gaming devices becoming associated randomly with other outcomes due to a fixed spatial relationship between the outcomes the generated group of outcomes; and (ii) the outcomes of at least two of the groups yielding overall different expected values.

In a tenth primary embodiment, the gaming system of the present invention includes:

(i) a display shared by multiple gaming devices, the display including multiple outcomes, the display operable to provide a separate randomly generated outcome to each gaming device, and wherein the outcomes on the shared display are fixed spatially with respect to one another; and (ii) a random outcome generation scheme that includes a separation of the gaming devices into different machine groups and a separation of the outcomes on the shared display into different outcome groups, and wherein for activation of the shared display, each of the machine groups is paired with one of the outcome groups for association of the outcomes with the gaming devices.

Various alternatives of this tenth primary embodiment at least include:

(i) each of the outcome groups having a fixed spatial relationship with each of the other outcome groups; and (ii) the outcomes of at least two of the outcome groups yielding overall different expected values.

In an eleventh primary embodiment, the gaming system of the present invention includes:

(i) a plurality of gaming devices; and (ii) a display shared by the gaming devices, the display operable to provide a separate randomly generated outcome to each gaming device, the shared display including multiple video monitors each operable to display at least one of the randomly generated outcomes.

In a twelfth primary embodiment, the gaming system of the present invention includes:

(i) a plurality of gaming devices each having a primary game operable upon a wager by a player;

(ii) a communication link between the gaming devices; and (iii) wherein portions of wagers made in the base games are contributed via the link to a pool, and wherein upon an event occurring in one of the base games an award from the pool is generated for each one of the gaming devices currently having a positive credit balance, the award for each positive credit balance gaming device based on a percent contribution of the gaming devices to the pool.

Various alternatives of this twelfth primary embodiment at least include:

(i) the gaming devices operating at least one game selected from the group consisting of: slot, poker, keno, blackjack, craps, bunco, checkers and any combination thereof;

(ii) the gaming devices each operating a same type of game;

(iii) the link being selected from the group consisting of: a local area network link, a wide area network link, an internet link and any combination thereof;

(iv) each of the gaming devices including a microprocessor that communicates with the link;

(v) the gaming system including a central server processor operable to communicate over the link with each of the gaming devices;

(vi) the award for each positive credit gaming device also based on an outcome generated by a random outcome display associated with the plurality of gaming devices;

(vii) the award for each positive credit gaming device also based on a separate outcome generated for each gaming device by a multi-outcome shared symbol generation display associated with the plurality of gaming devices;

(viii) upon generation of the event, any percent contribution stored on one of the gaming devices that does not currently have a credit balance being credited to the award of the base game in which the event occurred;

(ix) upon generation of the event, any percent contribution stored on one of the gaming devices that does not currently have a credit balance being distributed to each of the gaming devices having a positive credit balance;

(x) the gaming system including a video display generated over the link an outcome of which provides at least a basis upon which the award for each of the gaming devices is generated; and (xi) the gaming system including a video display generated by a processor within each one of the gaming devices, an outcome of which provides at least a basis upon which the award for each of the gaming devices is generated.

In a thirteenth primary embodiment, the gaming system of the present invention includes:

(i) a plurality of gaming devices each having a primary game operable upon a wager by a player;

(ii) a communication link between the gaming devices; and (iii) wherein a portion of a wager made in each base game is contributed to a pool maintained for each gaming device, and wherein upon an event occurring in one of the base games an award is generated for each gaming device currently being played, each award based on an amount contributed to the pool for the respective gaming device.

Various alternative embodiments of the thirteenth primary embodiment at least include:

(i) the gaming devices operating at least one game selected from the group consisting of: slot, poker, keno, blackjack, craps, bunco, checkers and any combination thereof;

(ii) the gaming devices each operating a same type of game;

(iii) the link selected from the group consisting of: a local area network link, a wide area network link, an internet link and any combination thereof;

(iv) each of the gaming devices including a microprocessor that communicates with the link;

(v) the gaming system including a central server processor operable to communicate over the link with each of the gaming devices;

(vi) the award for each positive credit gaming device also based on a multi-outcome shared symbol generation display associated with the plurality of gaming devices;

(vii) the award for each positive credit gaming device is also based on a separate outcome generated for each gaming device by a multi-outcome shared symbol generation display associated with the plurality of gaming devices;

(viii) the gaming system including a video display generated over the link an outcome of which provides at least a basis upon which the award for each of the gaming devices is generated;

(ix) the system including a video display generated by a processor within each one of the gaming devices, an outcome of which provides at least a basis upon which the award for each of the gaming devices is generated.

It should be appreciated that the above primary embodiments are not exhaustive. Other embodiments of the present invention are discussed above and below. Additionally, it should be understood that various changes and modifications to the described embodiments will be apparent to those skilled in the art. These changes and modifications can be made without departing from the scope of the present invention.

It is therefore an advantage of the present invention to provide a cooperative gaming device environment.

Another advantage of the present invention is to provide fun and exciting gaming device display.

A further advantage of the present invention is to provide a shared multi-outcome symbol display that simultaneously generates an individual outcome associated with each gaming device associated with the shared display.

Another advantage of the present invention is to provide a shared display that employs a queuing method that controls when (i) two or more players have triggered the bonus before the next shared display generation;

(ii) one or more players trigger the bonus during a current shared display generation; and (iii) one or more players has triggered the bonus but does not wish to take part in the next bonus spin and other similar overlapping bonus trigger occurrences.

Still another advantage of the present invention is to provide a shared display that employs a strategy of generating multiple outcomes randomly for multiple gaming devices from varied yet controlled outcome value pools.

Still a further advantage of the present invention is to provide a gaming environment in which multiple groups of gaming devices are located at different elevations and distances from the shared display of the present invention, wherein each gaming device of each group is associated with an outcome of a generation of the shared display.

Another advantage of the present invention is to provide multiple electromechanical embodiments for enabling players at a bank of gaming machines to see certain desired outcomes or all outcomes of a shared multi-outcome symbol display regardless of where the player is sitting or playing with respect to the location of the outcomes.

A further advantage of the present invention is to provide improved progressive-type games, wherein each participant of a linked system achieves a portion of an overall payout upon an event triggered by any one of the gaming devices of the system.

Another advantage of the present invention is to provide a player an award based on that player's machine's contribution towards an overall pool.

A further advantage of the present invention is to provide a player an award based on that player's machine's overall contribution to a pool as well as a shared multi-outcome symbol display.

A still further advantage of the present invention is to provide a player an award based on that player's machine's contribution to a pool maintained on the individual machine, which is triggered by any one of a plurality of linked machines.

Moreover, it is an advantage of the present invention to, in one embodiment, provide a shared bonus system in which one player's award does not negatively impact another player's award.

It is a further advantage of the present invention to, in one embodiment, provide a shared bonus system in which each participating player has an opportunity to win the largest available payout.

Additional features and advantages are described herein, and will be apparent from, the following Detailed Description and the figures.

BRIEF DESCRIPTION OF THE FIGURES

FIG. 23 is a chart summarizing the various states through which the individual gaming devices can pass while operating with the shared outcome display of the present invention, including associated messaging and lighting configurations.

DETAILED DESCRIPTION

The System Generally

Figure 1:
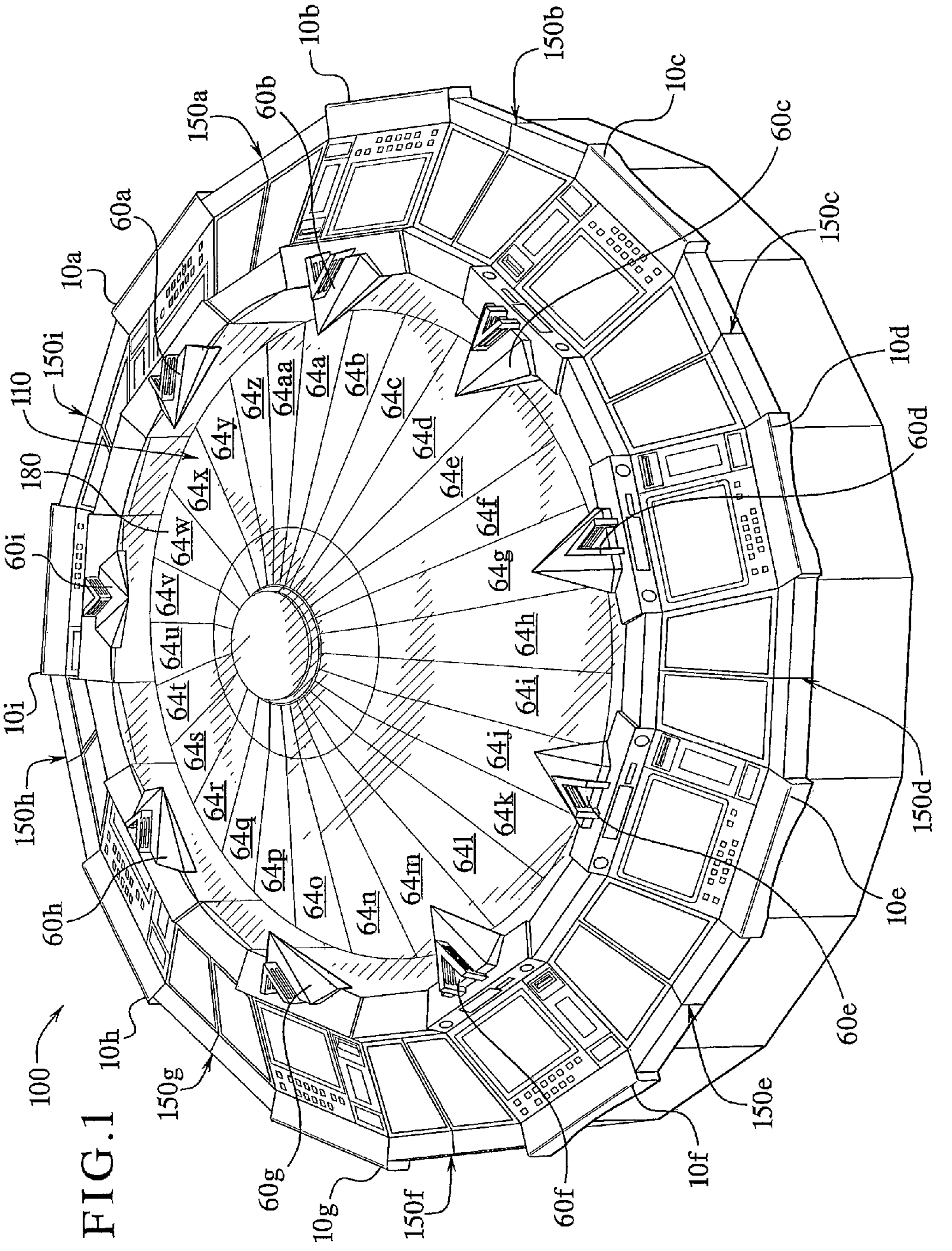
FIG. 1 is a top perspective view of one embodiment of a shared display and associated system of the present invention.

Referring now to the drawings and in particular to FIG. 1, one embodiment of the system 100 employing a shared multi-outcome symbol display ("shared display") 110 is illustrated. The primary components of system 100 include a plurality of individual gaming devices 10*a* to 10*i* (referred to herein collectively as gaming devices 10 or generally as gaming device 10). Gaming devices 10*a* through 10*i* are spaced apart about shared display 110 via spacer assemblies 150*a* to 150*i* (referred to herein collectively as spacer assemblies 150 or generally as spacer assembly 150). Shared display 110 includes a display top 180, which is viewable by each of the players playing gaming devices 10. Display top 180 is divided into a plurality of award, outcome or symbol panels 64*a* to 64*aa* (referred to herein collectively as panels 64 or generally as panel 64).

Each of the panels 64 displays one or more symbols representing an outcome such as an award, which any player of gaming devices 10 may win via bonus play. In the illustrated embodiment, the panels 64 and thus the values displayed thereon are fixed spatially with respect to one another. Thus, while two or more players may share in a same bonus event, each player playing the bonus is provided an individual outcome or award from a separate panel 64. It should also be appreciated from FIG. 1 that even if a player playing one of the gaming devices 10 is not participating in a particular bonus, the shared display 110 will still generate an outcome in association with the non-participating gaming device 10, increasing fun and excitement for players who have not even triggered the bonus. In the illustrated embodiment, each time the shared display is activated it generates an individual outcome for each gaming device in the system.

FIG. 1 also illustrates that each gaming device has indicators 60*a* to 60*i* (referred to herein collectively as indicators 60 or generally as indicator 60). Indicators 60 reside on the top of each gaming device 10 and point to or indicate one of the awards or outcomes on top 180 of shared display 110 when the shared display stops spinning to reveal randomly or otherwise generated results or outcomes. As discussed in detail below, indicators 60 are illuminated differently at different times or states for the gaming device 10. The illumination of the indicator in one embodiment depends upon whether the gaming device 10 is playing the base game, is in a state in which the player is eligible to play the shared display bonus, is in a state in which the player has committed to play the shared display bonus or is in a state in which the player has declined to play a particular upcoming shared display bonus, as well as other states discussed below.

The following description will describe each of the above primary components of gaming system 100 in detail, describe other components and the functionality of each component. Apparatus and control architecture for organizing the myriad of different game state and bonus state possibilities and combinations thereof that occur from play of the gaming system are also discussed in detail. Multiple embodiments for the shared display 110 are provided. Also, various features making the gaming system of the present invention modular and efficient to transport and implement in a casino are discussed. Further, the shared display concept of system can be expanded to include remote gaming, award pools and progressive play as discussed below or otherwise.

The Individual Gaming Devices Generally

Figure 2:
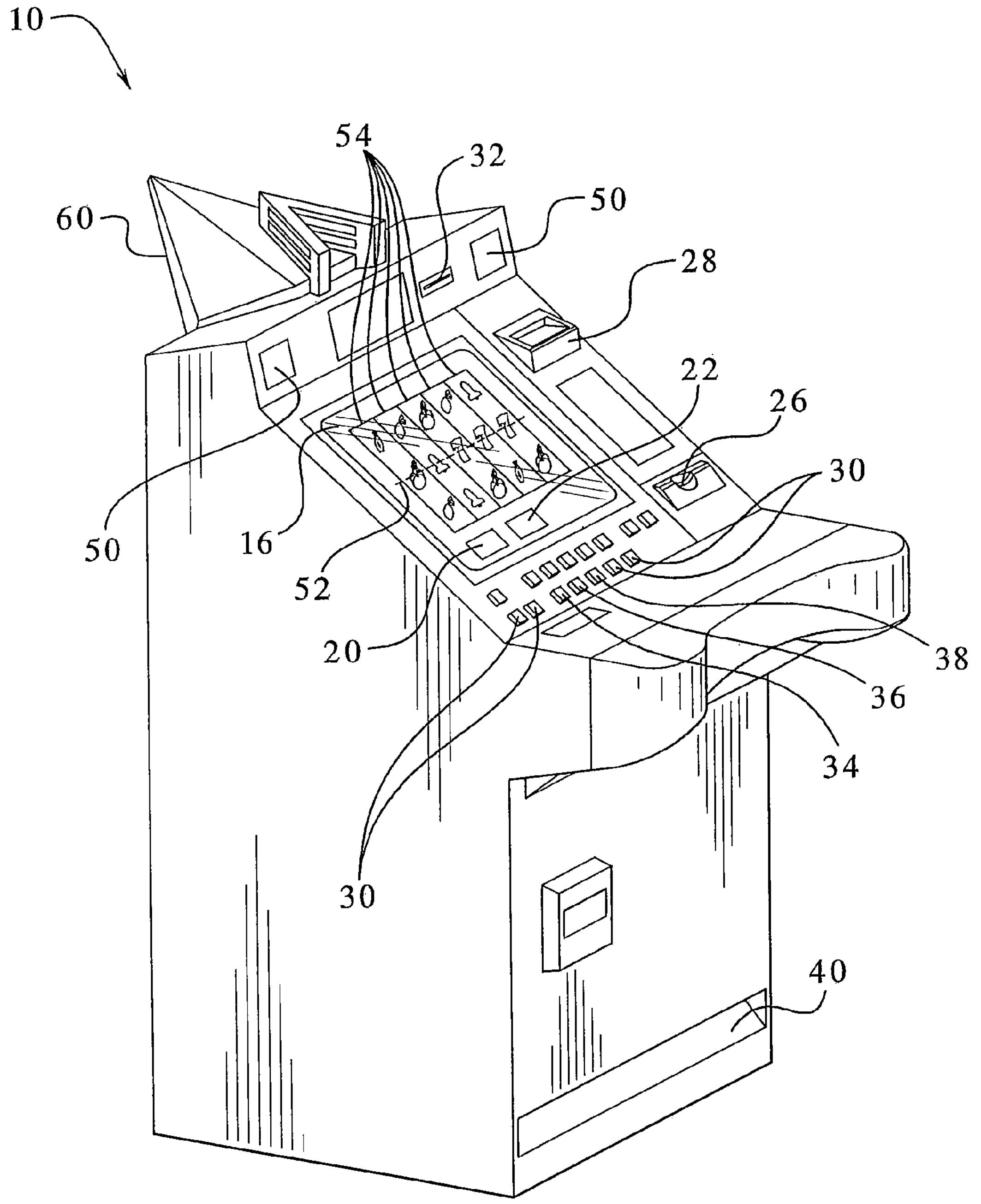
FIG. 2 is a perspective view of one embodiment of a slot machine or gaming device suitable for use in the shared display system of FIG. 1.

Referring now to FIG. 2, one embodiment of a base gaming device that can be employed in the shared display system or the gaming system of the present invention is illustrated as gaming device 10. As discussed below, the present invention provides a system using a shared display that simultaneously generates individual outcomes which may be fixed relative to each other for each of a plurality of gaming devices 10. FIG. 2 illustrates features common to each of the gaming devices.

Figure 18:
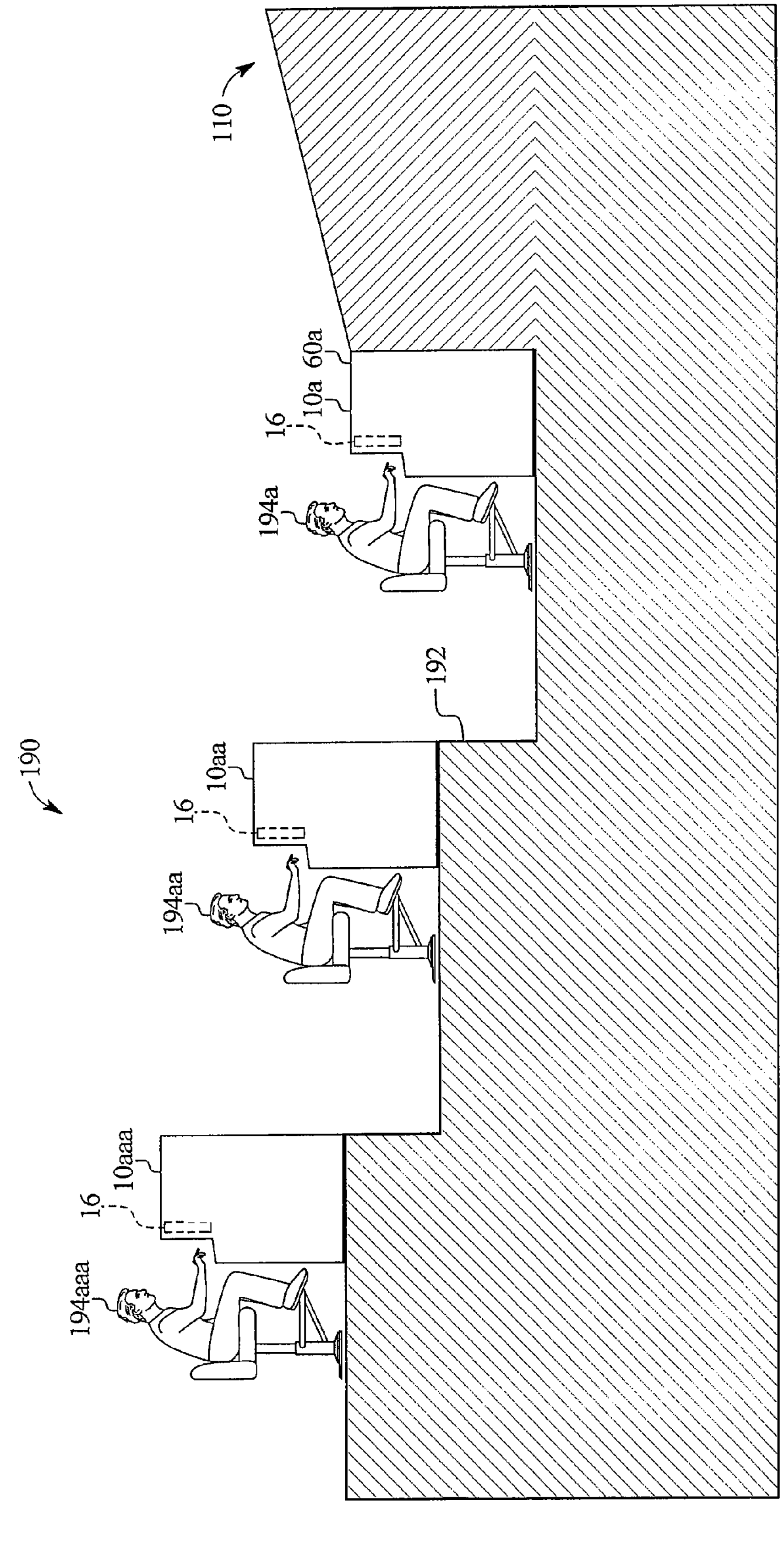
FIG. 18 is a diagrammatic side elevation view of an area of a gaming environment having multiple groups of gaming devices, each group operable with and able to view a shared outcome display of the present invention.

In one embodiment, gaming device 10 has a support structure, housing or cabinet which provides support for a plurality of displays, inputs, controls and other features of a conventional gaming machine. In the illustrated embodiment, the player plays gaming device 10 while sitting, however, the gaming device is alternatively configured so that a player can operate it while standing or sitting. The illustrated gaming device 10 is positioned on the floor (or on an elevated platform as seen in FIG. 18) but can be positioned alternatively (i) on a base or stand, (ii) as a pub-style table-top game (e.g., where the participant gaming devices are located remotely from the shared wheel as discussed below), (iii) as a stand-alone gaming device on the floor of a casino with other stand-alone gaming devices, which the player operates while standing or sitting (e.g., where the participant gaming devices are located remotely from the shared wheel as discussed below), or (iv) in any other suitable manner. While FIG. 2 shows one preferred cabinet, gaming device 10 can be constructed with varying cabinet and display configurations.

Figure 3A:
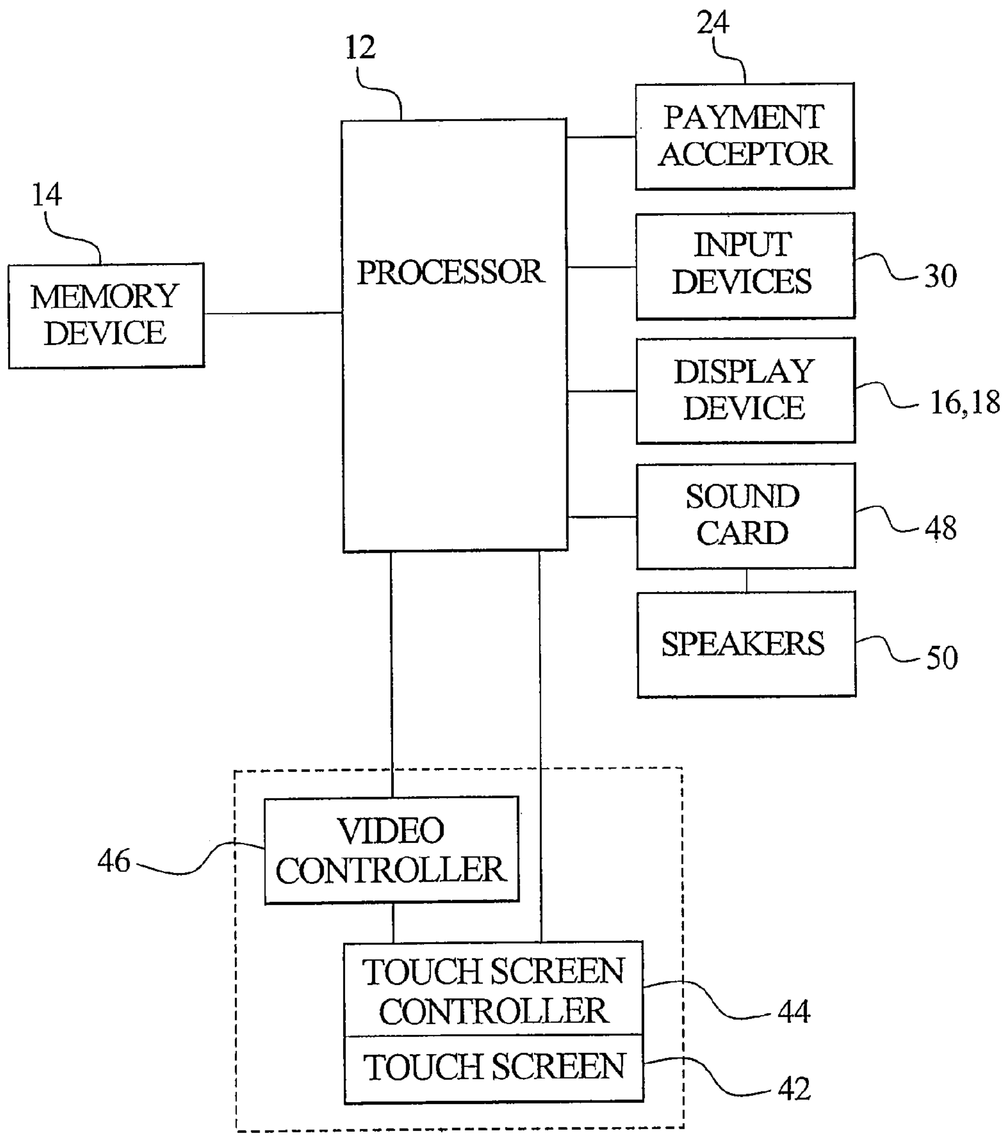
FIG. 3A is a schematic block diagram of one embodiment of the electronic configuration for each of the individual gaming devices.

Referring also to an embodiment for the electronic configuration of gaming device 10 in FIG. 3A, each gaming device preferably includes at least one processor 12, such as a microprocessor, a microcontroller-based platform, a suitable integrated circuit or one or more application-specific integrated circuits (ASIC's). Processor 12 is in communication with or operable to access or to exchange signals with at least one data storage or memory device 14. In one embodiment, processor 12 and memory device 14 reside within the cabinet of the gaming device. Memory device 14 stores program code and instructions, executable by processor 12, to control the gaming device. Memory device 14 also stores other data such as image data, event data, player input data, random or pseudo-random outcome generators, pay-table data or other operating data, information and applicable game rules that relate to the play of the gaming device. In another embodiment, memory device 14 includes random access memory (RAM). In one embodiment, memory device 14 includes read only memory (ROM). In a further embodiment, memory device 14 includes flash memory and/or EEPROM (electrically erasable programmable read only memory). Any other suitable magnetic, optical, semiconductor and/or other memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. Processor 12, memory device 14 and other related components are collectively referred to herein as a "brain box."

In one embodiment, as discussed in more detail below, each gaming device randomly generates awards and/or other game outcomes based on probability data. That is, each award or other game outcome is associated with a probability and each gaming device generates the award or other game outcome to be provided to the player based on the associated probabilities. In this embodiment, since each gaming device generates outcomes randomly or based upon a probability calculation, there is no certainty that the gaming device will provide the player with any specific award or other game outcome.

In another embodiment, as discussed in more detail below, each gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

As illustrated in FIG. 3A, each gaming device 10 in one embodiment includes one or more display devices controlled by processor 12. The display devices are preferably connected to or mounted to the cabinet of the gaming device. FIG. 2 illustrates that gaming device 10 includes a central display device 16, which displays a primary game. This display device may also display any suitable secondary game associated with the primary game as well as information relating to the primary or secondary game and the shared display or shared wheel of the present invention. When gaming device 10 is provided in a stand-alone format, e.g., when the gaming device is located remote from the shared display or shared wheel of the present invention, gaming device 10 can provide display device 16 as a first display or monitor, e.g., primary game display and a second display device, e.g., a simulated or electromechanical wheel, to display bonus game outcomes.

The display devices may include, without limitation, a monitor, a television display, a plasma display, a liquid crystal display ("LCD"), a display based on light emitting diodes ("LED") or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display device(s) of each gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which moves one or more mechanical objects, such as one or more mechanical rotatable wheels, reels or dice, configured to display at least one and preferably a plurality of games or other suitable images, symbols or indicia.

As seen in FIG. 2, in one embodiment, gaming device 10 includes a credit display 20 that displays a player's current number of credits, cash, account balance or the equivalent. In one embodiment, gaming device 10 includes a bet display 22 that displays a player's amount wagered. As illustrated in FIG. 3A, in one embodiment, each gaming device 10 includes at least one payment acceptor 24 that communicates with processor 12.

As seen in FIG. 2, the payment acceptor in one embodiment includes a coin slot 26, where the player inserts coins or tokens, and a ticket, note or bill acceptor 28, where the player inserts a bar-coded ticket, note, or cash. In one embodiment, a player-tracking card, credit card, debit card or data card reader/validator 32 is also provided for accepting any of those or other types of cards.

In one embodiment, a player inserts an identification card into card reader 32 of gaming device 10. The identification card can be a smart card having a programmed microchip or a magnetic strip coded with a player's identification, credit totals and other relevant information. In one embodiment, money may be transferred to gaming device 10 through an electronic fund transfer and card reader 32 using the player's credit, debit or smart card. When a player funds gaming device 10, processor 12 determines the amount of funds entered and the corresponding amount is shown on the credit or other suitable display as described above.

As seen in FIGS. 2 and 3A, in one embodiment each gaming device 10 includes at least one and preferably a plurality of input devices 30 in communication with processor 12. Input devices 30 can include any suitable device, which enables the player to produce an input signal sent to processor 12. In one embodiment, after appropriate funding of gaming device 10, the player presses a play button 34 or pull arm (not illustrated) to start any primary game or sequence of events. In one embodiment, upon appropriate funding, gaming device 10 begins game play automatically. In another embodiment, the player needs to actuate or activate one of the play buttons to initiate play of gaming device 10.

As shown in FIG. 2, a bet one button 36 is provided. The player places a bet by pushing bet one button 36. The player increases the player's wager by one credit each time the player pushes bet one button 36. When the player pushes the bet one button 36, the number of credits shown in the credit display 20 decreases by one, and the number of credits shown in the bet display 22 increases by one. A max bet max button (not shown) can also be provided, which enables the player to bet the maximum wager (e.g., max lines and max wager per line). Gaming device 10 may include other suitable wager buttons 30, such as a max bet button, a repeat bet button, one or more select paylines buttons and one or more select wager per payline buttons.

In one embodiment, a cash out button 38 is provided. The player presses cash out button 38 and cashes out to receive a cash payment or other suitable form of payment corresponding to the number of remaining credits. The player can receive coins or tokens in a coin payout tray 40 or a ticket or credit slip, which are redeemable by a cashier or funded to the player's electronically recordable identification card.

As seen in FIG. 3A, a touch-screen 42 is provided in one embodiment and operates with a touch-screen controller 44, processor 12 and display device 16. Touch-screen 42 and the touch-screen controller 44 are also connected to a video controller 46. The player touches touch-screen 42 at appropriate places to input decisions and signals into processor 12 of gaming device 10.

Each gaming device 10 also includes one or a plurality of communication ports for enabling communication of processor 12 with one or more external peripherals, such as external video sources, expansion buses, expansion games or other displays, an SCSI port or a key pad.

In one embodiment, as seen in FIG. 3A, each gaming device 10 includes a sound generating device controlled by one or more sounds cards 48, which function in conjunction with processor 12. In one embodiment, the sound generating device includes at least one speaker 50 or other sound generating hardware and/or software for generating sounds, such as playing music for the primary and/or secondary game or for other modes of the gaming device, such as an attract mode. In one embodiment, each gaming device 10 provides dynamic sounds coupled with attractive multimedia images displayed on display device 16 to provide an audio-visual representation or to otherwise display full-motion video with sound to attract players to gaming device 10. During idle periods, the gaming device 10 displays a sequence of audio and/or visual attraction messages to attract potential players to gaming device 10. The videos in one embodiment are customized to provide information concerning the shared display of the present invention as discussed below.

In one embodiment, gaming device 10 includes a camera in communication with processor 12, which is positioned to acquire an image of a player playing gaming device 10 and/or the surrounding area of gaming device 10. In one embodiment, the camera may be configured to selectively acquire still or moving (e.g., video) images and may be configured to acquire the images in either an analog, digital or other suitable format. Display device 16 may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Each gaming device 10 incorporates a suitable wagering primary or base game. The primary or base game may comprise any suitable reel-type game, card game, number game or other game of chance that can be represented in an electronic or electromechanical, which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIG. 2, the base or primary game includes a slot game with one or more paylines 52. Paylines 52 may be horizontal, vertical, circular, diagonal, angled or any combination thereof. For a slot game, gaming device 10 displays at least one reel and preferably a plurality of reels 54, such as three to five reels, in either electromechanical form with mechanical rotating reels or in video form with simulated reels and movement thereof. Each reel 54 displays a plurality of indicia such as bells, hearts, fruits, numbers, letters, bars or other images which preferably correspond to a theme associated with the gaming device. With a slot game, gaming device 10 awards prizes when reels 54 stop spinning and display a winning or paying symbol or combination of symbols on an active payline 52.

In one embodiment, the base or primary game is a poker game, wherein gaming device 10 enables the player to play a conventional game of video poker and, e.g., initially deals five cards, all face up, from a virtual deck of fifty-two cards. If the player wishes to draw, the player selects the cards to hold by using one or more input devices 30, such as pressing related hold buttons or touching a corresponding area on touch-screen 42. After the player presses a deal button, processor 12 of gaming device 10 removes the unwanted or discarded cards from display device 16 and deals replacement cards from the remaining cards in the deck. This results in a final five-card hand. Processor 12 of gaming device 10 compares the final five-card hand to a payout table, which in one embodiment uses conventional poker hand rankings to determine whether a winning hand has occurred. In one embodiment, the player is paid based on the winning hand and the credits wagered.

In another embodiment, the base or primary game is a multi-hand version of video poker. In this embodiment, the player is dealt at least two hands of cards. In one such embodiment, the cards in all of the dealt hands are the same cards. In one embodiment, each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In a further alternative embodiment, the base or primary game is a keno game, in which gaming device 10 displays a plurality of selectable indicia or numbers on at least one of the display devices. In this embodiment, the player uses an input device 30 or touch-screen 42 to select at least one and preferably a plurality of the selectable indicia or numbers. Gaming device 10 then displays a series of drawn numbers to determine an amount of matches, if any, between the player's selected numbers and the gaming device's drawn numbers. The player is provided an award, if any, based on the amount of determined matches. The base or primary game may also be any suitable bingo type game.

As illustrated in detail below, in addition to winning credits in a base or primary game, the gaming devices also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces an additional level of player excitement than the base or primary game and provides a greater expectation of winning than the base or primary game. As shown below, the bonus game, bonus, bonus event or bonus round of the present invention includes a shared display, shared outcome display or shared wheel in one embodiment.

The present invention includes a shared outcome display discussed in more detail below, which constitutes one bonus game for gaming devices 10. Additionally, each gaming device 10 can play one or more additional individual bonus games or secondary games alone or in combination with the shared wheel bonus game. The gaming devices each include a program code that causes processor 12 of gaming device 10 to automatically begin a bonus round or a bonus game when a player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels 54 along a payline 52 as seen in FIG. 2. In another embodiment, the triggering event or qualifying condition may be triggered by exceeding a certain amount of game play (number of games, number of credits, amount of time), earning a specified number of points during game play or as a random outcome or award.

In one embodiment, the shared wheel bonus requires no separate wager or buy-in from the player. That is, a player does not have to purchase an entry into the shared wheel bonus game. The player instead wins or earns entry through play of the primary game, thereby encouraging play of the primary game. In another embodiment, qualification of the bonus or secondary game could be accomplished through a simple "buy-in" by the player if, for example, the player has been unsuccessful at qualifying for the bonus game through other specified activities.

The present invention also includes a particular designated level or type of wager be made to make the player eligible to play the shared wheel bonus game of the present invention. For example, the gaming devices 10 can require the player to wager maximum payline or maximum bet for the player to be eligible to play the shared wheel bonus game. In one embodiment, the requirements and odds of entering the shared wheel bonus game are the same for each associated gaming device 10. Thus no particular associated gaming device 10 has an advantage over or is desirable with respect to any other gaming device 10.

Network Systems

Figure 3B:
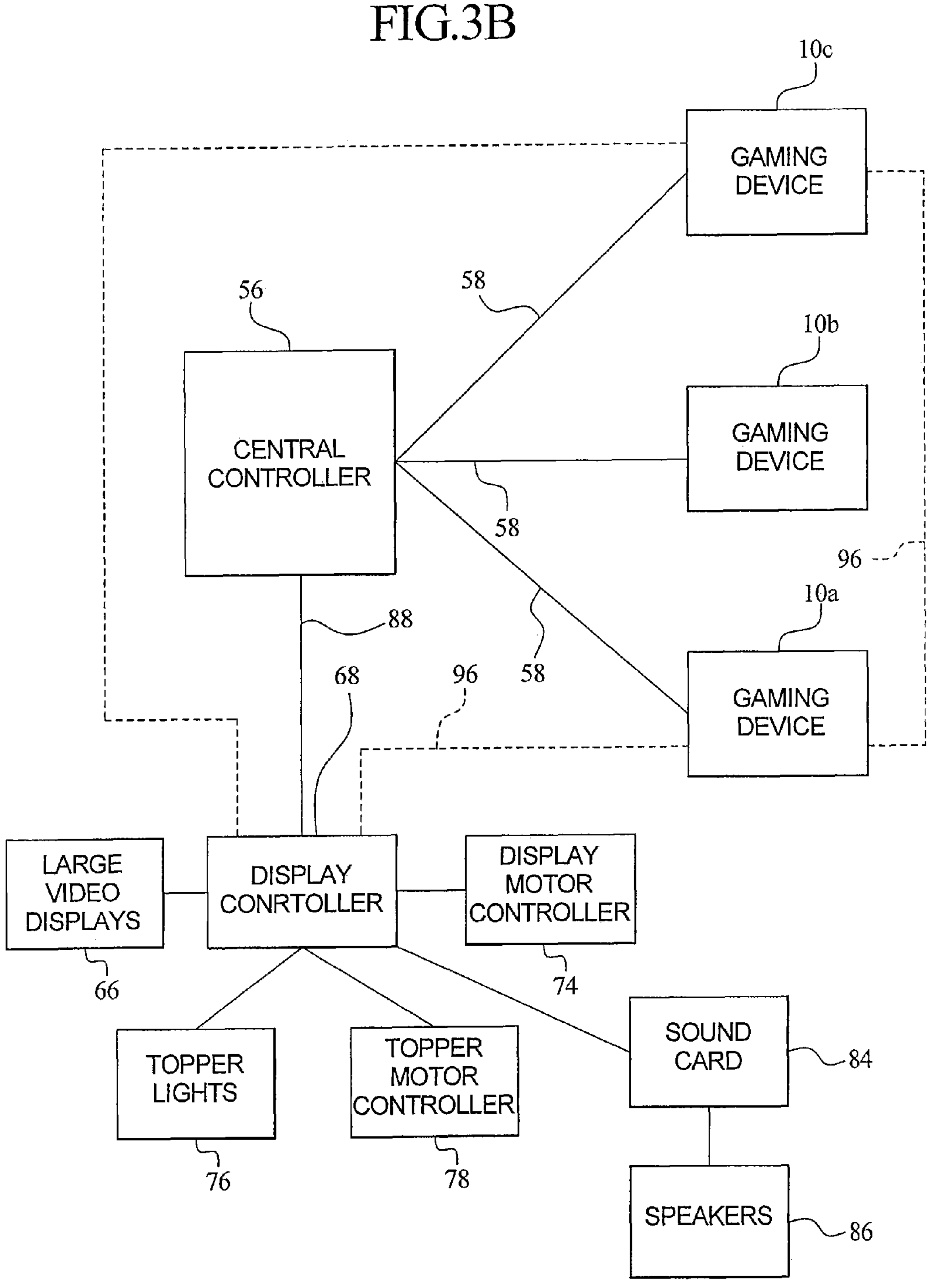
FIG. 3B is a schematic block diagram of one embodiment of the electronic configuration for the shared display system of the present invention.

Referring now to FIG. 3B, one or more of the gaming devices 10 of the present invention may be connected to a data network or a remote communication link 58 with some or all of the functions of each gaming device 10 provided at a central location such as a central server or central controller 56. More specifically, processor 12 of each gaming device 10 may be designed to facilitate transmission of signals between the individual gaming device 10 and the central server or controller 56.

In one embodiment, the game outcome provided to the player is determined by a central server or controller 56 and provided to the player at the gaming device of the present invention. In this embodiment, each of a plurality of such gaming devices is in communication with the central server or controller 56. Upon a player initiating game play at one of the gaming devices, the initiated gaming device communicates a game outcome request to the central server or controller 56.

In one embodiment, the central server or controller 56 receives the game outcome request and randomly generates a game outcome for the primary game based on probability data. In another embodiment, the central server or controller 56 randomly or otherwise generates a game outcome for the secondary game or shared display bonus based on probability data. In another embodiment, the central server or controller 56 randomly generates a game outcome for both the primary game and the secondary game or shared display bonus based on probability data. In this embodiment, the central server or controller 56 is capable of storing and utilizing program code or other data similar to processor 12 and memory device of gaming device 10.

In an alternative embodiment, the central server or controller 56 maintains one or more predetermined pools or sets of predetermined game outcomes. In this embodiment, the central server or controller 56 receives the game outcome request and independently selects a predetermined game outcome from a set or pool of game outcomes. The central server or controller 56 flags or marks the selected game outcome as used. Once a game outcome is flagged as used, it is prevented from further selection from the set or pool and cannot be selected by the central controller or server upon another wager. The provided game outcome can include a primary game outcome, a secondary game outcome or shared display bonus outcome, primary and secondary game outcomes, or a series of game outcomes, such a free game outcomes.

The central server or controller 56 communicates the generated or selected game outcome to the initiated gaming device. Gaming device 10 receives the generated or selected game outcome and provides the game outcome to the player. In an alternative embodiment, how the generated or selected game outcome will be presented or displayed to the player, such as a reel symbol combination of a slot machine or a hand of cards dealt in a card game, is also determined by the central server or controller 56 and communicated to the initiated gaming device 10 to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more gaming devices 10 of the present invention are in communication with a central server or controller 56 for monitoring purposes only. That is, each individual gaming device 10 randomly generates game outcomes to be provided to the player and the central server or controller 56 monitors the activities and events occurring on the plurality of gaming devices. In one embodiment, the gaming network includes a real-time or an on-line accounting and gaming information system operably coupled to the central server or controller 56. The accounting and gaming information system of this embodiment includes a player database for storing player profiles, a player tracking module for tracking players and a credit system for providing automated casino transactions.

In the system of the present invention, a plurality of gaming devices 10 are connected to a data network. In one embodiment, the data network is a local area network (LAN), in which one or more of the gaming devices are substantially proximate to each other and an on-site central server or controller 56 as in, for example, a gaming establishment or a portion of a gaming establishment. In another embodiment, the data network is a wide area network (WAN) in which one or more of gaming devices 10 is in communication with at least one off-site central server or controller 56. Here, the plurality of gaming devices 10 may be located in a different part of the gaming establishment or within a different gaming establishment than the off-site central server or controller 56. Thus, the WAN may include an off-site central server or controller 56 and an off-site gaming device 10 located within gaming establishments in the same geographic area, such as a city or state. The WAN gaming system of the present invention may be substantially identical to the LAN gaming system described above, although the number of gaming devices 10 in each system may vary relative to each other.

In another embodiment, the data network is an internet or intranet. In this embodiment, the operation of gaming device 10 can be viewed at gaming device 10 with at least one internet browser. In this embodiment, operation of gaming device 10 and accumulation of credits may be accomplished with only a connection to the central server or controller (the internet/intranet server or web server) through a conventional phone or other data transmission line, digital signal line (DSL), T-1 line, coaxial cable, fiber optic cable, wireless, Ethernet, gateway or other suitable connection. Here, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices 10 at one or more gaming sites are networked to a central server in a progressive configuration. Here, a portion of each wager needed to initiate a base or primary game is allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices 10 distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to and receive information from the host site computer. Each central server computer is responsible for all data communication between the gaming device hardware and software and the host site computer.

One electronic configuration for the shared displays of the present invention is discussed below in connection with bonus server 170 and FIGS. 3C and 13. In general, FIG. 3C includes a central bonus server 170 that is mounted in one of the spacer assemblies located between two of the gaming devices that operate with the shared display of the present invention. Bonus server 170 controls many of the same components as does the display controller 68 of FIG. 3B.

Figure 3C:
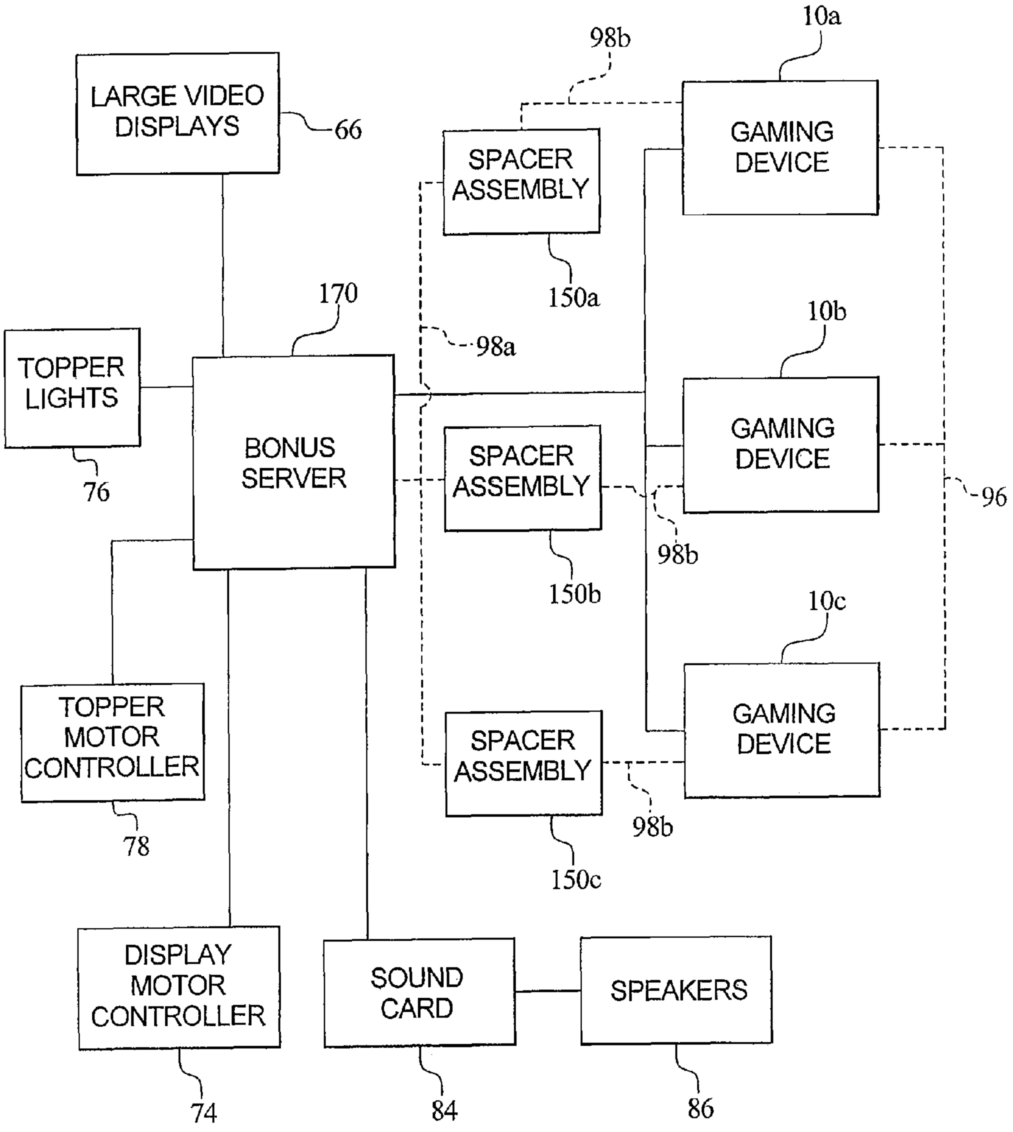
FIG. 3C is a schematic block diagram of another embodiment of the electronic configuration for the shared display system of the present invention.
Figure 3D:
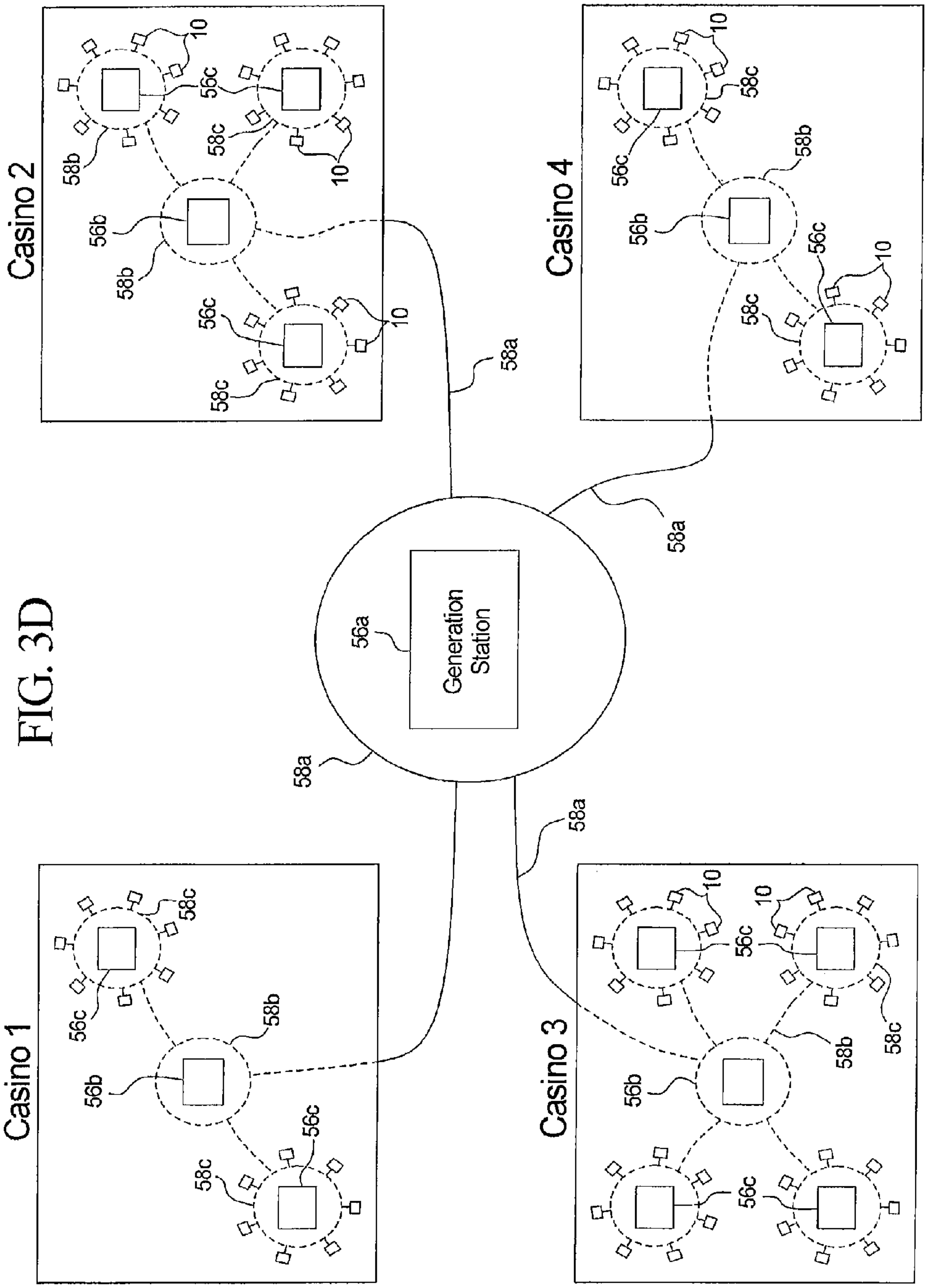
FIG. 3D is a schematic view of one embodiment of a combination wide area network ("WAN") and local area network ("LAN") employed with the shared outcomes of the present invention.

Referring now to FIG. 3D, one embodiment of a networking system is illustrated that can span multiple casinos, e.g. 1 to 4, in the same city, multiple cities or in different parts of the world. FIG. 3D includes a central generation station 56*a*. Central generation station communicates with central controllers 56*b* within each casino or gaming establishment 1 to 4 via communication link 58*a*, which is any suitable type of wide area network link, such as an internet. Central casino controllers 56*b* in turn communicate with a central controller 56*c* for each bank of games illustrated below in connection with FIGS. 4A to 9B. Alternatively, central casino controllers 56*b* communicate with the serial link 96 shown above in connection with FIG. 3B for each bank of gaming machines.

Central casino controllers 56*b* communicate with the shared multi-outcome symbol display controllers 56*c* via an intermediate casino network 58*b*. Intermediate network 58*b* is a local area network, such as a fiber optic network. The bank controllers 56*c* in turn communicate with the associated gaming devices 10, e.g., with processors 12 thereof. A communication link 58*c* between the local controllers 56*c* and the gaming devices 10 is provided which is a fiber optic network in one embodiment.

FIG. 3D illustrates that a single generation such as a random generation, which can include a plurality of outcomes as shown below in FIGS. 4A to 9B, can be communicated very quickly from central generation station 56*a* to each of the gaming devices 10 located in multiple casinos and at multiple remote locations from central generation station 56*a*.

In certain embodiments described below, the individual gaming devices 10 are not coupled together spatially via shared display 110. That is, the outcome generated by generation station 56*a* for a gaming device is communicated directly to that individual gaming device 10 via the series of networks 58*a* to 58*c*. The outcomes are then displayed on the individual monitors 16 of the gaming devices 10. In such cases, local controllers 56*c* and local networks 58*c* may be eliminated.

Local Control of Shared Display

Any of the embodiments for the shared displays described below can be controlled according to the embodiments illustrated in FIGS. 3A to 3D. As illustrated in FIG. 3A, each gaming device 10 includes a processor 12. The processor 12 in each gaming device 10 is then linked to a server computer or central controller 56 via a communication link 58 as described above in connection with FIG. 3B. As further seen in FIG. 3B, the central controller 56 in turn controls a shared multi-outcome symbol display controller 68. Display controller 68 controls such things as the one or more large video displays 66 and one or more motors or motion producing devices driving shared display 110.

Display controller 68 also controls the topper lights 76 and a separate topper motor controller 78, for example, when the game recognition portion of the topper rotates independent from the display motor controller 74. Display controller 68 can include an onboard sound chip or alternatively communicate with a separate sound card 84. In either case, each of the game-linking systems of the present invention have in one embodiment a separate set of speakers 86 from the speakers 50 of the gaming devices 10 to produce separate audio. In one embodiment, display controller 68 communicates via link 88 with central controller 56 through any of the modes described above for link 58. As seen, display controller 68 is an additional spoke along with gaming devices 10*a* to 10*c* from central hub or controller 56.

In an alternative embodiment illustrated by the dashed serial link 96, display controller 68 is linked serially or in a daisy chain with gaming devices 10*a*, 10*b*, 10*c*, etc. Here, the gaming devices communicate with each other and display controller 68 via the serial link 96, in which each gaming device 10 as well as display controller 68 has a separate and distinct address along loop 96. It should be appreciated that links 88 and 96 can be any type of local area link, wide area link, T-1 line, microwave link, radio frequency link, a fiber-optic link, cable linkage, digital satellite link, internet link and any suitable combination thereof.

Remote Control of the Shared Display

As discussed above in connection with FIGS. 3B and 3D, any of the shared displays described thus far can be controlled and operated from a remote location, the results of which are displayed at one or more desired places within one or more casinos or gaming establishments. For example, a central controller can generate the outcome or outcomes and distribute a display of those outcomes to multiple banks of gaming devices, wherein those banks can include an intermediate central controller, such as controller 56, which then downloads the information (i) to the display devices 16 of individual gaming devices 10, (ii) to one of the electromechanical outcome displays 110, or (iii) to a large display 66 associated with a bank of gaming devices.

Shared Multi-Outcome Symbol Display Embodiments

Referring now to FIGS. 4A through 9B, various embodiments of a shared multi-outcome symbol display are illustrated as shared displays 110*a*, 110*b*, 110*c*, 110*d*, 110*e* and 110*f*, respectively (referred to herein collectively as shared displays 110 and generally as shared display 110). Each of the embodiments shown in FIGS. 4A to 9B includes a number of shared features or apparatuses. Each of the embodiments includes a plurality of gaming devices 10*a* to 10*l*, which are spatially related or positioned with respect to one another. While the illustrated embodiments show gaming devices 10*a* to 10*l* positioned substantially around the perimeter of a circle, the present invention is not limited to any particular geometry and can have any suitable shape or pattern desired by the game implementers. For example, instead of the illustrated circular shape or pattern, gaming devices 10*a* to 10*l* can alternatively be positioned in an oval, square, rectangular, triangular, diamond-shape, elliptical, or other suitable shape, portions thereof (e.g., semicircular) or pattern as desired.

Each of the embodiments shown in FIGS. 4A to 9B includes a shared display 110 shown in connection with a respective system 100*a*, 100*b*, 100*c*, 100*d*, 100*e* and 100*f* (referred to herein collectively as systems 100 and generally as shared display 100). Shared displays 110*a*, 110*b*, 110*c*, 110*d* and 110*f* each include a rotatable substantially horizontally disposed wheel operable to rotate about a substantially vertically disposed axis (Shared display 110*e* is vertically disposed). The shared displays alternatively can include any suitable mechanical, electromechanical or simulated display.

The illustrated displays 110 have values 62 represented by numeric symbols displayed within each respective section, panel or demarcation 64 which are fixed spatially with respect to each of the other values 62 within their respective sections 64 of the shared display. In FIG. 4B for example, the value one hundred currently indicated by gaming device 10*e* is positioned to the right of value eighty and to the left of value forty. In one embodiment, that spatial relationship as well as the entire display of values 62 remains constant regardless of where the shared display 110 stops with respect to the fixed gaming devices 10*a* to 10*l*.

In an alternative embodiment, panels or demarcations 64 are each provided with a separate video monitor that can display values. Here, the shared display does not have to rotate, instead, the video monitors each show a simulated generated outcome. Even though the outcomes displayed are simulated, the outcomes can be programmed and generated to have a fixed spatial relationship to one another, as do the shared mechanical displays 110.

It should be appreciated that the shared displays 110 can (i) be video displays, such as liquid crystal display ("LCD") displays, (ii) be electromechanical displays, (iii) be mechanical displays or (iv) have video components and electromechanical or mechanical components. While the relationships between values 62 are spatially fixed in one embodiment, it is also possible that the values 62 within any one or more or all of the sections or panels 64 can change or be generated in another manner such as randomly before, during or after the activation of shared displays 110. For example (i) the value 62 within one panel 64 changes; (ii) the values 62 within panels 64 remain fixed for a period of time but change periodically; (iii) the values 62 within panels 64 change during the random generation of display 110; or (iv) the values 62 within panels 64 change in lieu of a spinning of the shared wheel.

As illustrated, values 62 and value areas 64 are common for each of the shared displays 110 of banks or systems 100. In those embodiments, each of the gaming devices 10*a* to 10*l* includes an associated indicator 60*a* to 60*l*, respectively. Indicators 60*a* to 60*l* indicate visually and/or audibly to the player of a gaming device and to other players playing the other gaming devices, which outcome has ultimately been generated for the player. As discussed in more detail below, while each player may not receive an award from the activation of the shared displays 110, in one embodiment, the displays nevertheless simultaneously generate individual outcomes for each gaming device or machine. In that way, the gaming experience is made more fun and exciting because each player can see what the player would have won if the player had been eligible for an award or participating in the bonus event.

Figure 4A:
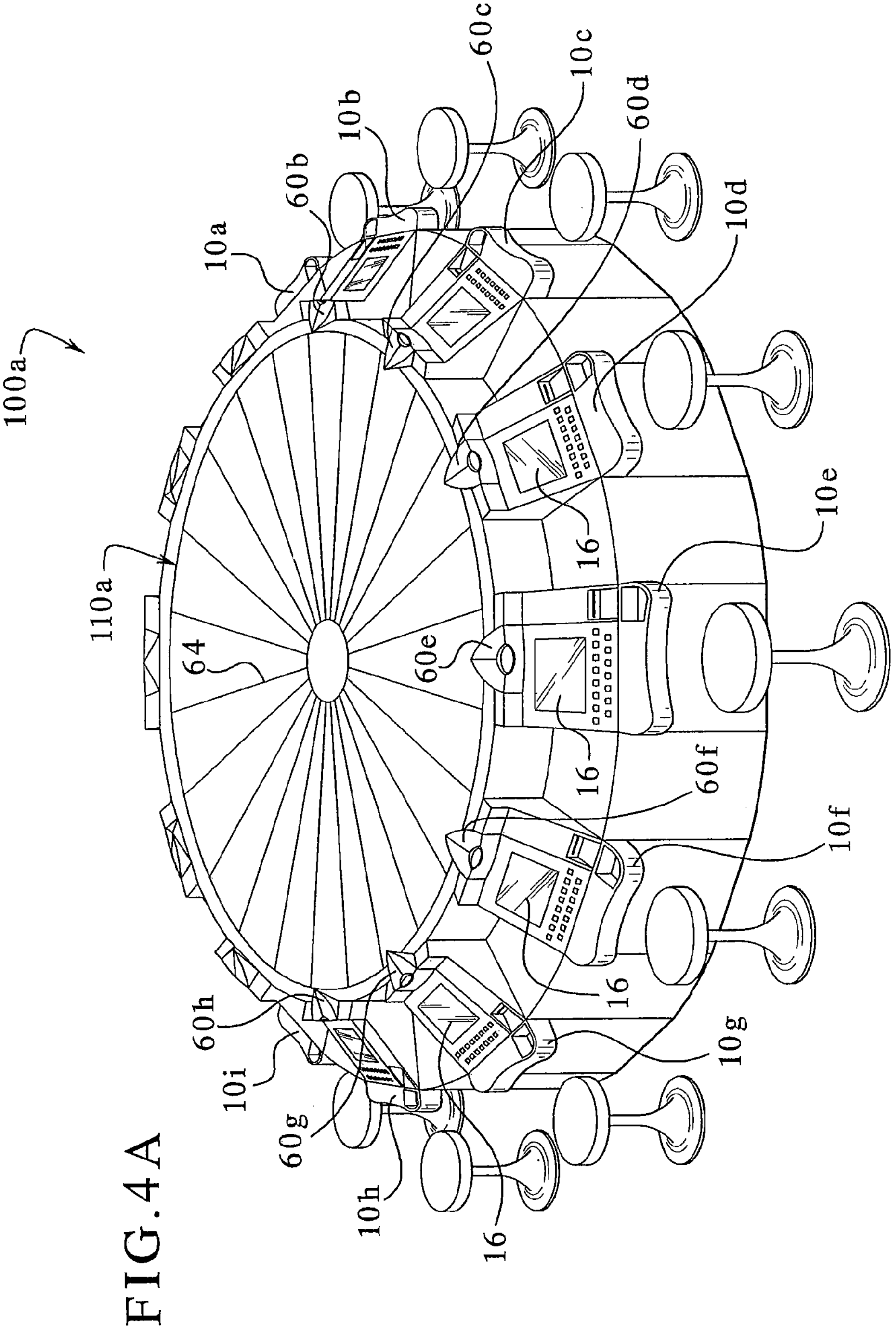
FIGS. 4A and 4B are perspective and plan views, respectively, of one embodiment of the shared display and associated gaming devices of another embodiment of the present invention.
Figure 4B:
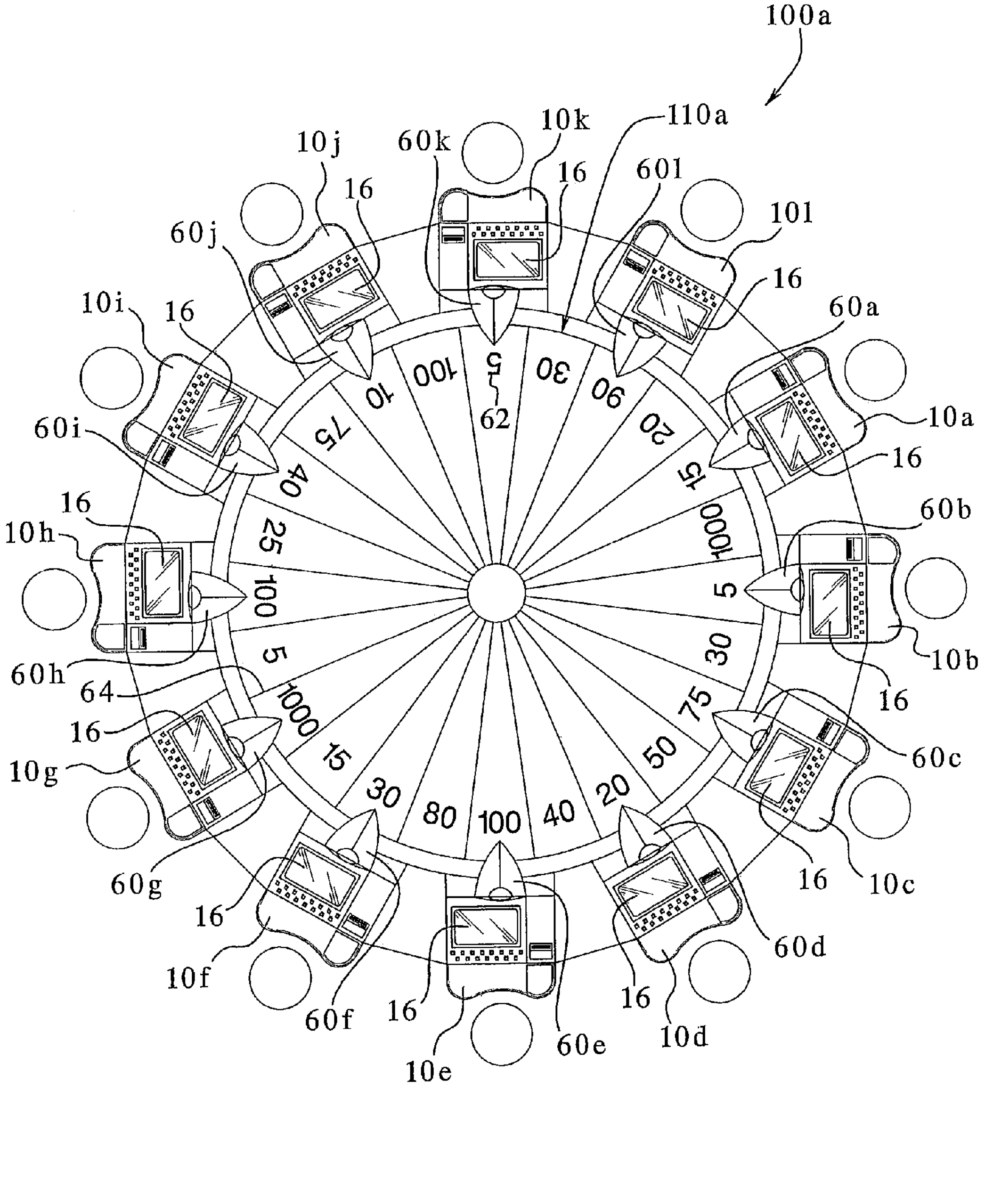

The system 100*a* of FIGS. 4A and 4B illustrates a shared display 110*a*, which is relatively flat. Alternatively, the display can curve or extend downward or slightly downward. Display 110*a* enables each player to see the outcome or result of a symbol generation of shared display 110*a*. The shape or profile of shared display 110*a* is such that a player sitting at gaming device 10*e*, for example, can see each individual outcome obtained by gaming devices 10*j*, 10*k*, 10*l*, etc., on the opposite side of shared display 110*a*. Such an arrangement is desirable so that in the event that player 10*e* is not awarded an outcome of shared display 110*a*, the player can, nonetheless, view each outcome or result that is awarded to each of the one or more players playing gaming devices 10*f* clockwise through 10*d*. To that end, indicators 60 for the triggering machines in one embodiment are illuminated and/or flash to show each player which gaming machine is the triggering machine and which player is the triggering player.

Appropriate sounds such as siren noises can be played from the speakers 50 of the triggering machine for such identification. Alternatively, banks or systems 100 provide a visual and/or audio cue to alert the players generally that the associated shared display has been triggered and is about to generate outcomes. The associated players then look up to see which indicator(s) is flashing and which player(s) is the lucky player at that moment.

Figure 5:
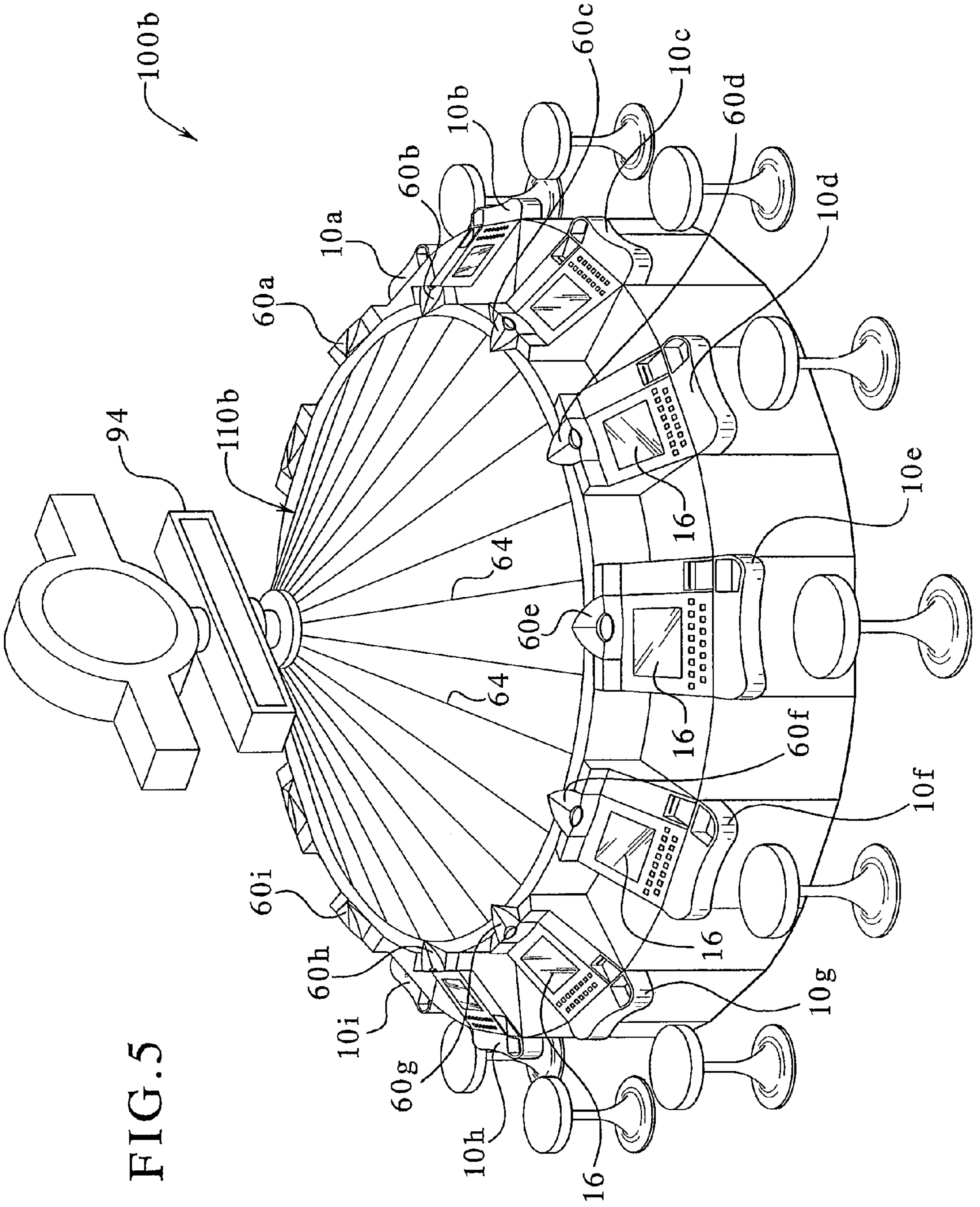
FIG. 5 illustrates a perspective view of another embodiment of the multi-outcome shared display and associated gaming devices of the present invention.

Referring now to FIG. 5, an alternative system 100*b* includes or employs an alternative shared display 110*b* that extends conically upward. The overall height of system 100*b* in one embodiment is sized so that the players can view each of the values 62 indicated by indicators 60 (referring collectively to indicators 60*a* to 60*l*) upon an activation of the symbol generation display 110*b* either while sitting or perhaps standing. The upward taper or vertical extension of shared display 110*b* makes the visual identification of each player's own generated outcome 62 somewhat easier to see when compared to shared display 110*a*, in which the player may have to stand up and/or lean over slightly to see such result. The conical shape produced by display 110*b* could preclude the player sitting at gaming device 10*e*, for example, from seeing the outcome of display 110*b* generated for the player sitting at gaming device 10*k*, for example. FIGS. 6A to 9B illustrate various solutions to that problem. It should be appreciated that while it is desirable to make display 110*b* more vertical, so that each player can see the player's own result more readily, it is also desirable for each player to view the results of as many different gaming devices as possible, as has been described previously.

If the players at all of the gaming machines cannot be seen, as shown in system 100*b*, the indicators 60*a* to 60*l* can each be provided with a different identifier, e.g., symbol, number, color or pattern of colors. The corresponding system identifies the winning machine through an audio and/or visual message, which can be heard or seen by all, listing or showing the bonus event participating machine's identifier, as well as the result or value of the award provided to that machine.

The present invention also contemplates the simulation of the spinning of shared display 110*b* on each of the individual video monitors 16 from, for example, a top or plan view thereof. After shared display 110*b* begins to spin, an accurate representation of such spinning is shown on each of the display devices 16. Each display device 16 in one embodiment shows the plan view arrangement with the player's machine at six o'clock and the opposite machine at twelve o'clock. That arrangement enables the player at each position to discern readily which player will obtain which award. Further, based on the perspective of each player, the players can also see readily from display devices 16, what each other player has obtained as an outcome from the shared display 110*b*. System 100*b*, including gaming device 10 thereof, and indeed any of the embodiments disclosed herein, can employ one or more cameras that show the winning player. The systems can broadcast that image to each of the other associated gaming devices 10 via monitors 16 one or more overhead monitors discussed below. Although not illustrated, the systems herein include, in one embodiment, various types of override inputs that enable a player stop or forbid interruption of play via the above-described display video monitors 16.

Gaming system 100*b* also includes a top piece or topper 94, which provides game recognition or branding information to patrons within the casino or gaming establishment. Topper 94 may or may not spin as desired. If topper 94 spins, such spinning can occur in the same or different direction, angular velocity and/or angular acceleration as the spinning of display 110*b*. Topper 94 can alternatively spin at different times than does display 110*b*. For example, topper 94 could spin constantly at a relatively slow angular velocity.

Figure 6A:
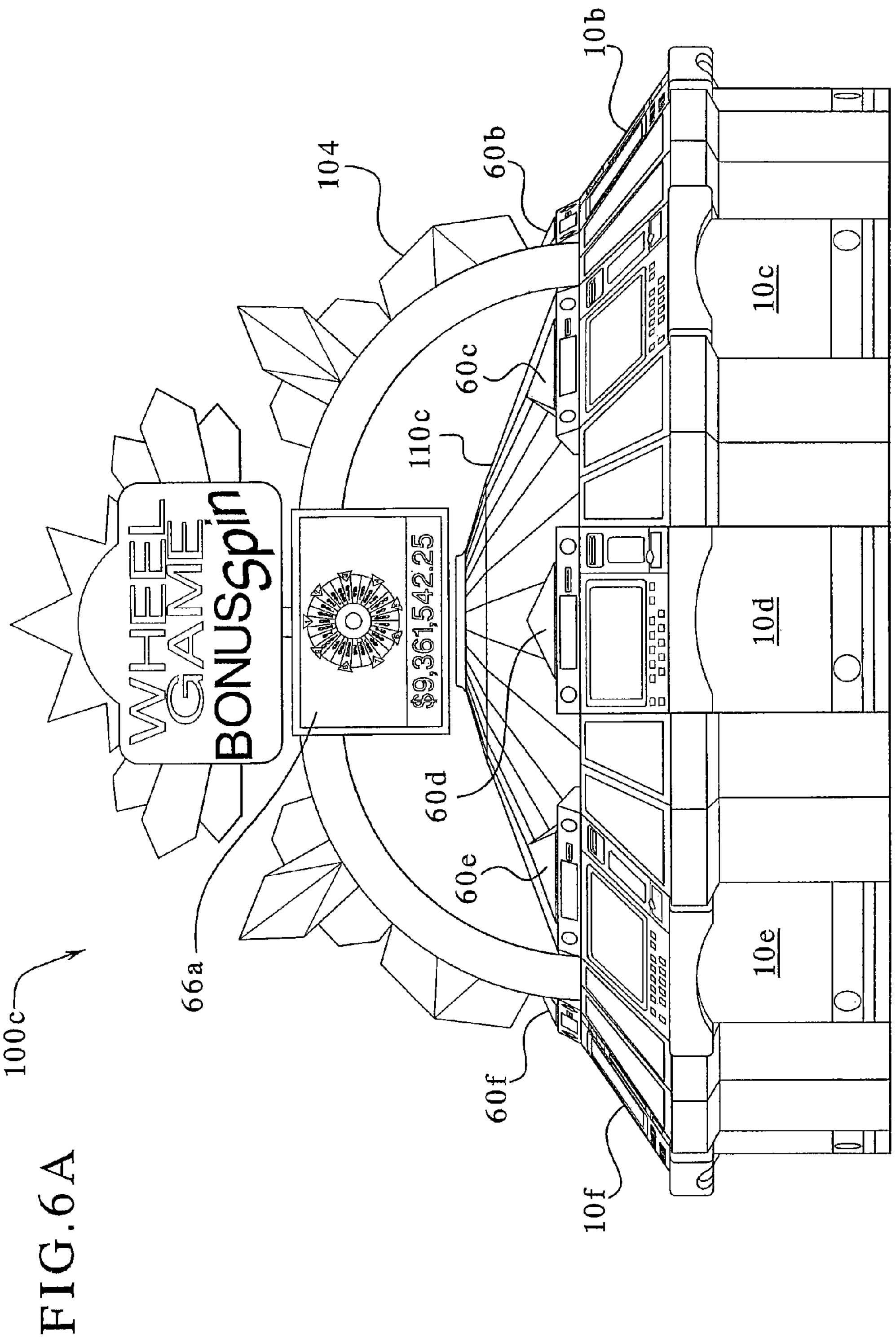
FIGS. 6A and 6B are front elevation and top plan views, respectively, of another embodiment of the shared display and associated gaming devices of the present invention.
Figure 6B:
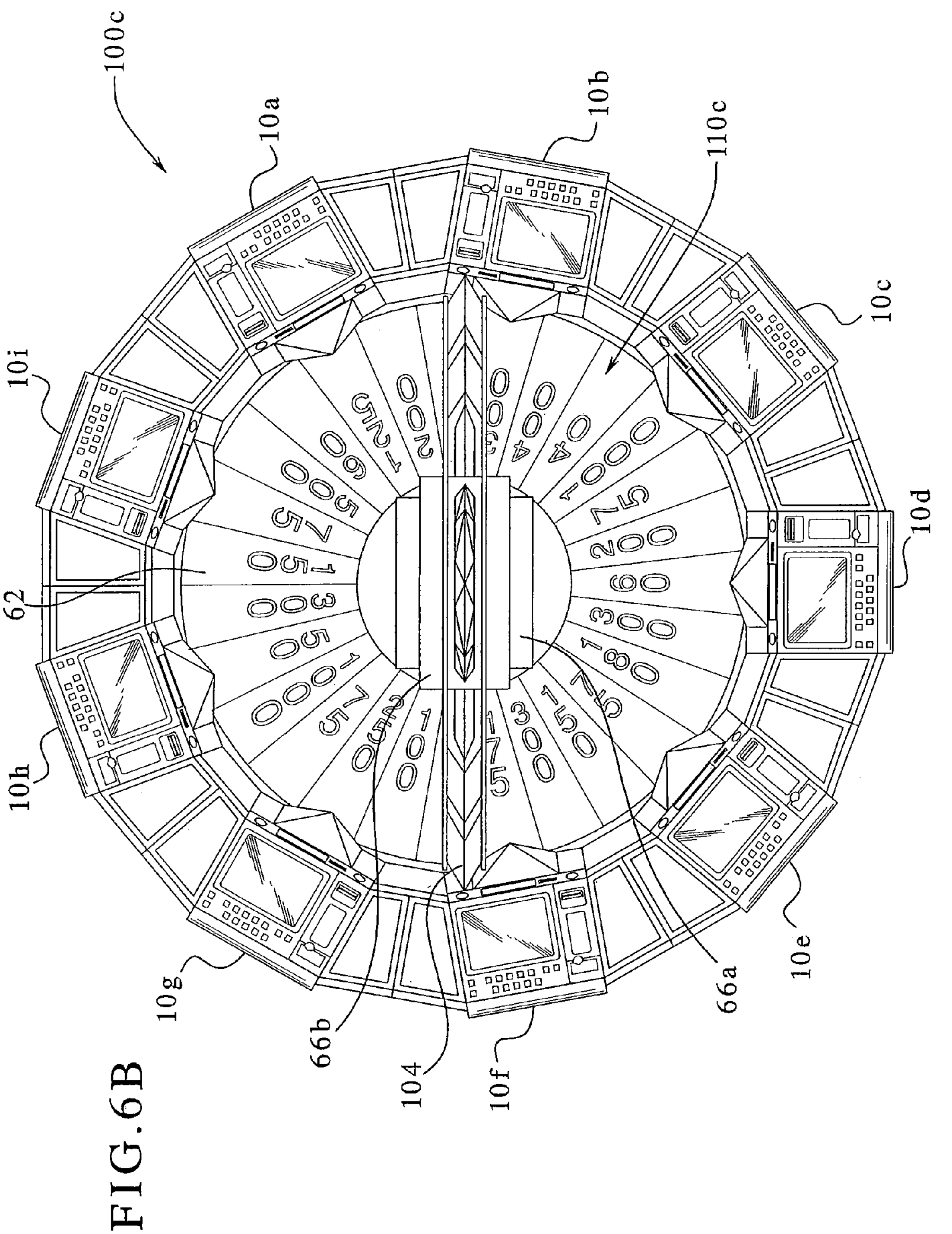

Referring now to FIGS. 6A and 6B, front and top views respectively of a further alternative system 100*c* are illustrated. System 100*c* includes a shared display 110*c*, which can be in any of the shapes or profiles described above or have even a different profile. System 100*c* employs a topper 104. Topper 104 again displays game recognition or branding information in one embodiment and includes fun and exciting indicia, lights, colors, etc. Furthermore, topper 104 includes or employs a pair of large video monitors or displays 66*a* and 66*b*. Video monitors 66*a* and 66*b* can be twenty to eighty inches long and ten to sixty inches high, for example. In one embodiment, displays 66 are LCD displays.

System 100*c* orients gaming devices 10*b* through 10*f* so that players playing those gaming machines can view the generation of outcomes on the shared display 110*c* via monitor or display device 66*a*. System 100*c* orients gaming devices 10*g* to 10*i* and 10*a* so that players sitting at those gaming devices can view results of symbol display 110*c* on large video monitor or display device 66*b*. While the two-monitor embodiment of FIGS. 6A and 6B is illustrated with nine gaming devices 10, any suitable number of gaming devices 10 can be employed in connection with the two video monitors 66*a* and 66*b*.

In one embodiment, the shared symbol display, such as display 110*c*, are triggered upon a particular event in the base game of gaming device 10, such as a bonus triggering event. In that case, the player of the gaming device who triggers the event wins an award. Each player currently playing at the bank of gaming machines or system 100*c* can view that player's outcome from display 110*c*. Display devices 66*a* and 66*b* show the outcome for the triggering gaming device in the center portion of such displays. That is, if in FIGS. 6A and 6B, gaming device 10*e* is the gaming device that triggers the generation of outcomes on display 110*c*, then the values 62 moving past indicator 60*e* associated with gaming device 10*e* would be displayed most prominently on display device 66*a*. Although not illustrated, one or more video cameras can be positioned in topper 104 so that the video stream of the triggering gaming device is shown centered in display devices 66*a* and 66*b*. As discussed with topper 94 of system 100*b* of FIG. 5, a portion of topper 104, e.g., the branding information portion, can be rotated with or independently from shared symbol generation display 110*c*.

Figure 7A:
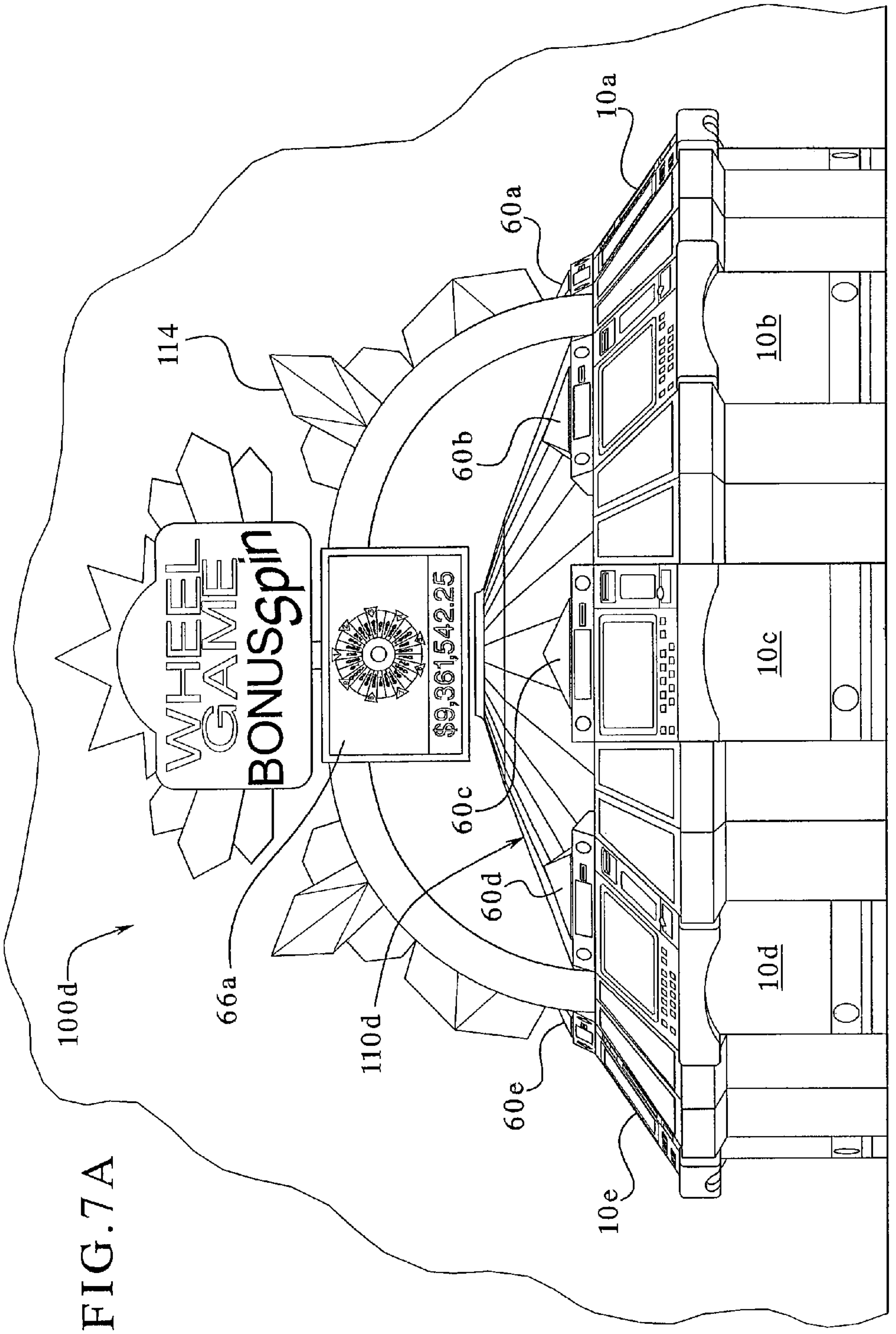
FIGS. 7A and 7B are front elevation and top plan views, respectively, of a further embodiment of the shared display and associated gaming device of the present invention.
Figure 7B:
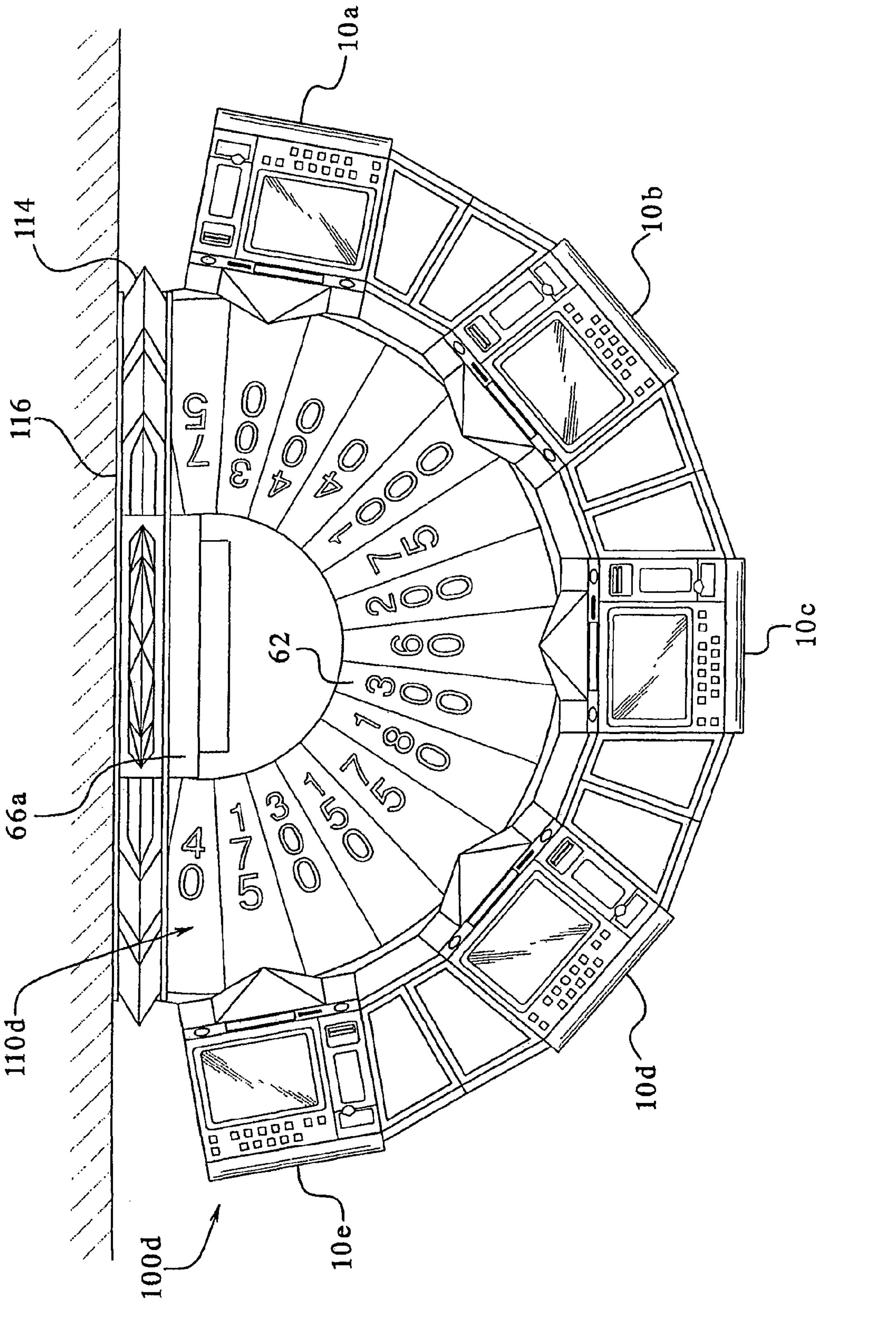

Referring now to FIGS. 7A and 7B, a portioned system 100*d* for mounting against a wall or structure 116 of the casino or gaming establishment is illustrated. Gaming system 100*d* includes five gaming devices 10*a* through 10*e* and employs shared display 110*d*. System 100*d* also includes a topper 114. As seen in FIG. 7B, system 100*d* is abutted against a wall 116 of the casino or gaming establishment.

System 100*d* employs a single video monitor 66*a*, similar to or the same as monitor 66*a* of system 100*c*. Alternatively, system 100*d* employs two or more video monitors 66 (referring collectively to monitors 66*a* through 66*c*). As seen, in any of the embodiments disclosed herein, display devices 66 can be sized, adjusted and/or numbered to fit banks of gaming machines of differing numbers. For example, gaming system 100*d* can operate with any suitable number of a plurality of gaming devices. As discussed above, display device 66*a* of system 100*c* operates in one embodiment with one or more video cameras to center the video stream of shared display of 110*d* on the gaming device that has triggered or caused the shared display 110*d* to begin spinning.

In an alternative portioned system, which can also be mounted adjacent to a casino wall or other structure, the shared display is vertically disposed as opposed to being substantially horizontally disposed as shown, for example, in FIGS. 7A and 7B. In that way, space is conserved because a full wheel can be provided that does not have to extend into the abutting wall or structure as would occur with the system of FIGS. 7A and 7B. Instead, the wheel is substantially vertically disposed against the wall and rotates about an axis extending horizontally from the wall.

Figure 8A:
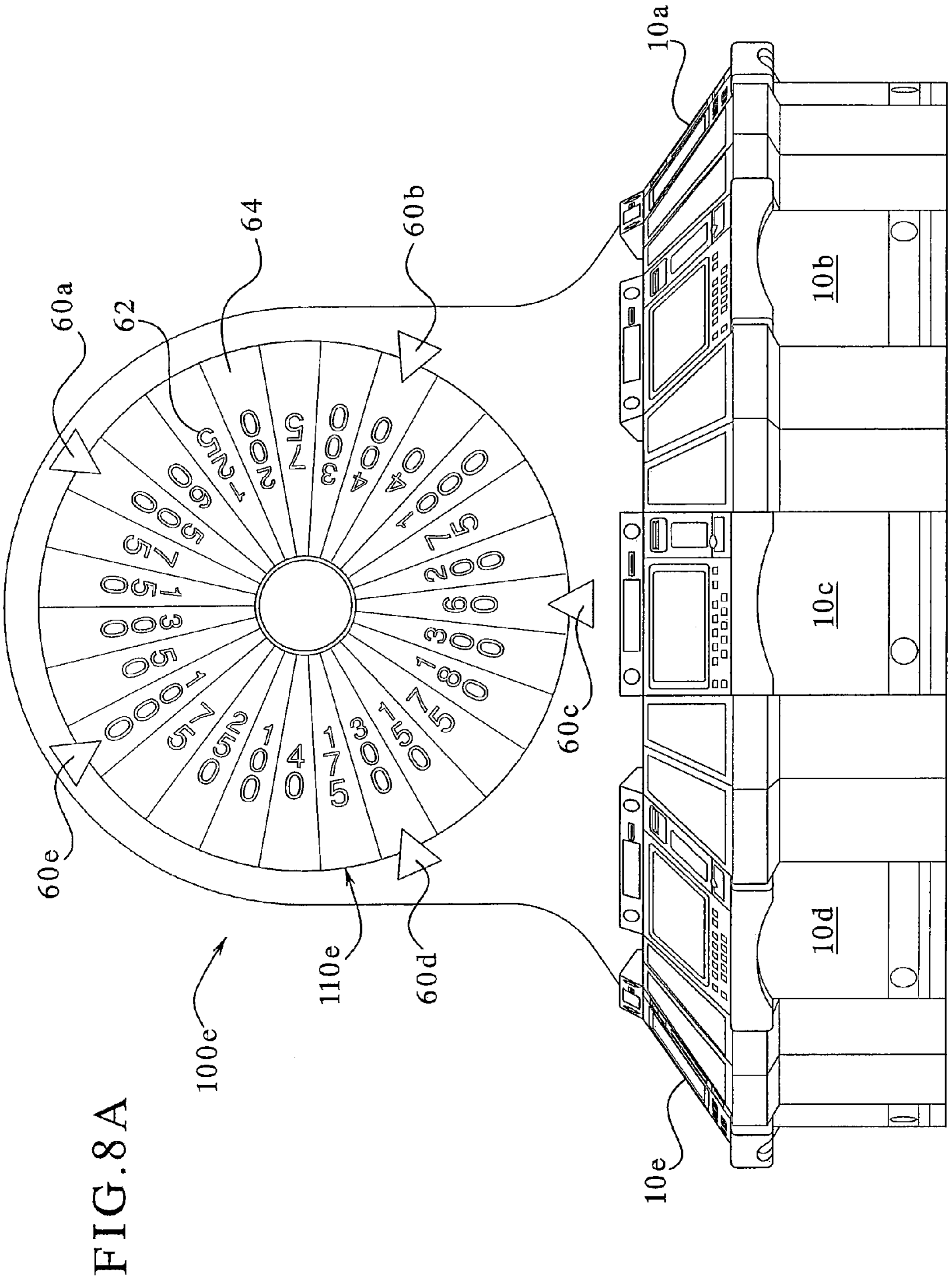
FIGS. 8A and 8B are front elevation and top plan views, respectively, of a further embodiment of the shared display and associated gaming devices of the present invention, which includes a vertically oriented shared display.
Figure 8B:
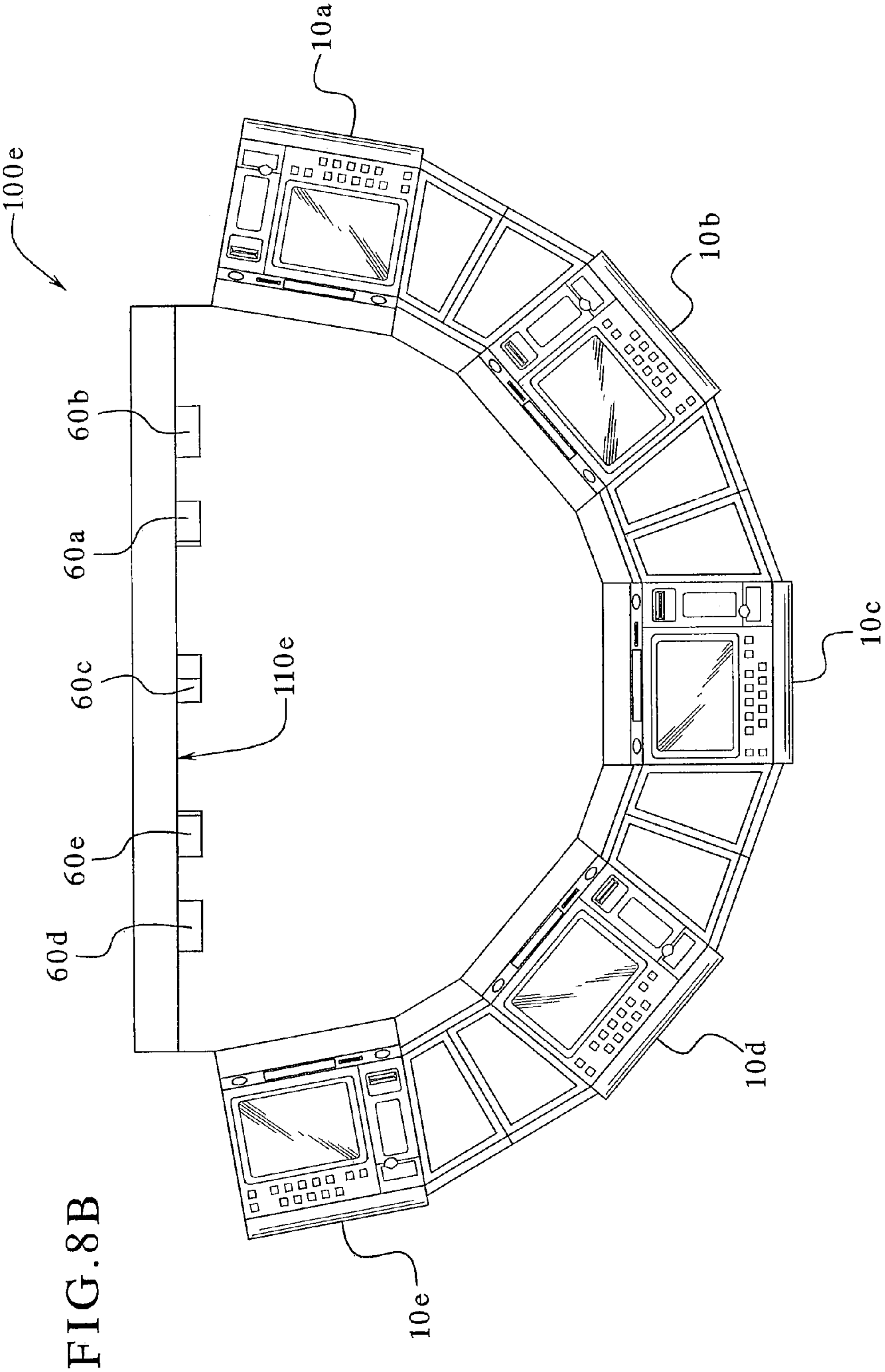

Referring now to FIGS. 8A and 8B, front and top views respectively of a further alternative system 100*e* are illustrated. System 100*e* includes a shared display 110*e*. Shared display 110*e* is oriented vertically. In one embodiment, shared display 110*e* is an electromechanical display with spatially fixed values 62 placed within panels 64. In an alternative embodiment, shared display 110*e* is a large video monitor, similar to video monitors 66*a* to 66*c*. In that case, the video monitor can display values that are fixed spatially or that vary differently as described herein.

System 100*e* orients gaming devices 10*a* through 10*e* so that players playing those gaming machines can view the generation of outcomes on the shared display 110*e*. The players can look up to see vertical shared display 110*e* and still play the base game on the individual gaming devices 10*a* to 10*e*. Vertical shared display 110*e* is advantageous in one respect because each player can readily see the entire vertical display 110*e* and the outcome generated in association with each gaming device 10*a* to 10*e*. A separate large video monitor 66 is therefore not necessary. On the other hand, each player has to find the player's associated indicator 60*a* to 60*e*. This can be done without difficulty by associating the individual gaming device with its indicator via color, number, letter, indicia and any combination thereof.

In one embodiment, shared display 110*e* is triggered upon a particular event in the base game of gaming devices 10. The player(s) of the gaming device who triggers the event obtains an outcome or award from shared display 110*e*. Each player currently playing at the bank of gaming machines or gaming system 100*e* can look up and view that player's associated outcome from shared display 110*e*, whether or not the player is playing the shared display bonus game and actually receives a generated value. Shared display 110*e*, like shared display 110*d* of FIGS. 7A and 7B, mounts conveniently against a wall of a gaming establishment.

Figure 9A:
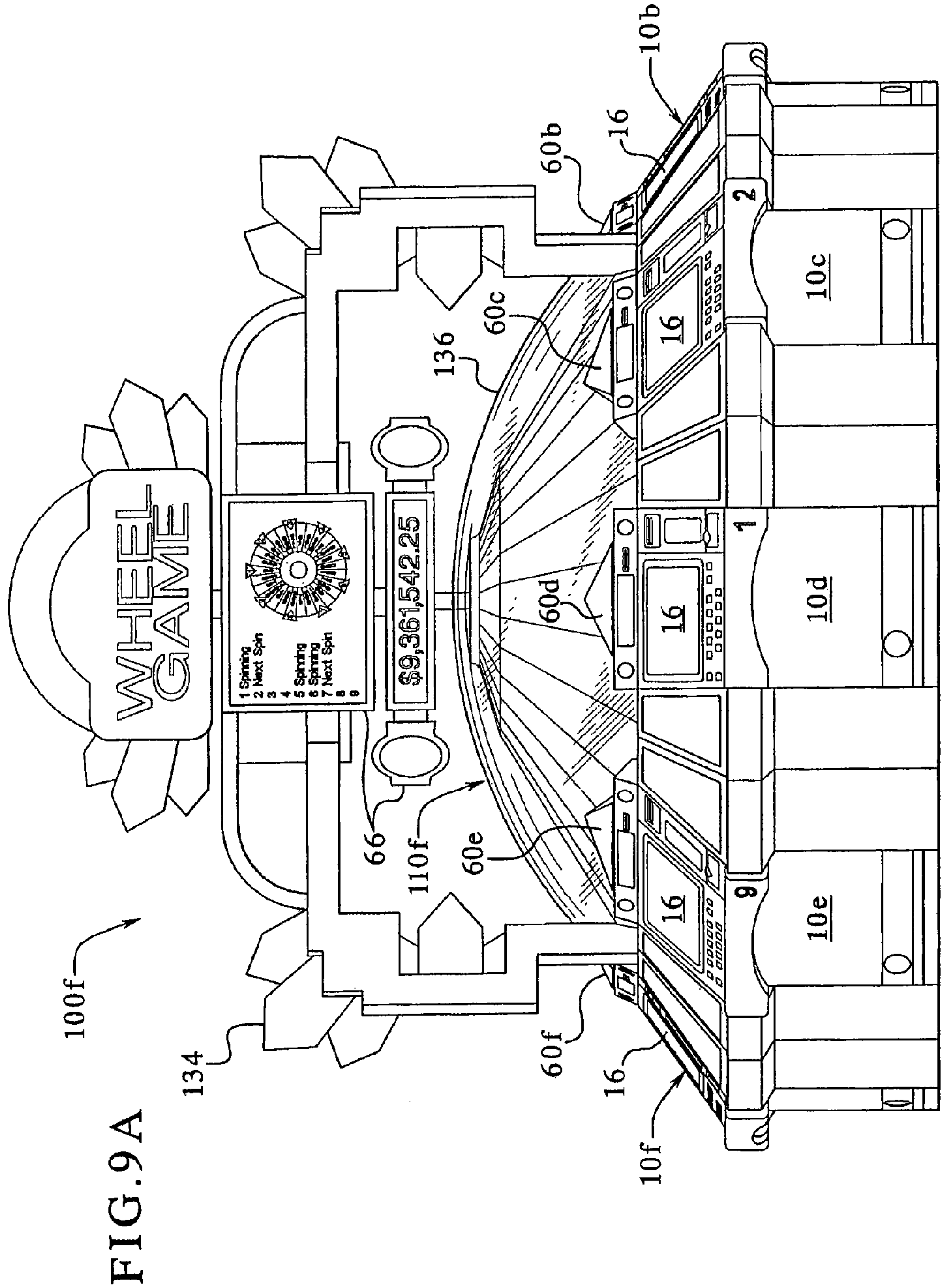
FIGS. 9A and 9B are front elevation and top plan views, respectively, of one embodiment of the shared display of the present invention, having a clear protective cover and spacer assemblies positioned between the individual gaming devices.
Figure 9B:
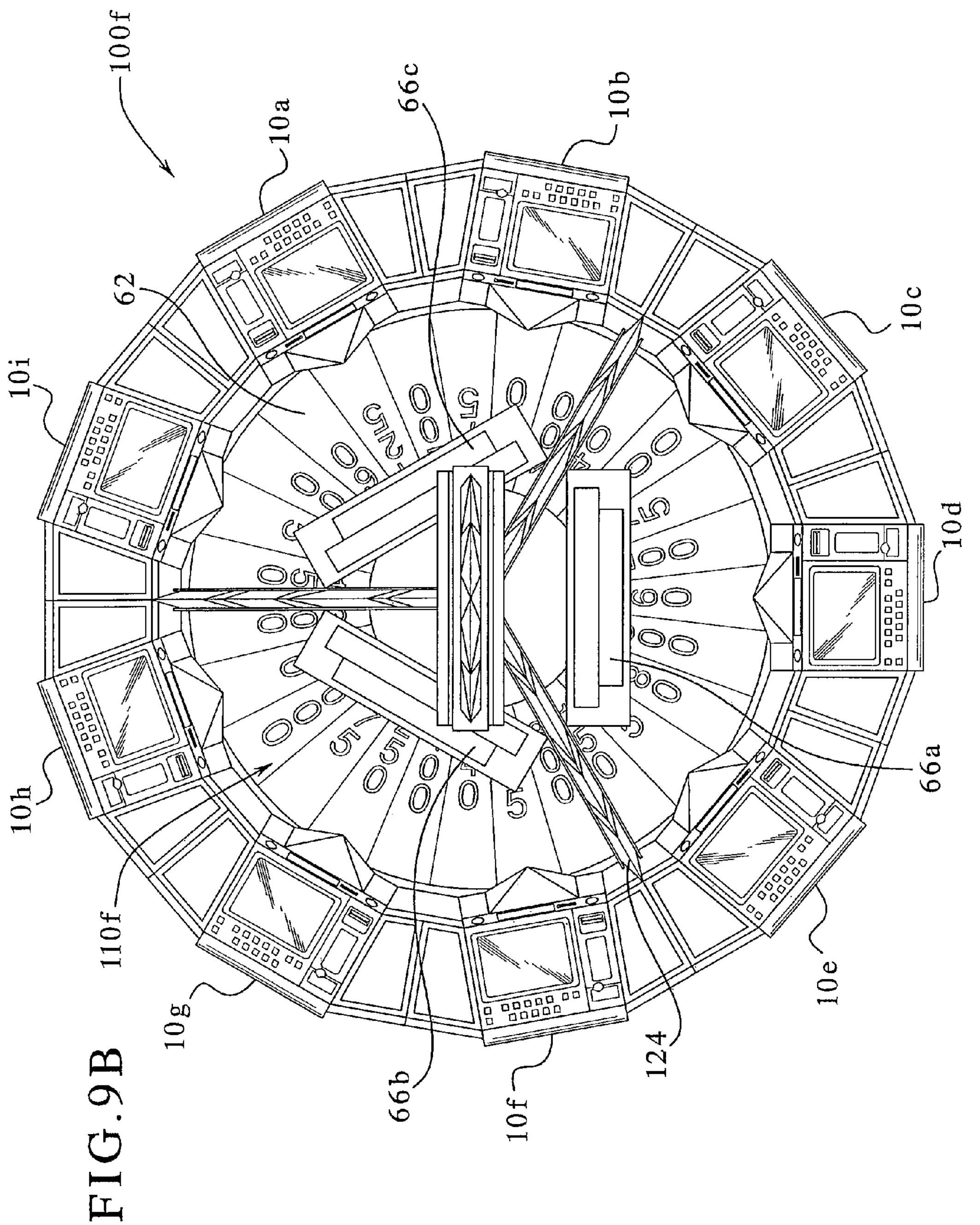

Referring now to FIGS. 9A and 9B, alternative system 100*f* includes a topper 134 that employs or uses three of the large video displays 66 discussed above, namely, displays 66*a* to 66*c* (seen best in FIG. 9B). Video displays 66*a* to 66*c* each provide a display for three of the nine machines 10*a* to 10*i* of system 100*f*. Alternatively, any suitable number of machines is associated with each display 66*a* to 66*c*. A shared display 110*f* is operated with system 100*f* in a manner described above. A portion or all of topper 134 can spin additionally in conjunction with or at a different time than the spinning that occurs with shared symbol outcome display 110*f*.

FIGS. 9A and 9B illustrate a number of features of shared display 110*f* and system 100*f*. First, each gaming machine 10*a* to 10*i* is numbered one to nine. The corresponding number of each of the machines appears on video display 66. Also, in one embodiment, each of the nine machines is associated with one of three colors.

In one implementation, the colors are the primary colors of blue, red and yellow, although different colors and amounts of colors may be used. The colors or groupings of gaming machines are helpful for the player viewing video display 66 to quickly find that player's gaming machine on the video display. As seen in FIGS. 9A and 9B, video display 66 also shows a simulated version of the shared display 110*f*. The player's color and number help the player to locate the machine being played. As discussed below, the present invention includes the provision of associated gaming devices in locations remote from the physical display 110*f*. In such case, the wheel on a remote display 66 will be the player's sole or primary source of receiving shared display outcome information.

As seen in the various shared displays illustrated herein, the outcomes or award values of the displays have a fixed spatial relationship to one another. For example, the seventy-five value is located to the right of the one-hundred-fifty value, the one-hundred-eighty value is located to the right of the seventy-five value, the three-hundred value is located to the right of the one-hundred-eighty value, and so on. It should therefore be appreciated that system 100*f*, by generating the sixty value for gaming device 10*d* (labeled gaming device 1), the outcomes for each of the remaining gaming devices 10*a* to 10*c* and 10*e* to 10*i* are also generated. As shown below, the fixed relationship between the symbols representing award values (which are the individual outcomes provided to the individual gaming machines 10 participating in the bonus event) is used or counted on in one embodiment for generating outcomes on the shared displays of the present invention.

As seen in FIGS. 9A and 9B, shared display 110*f* is positioned beneath a clear protective dome shaped cover 136. Clear protective cover 136 prevents debris and other contaminants from dirtying the shared display 110*f* and perhaps obstructing its proper operation. The cover also prevents a person from interfering with the shared display. Clear protective cover 136 in one embodiment seals to or is butted against the consoles of gaming devices 10*a* to 10*i* and the spacers or spacer assemblies (described below) located between the gaming devices.

Display 66 provides any suitable and desired audio, visual and audiovisual information to the players playing system 100*f*. For example, display 66 shows the value of the progressive bonus pool to be at $9,361,542.25. That progressive award is available to a player that wins a bonus event having a relatively small probability of success.

Display 66 as discussed shows a video version of shared display 110*f*. The video version enables each player to view the outcome of shared display 110*f* for each other player. For example, the player playing Gaming Device Two can view display 66 and see the outcome of eighty provided to the player playing Gaming Device Six, located on the opposite side of shared display 110*f* from Gaming Device Two.

Display 66 further illustrates each gaming device number in a vertical column with a status message next to the numbers. The status message can provide any suitable information, such as which gaming devices are active or being played at that time. The active games in one embodiment are highlighted by illuminating the corresponding number of the gaming device in both (i) the column of numbers one to nine and (ii) the numbers appearing in connection with the video display of shared display 110*f* as well as (iii) the numbers appearing along each side of gaming devices 10*a* to 10*i*.

For example, the numbers one, two, five, six and seven in the column and wheel of monitor 66 may be illuminated (not illustrated). In one embodiment, that illumination signals that those gaming devices are currently being played, e.g., carry a positive credit balance on credit display 20. In an alternative embodiment, the numbers highlighted are the numbers of the gaming devices that have currently triggered play of the shared display 110*f* of the present invention.

For example, the illustrated "spinning" message can indicate that Gaming Devices One, Five and Six have triggered the shared display bonus and are currently awaiting an outcome from an ongoing spin of shared display 110*f*. The "next spin" message indicates that Gaming Devices Two and Seven are currently awaiting the next spin of shared display 110*f*. That is, Gaming Devices Two and Seven have triggered the shared display bonus but are not active during the current spin of shared display 110*f*. The current spin of shared display 110*f* will generate an outcome for each of the gaming devices but only Gaming Devices One, Five and Six will receive the individual outcome associated with that respective gaming machine. Gaming Devices Two and Seven however are queued or set to be part of the next random generation of shared display 110*f*. The queuing methods of the present invention are discussed in detail below.

Display 66 can show additional information (not illustrated) relating to the base games of gaming devices 10*a* to 10*i* and/or to the outcomes or awards generated via play associated with shared display 110*f*. Display 66 can show the number of credits won for each active machine and other indicia relating to the base game, bonus games or theme of the system 100*f* of the present invention. Other information provided by large display 66 is discussed below in connection with FIGS. 23 to 34.

As discussed in greater detail below, shared display 110*f* is divided into twenty-seven panels or value areas 64 in one embodiment. In one embodiment, system 100*f* includes a number of associated gaming devices 10 such as nine. The number is evenly divided into twenty-seven or shares a common denominator with the number of panels, such as three. In the illustrated embodiment, each gaming device at the end of a spin is associated with (is adjacent to) three of the twenty-seven values or award areas. One of those three values, e.g., the middle value, is directly pointed to or indicated by the indicator 60*a* to 60*i* associated with the respective gaming device 10*a* to 10*i*. Accordingly, two values or award areas reside at the end of each spin between any two indicators 60*a* to 60*i* and gaming devices 10*a* to 10*i*.

In this embodiment, the above symbol or award value arrangement can be used to place each player or gaming device near or in view of one of the high value awards of shared display 110*f*, such as one of the one thousand awards shown on shared display 110*f* and video monitor 66. If the player does not win one of the high value awards, the player is at least likely to be within eyesight of one of those awards, which can increase fun and excitement for certain players. Fun and excitement is also provided to a player who has not triggered the shared display 110*f* but for whom a high value award is generated after one of the spins of the shared display.

In any of the embodiments described in FIGS. 4A to 9B, two or more gaming devices 10 can cause the shared display to spin simultaneously or almost simultaneously, e.g., when two or more triggering events are achieved within a predetermined time period of each other (e.g., fifteen seconds) or otherwise placed together in a queue as discussed in detail below. In such a case, display devices 66 can (i) have a split screen that highlights the two or more triggering machines simultaneously or (ii) show two or more generations sequentially, each one centering on a different one of the triggering gaming devices.

While FIGS. 6A to 9B show one, two or three large video displays 66, any suitable number of displays 66 or other display devices in addition to display devices 16 of individual gaming devices 10 can be employed. Furthermore, any one or more of the additional display devices can be set at a different suitable angle than the generally vertical angles or positions of displays 66 of gaming systems 100*c*, 100*d*, 100*e* and 100*f* in FIGS. 6A to 9B, respectively. For example, it is possible to angle one of the displays 66 at forty-five degrees or point the display vertically downward.

Mechanical Components

Figure 10A:
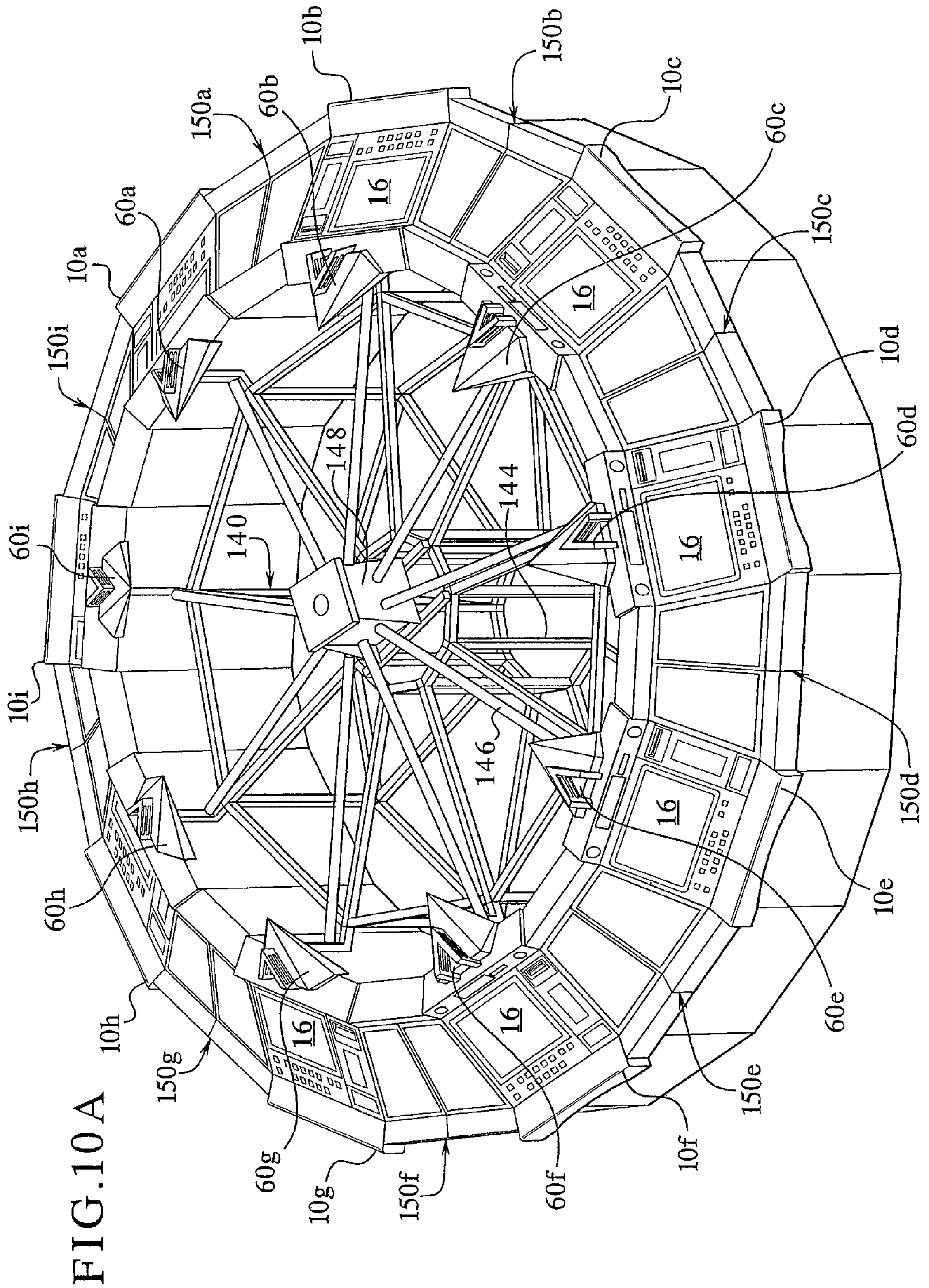
FIGS. 10A, 10B and 10C are perspective views of one embodiment of the shared display of the present invention with a top portion of the display removed to show a supporting frame, and portions thereof, respectively.

Referring now to FIGS. 10A to 13, embodiments for the mechanical and structural support, wheel top, the protective cover 136 and the indicators 60*a* to 60*i* of the shared displays 110 (referring collectively to displays 110*a* through 110*f*) and associated systems of the present invention are illustrated. The embodiments shown in FIGS. 10 to 13 are applicable to any of the displays and systems described in connection with FIGS. 4A to 9B. The structural elements are shown for a shared display and system having nine gaming devices, 10*a* to 10*i*, as seen in FIG. 10A and twenty-seven symbol panels or value areas 64*a* to 64*aa*, as seen in FIGS. 11A and 11B. FIG. 10A has differently configured indicators illustrating that the indicators, which may be shaped as desired. As illustrated in FIGS. 1, 2 and 4A to 9B, the indicators may be configured or shaped in any suitable manner. The apparatuses can be adapted however for any suitable amount of gaming devices 10 and display panels 64.

Structural Support/Modularity

Figure 10B:
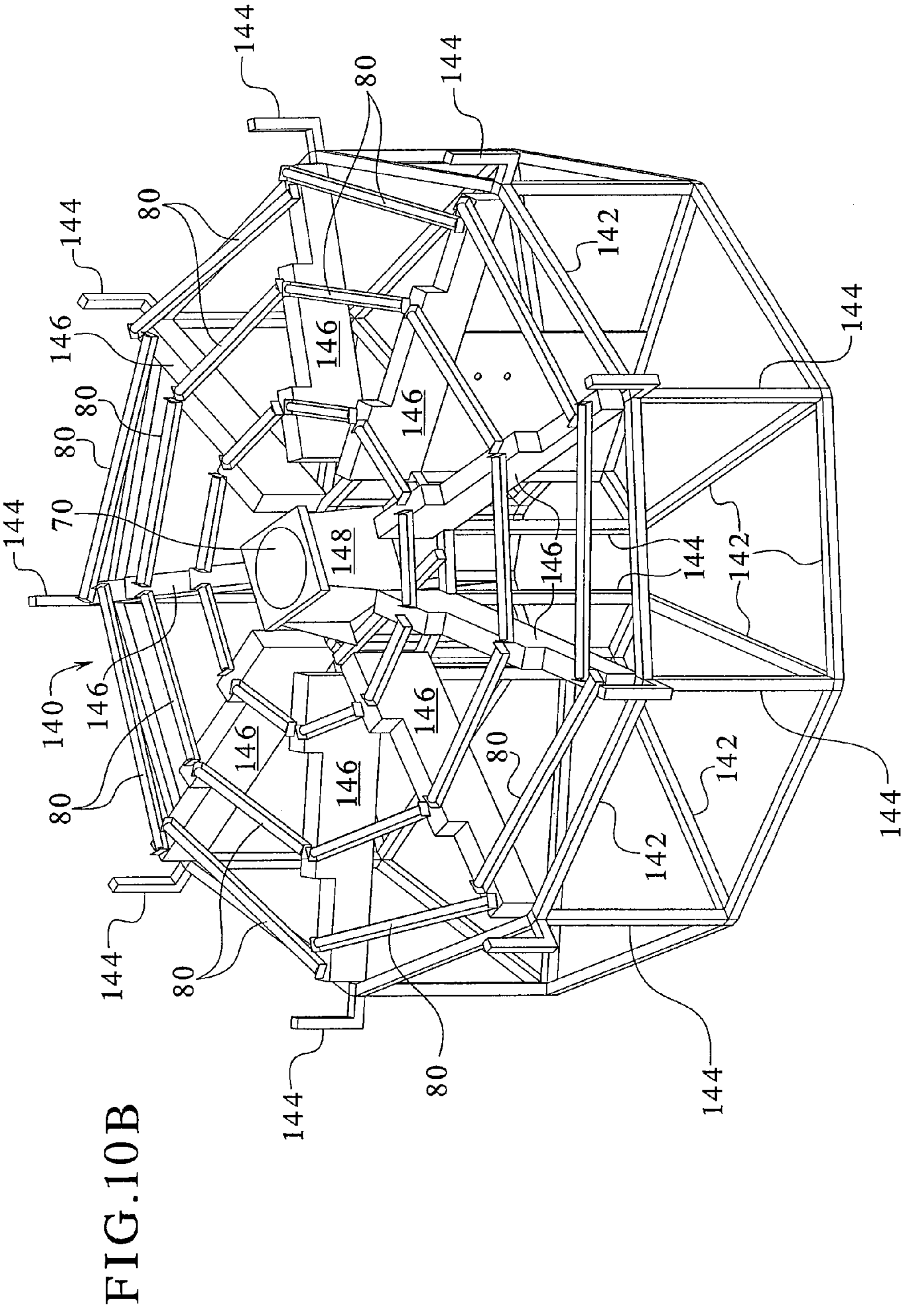
Figure 10C:
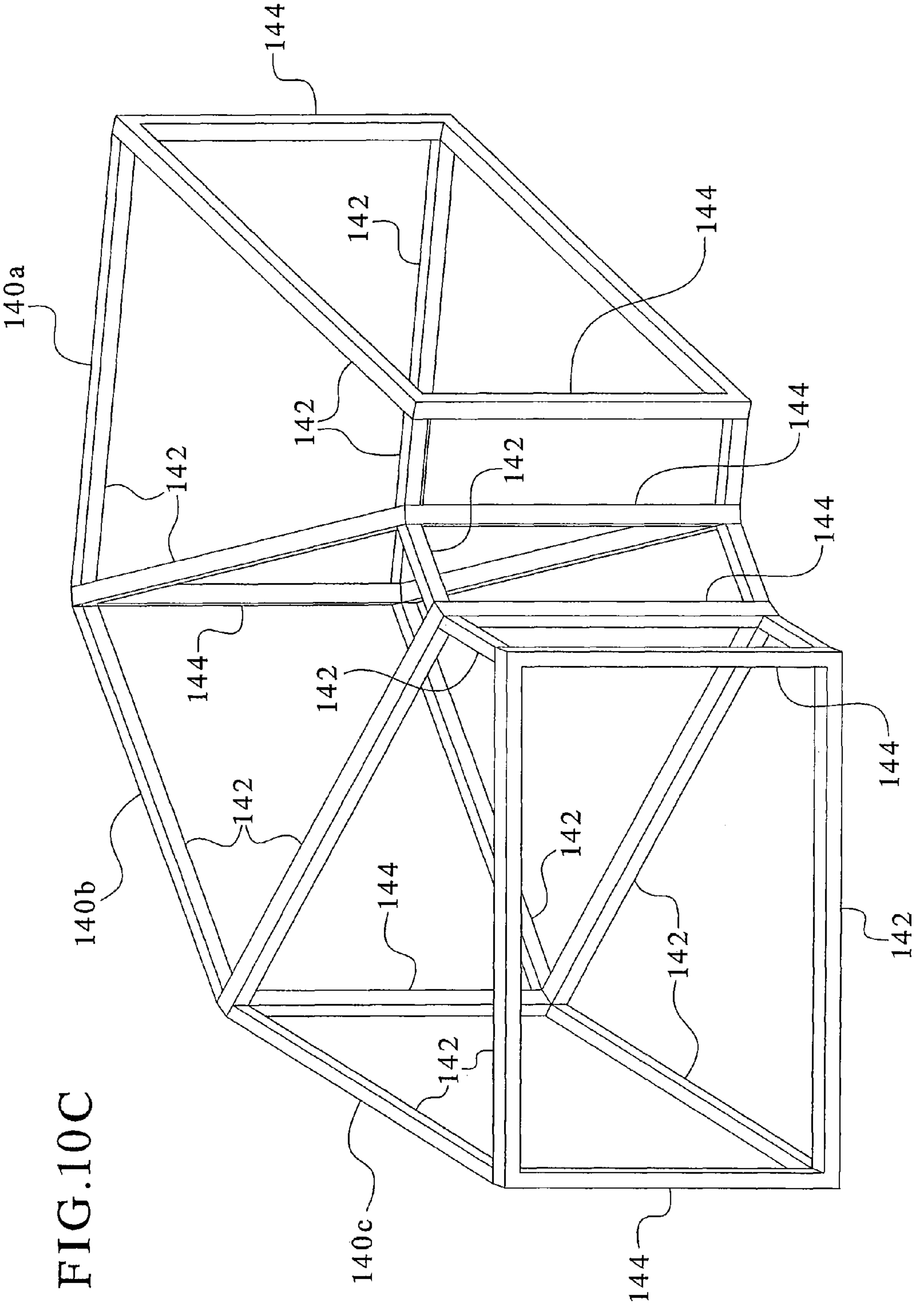

FIGS. 10A to 10C illustrate a structural framework 140 or part thereof, which is seen in FIG. 10A when a display top 180 (shown in FIGS. 11A and 11B) is removed. Structural framework 140 includes a plurality of substantially horizontally disposed members 142, a plurality of substantially vertically disposed members 144 and a plurality of stepped supports 146 that are disposed on an angle with respect to members 142 and members 144. Members 142 and 144 and stepped supports 146 can be any suitable structural material, such as metal, plastic, wood or any combination thereof. The material in one preferred embodiment is strong, e.g., steel or aluminum. For reference, FIG. 10B also illustrates an optical wheel 70, which in one embodiment is located between a motor 182 the top 180 of shared display 110. Optical wheel 70 provides positional feedback information as discussed below.

As seen in FIGS. 10A and 10B, framework 140 in general includes an inner polygonal shell and an outer polygonal shell of the horizontal members 142 and vertical members 144. In one embodiment, the inner and outer polygonal shells are fastened together via additional horizontal members 142. Stepped supports 146 extend from the outer polygonal shell to the inner polygonal shell. Motor mount 148 can be coupled to the vertical members 144 and/or horizontal members 142 that make up the inner polygonal shell of frame 140. Motor mount 148 receives a motor 182 extending downwardly from display top 180 shown in FIGS. 11A and 11B and supports motor 182 and display top.

FIG. 10C illustrates one embodiment for constructing framework 140. Here, framework 140 is made in three sections 140*a* to 140*c*. FIG. 10C illustrates one section 140*a*, which is substantially one third of the overall framework 140. Section 140*a* includes a section or third of the inner polygonal shell and a section or third of the outer polygonal shell described above. Section 140*a* is easier to ship and transport through the casino than is full framework 140. Section 140*a* is likely to better withstand the rigors of shipping than is full framework 140.

Sections 140*a* to 140*c* are transported to the gaming establishment and bolted or welded together at the point of use to form framework 140. As shown below, protective cover 136 is also assembled from three pieces. The gaming devices 10, spacer assemblies 150 (discussed below), topper 134, protective cover 136, large displays 66 and other components of shared display 110 can also be modular or at least partly assembled at the point of use in one embodiment. The present invention seeks to make shipping and transporting system 100 (referring collectively to gaming systems 100*a* to 100*f*) as easy, safe and efficient as possible.

FIG. 10B also illustrates a plurality of elongated lights 80, which can be fluorescent lights, a series of light emitting diodes ("LED's"), or other suitable type of lighting. Lights 80 can be white or colored and be the same color or different colors. Lights 80 can be illuminated continuously, semi-continuously or intermittently as desired. In the illustrated embodiment, lights 80 are positioned generally circumferentially at various radial lengths from the center of framework 140, which supports lights 80 (contrast with FIG. 10A where the lights extend radially from center of framework 140). In this manner, lights 80 run generally perpendicular to the longer dimension of panels 64 (see e.g., FIGS. 4A and 11B). Positioning lights 80 in such a manner produces less shadowing and more even lighting beneath top 180 of shared display 110 than if lights 80 are positioned radially with respect to framework 140. This advantage is also evident when top 180 of display 110 is spinning.

Figure 10D:
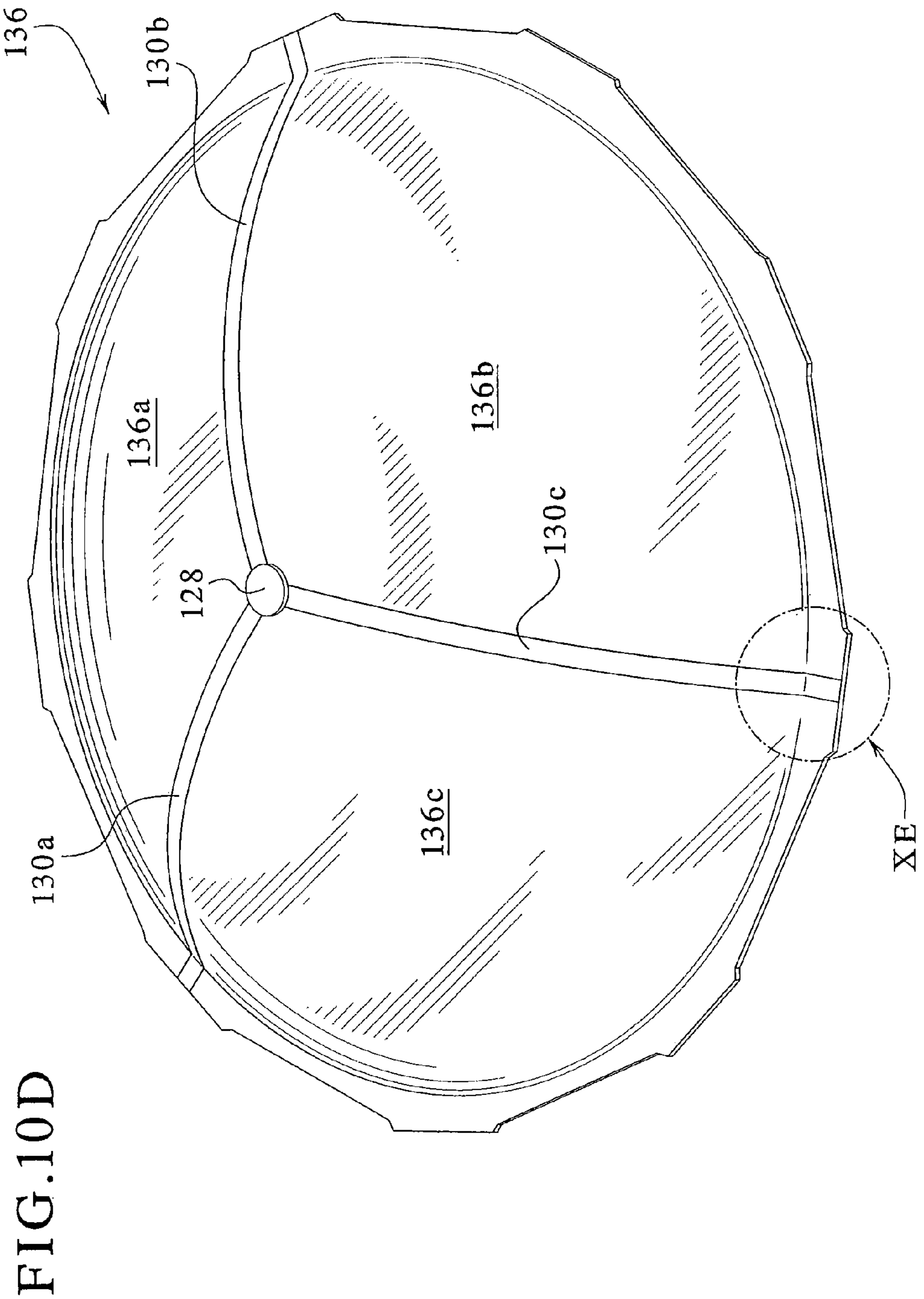
FIG. 10D is a perspective view of a modular protective cover of the shared display of one embodiment of the present invention.
Figure 10E:
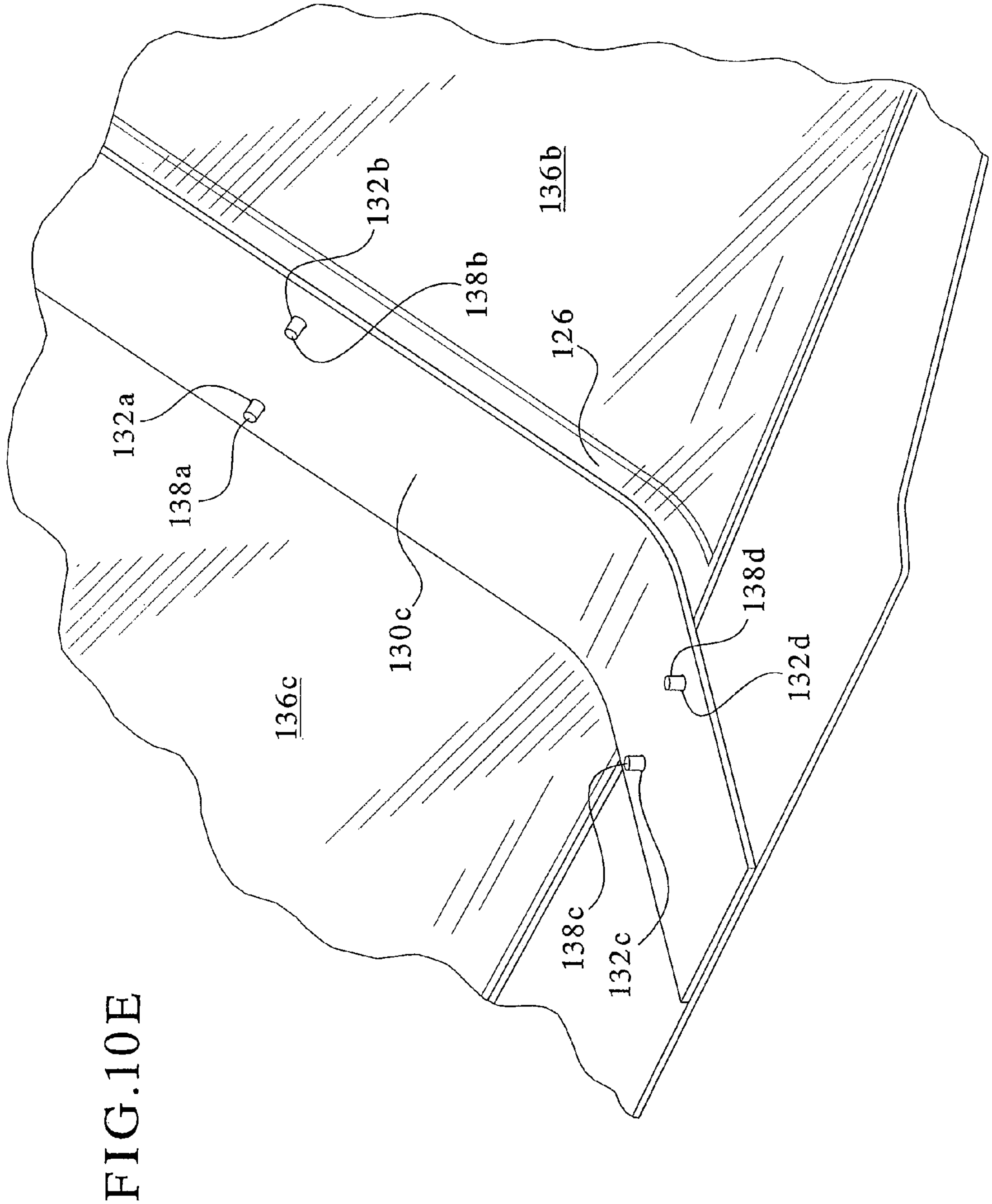
FIG. 10E is a fragmentary perspective view of a portion of the modular protective cover of the shared display of one embodiment of the present invention.

FIGS. 10D and 10E illustrate that protective cover 136 in one embodiment is modular and assembled from three cover sections 136*a* to 136*c*. Cover 136 in one embodiment is made of a clear or translucent plastic and protects top 180 and panels 64 thereof from any debris that would otherwise fall onto top 180. Sections 136*a* to 136*c* are bolted together via decorative outer trims 130*a* to 130*c*. Outer trims 130*a* to 130*c* can be plastic metal or any other suitable material. In one embodiment, the trims include a gloss or high quality finish. A plated cap 128 is fitted in one embodiment at the top and center of protective cover 136 to hide seams or spaces between outer trims 130*a* to 130*c*.

FIG. 10E illustrates section XE highlighted in FIG. 10D. Section XE shows that in one embodiment, an inner trim 126 is provided. Inner trim 126 holds or supports bolts or studs 138*a* and 138*c* extending from section 136*c*. Bolts or studs 138*a* and 138*c* are fitted through apertures 132*a* and 132*c*, respectively, of outer trim 130*c*. Inner trim 126 also holds or supports bolts or studs 138*b* and 138*d*. Bolts or studs 138*b* and 138*d* are fitted through apertures 132*b* and 132*d*, respectively, of trim 130*c*. Bolts or studs 138*a* to 138*d* can be fixed to inner trim 126 or be separate and extend through apertures in trim 126.

Inner trim 126 in one embodiment is a separate one or more frame piece disposed beneath dome sections 136*b* and 136*c*, respectively, which bolts together with the dome 136 and outer trim pieces 130*a* to 130*c*. In an alternative embodiment, inner trim 126 is a thicker section of plastic formed with the rest of sections 136*a* to 136*c*, respectively. Further alternatively, trim 126 includes a separate one or more piece of material that is glued or welded to sections 136*a* to 136*c*. Nuts or other fasteners, such as finishing or acorn nuts, are threaded onto studs 138*a* to 138*d* to hold outer trim 130*c* to inner trim 126, thereby sandwiching sections 136*b* and 136*c* removably together. The same apparatus and assembly procedure is repeated between sections 136*a* and 136*b* and between sections 136*a* and 136*c*.

Replaceable Display Panels

Figure 11A:
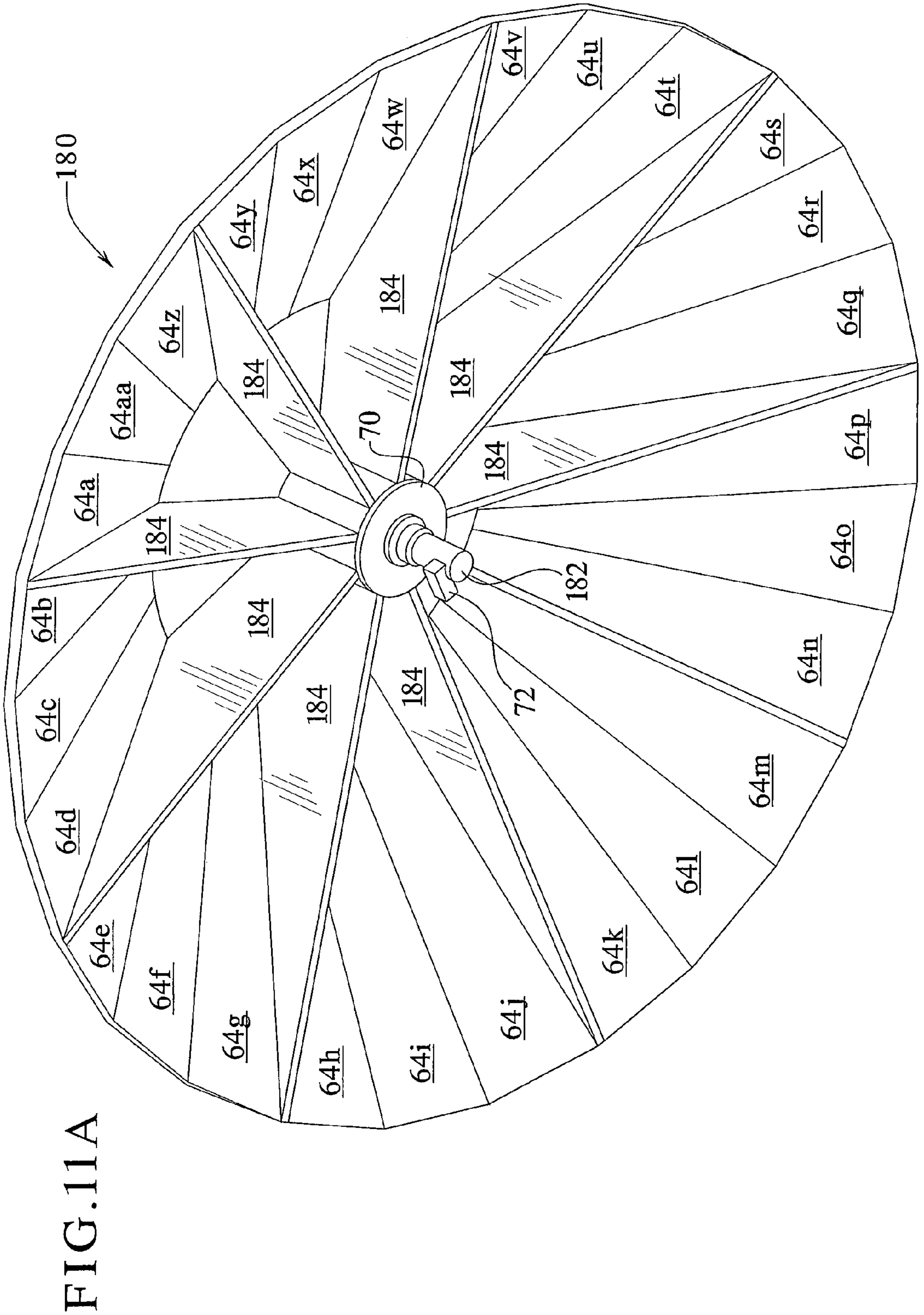
FIGS. 11A and 11B are bottom and top perspective views of one embodiment of an award or outcome displaying part of the shared display having replaceable award or outcome display panels.
Figure 11B:
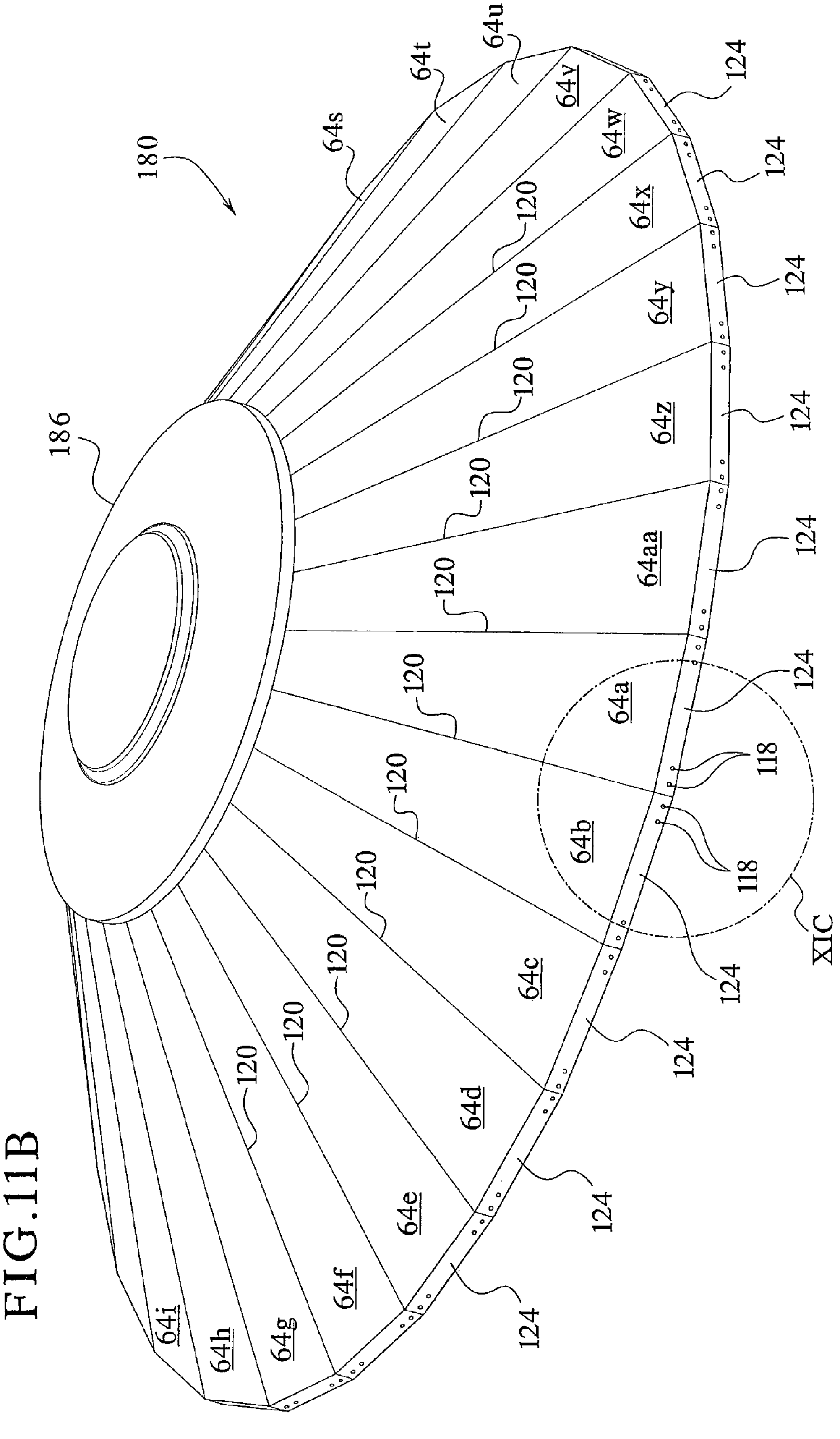
Figure 11C:
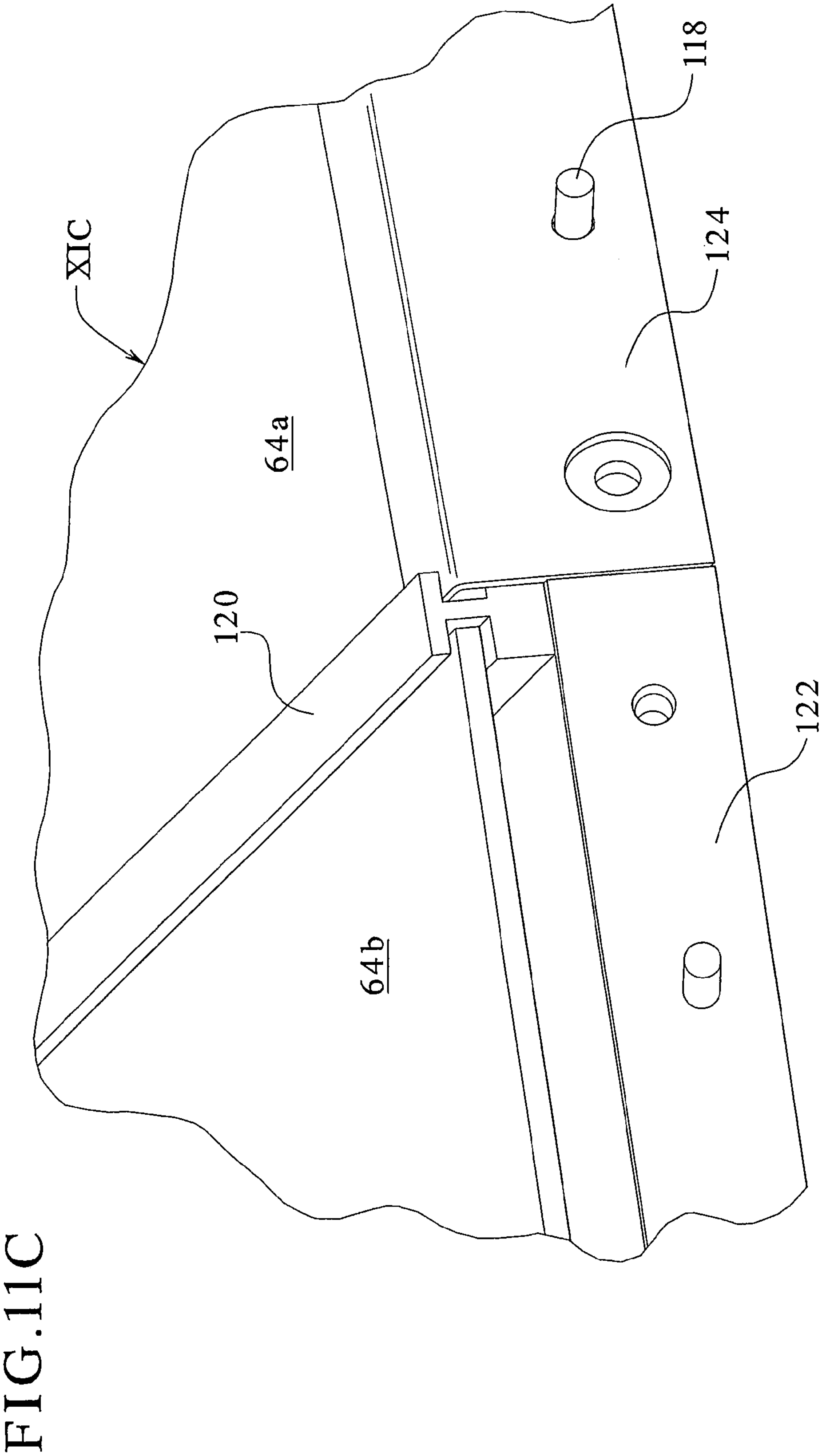
FIG. 11C is a fragmentary perspective view of the award or outcome display panels attached to the frame of the shared display.

Referring now to FIGS. 11A to 11C, top 180, motor 182 and other related apparatus are described. Motor mount 148 of framework 140 (FIG. 10B) holds and supports motor 182 and any suitable mechanical and electrical equipment operating with motor 182, such as a motor drive, a gearbox, and the like. The motor drive can alternatively be housed inside one of the spacer assemblies 150 (FIG. 13), wherein the output of the motor is linked mechanically to top 180.

In one embodiment, motor 182 is a large stepper motor or other servo-type motor controlled by controller 74 (FIGS. 3B and 3C) that can accurately position top 180 to show outcomes generated randomly for the shared display. Stepper or servo motor 182 is controllable to set one or more accelerations and/or decelerations, one or more velocities, a number of spins or distance traveled, a number of directional changes, and the like. Indeed, top 180 can perform a complex sequence of stops, starts and direction changes, or simply spin at different rates of speed and, for example, ramp up and ramp down from and to a zero angular velocity, according to a desired linear or bell-type velocity curve. In another embodiment, motor 182 is a gear drive motor that runs until a signal tells a controller of the motor to stop. Controller 74 (FIGS. 3B and 3C) generates such signal in one embodiment.

Shared display 110 also includes, in one embodiment, real or generated sounds, such as ticking sounds, which accompany the spinning of top 180. The ticking sounds become more and less frequent as the top 180 accelerates or decelerates, respectively, so that the player can audibly and visually discern when top 180 is speeding up or slowing down.

FIG. 11A shows that top 180 includes nine dividers 184 dispersed radially equally beneath display areas 64*a* to 64*aa*. Dividers 184 serve both structural and strengthening purposes and can aid in providing feedback information to a controller of the system of the present invention.

Dividers 184 can provide pulses or signals when sensed by a positioning device that is situated in a fixed relationship to top 180. One or more of dividers 184 passing by the sensor can be sensed to determine an actual position and/or number of rotations of top 180. The actual positional feedback can be used alone or in combination to determine when and where to stop a generation of outcomes on top 180, for example, to tell the controller of the gear drive motor to stop the motor. In an alternative embodiment, the pulses generated from the sensing of one of the dividers 184 is used to compare against a number of step pulses or other electronic signals sent to the motor driving shaft 182 and top 180. Control of the shared displays of the present invention can be open loop, closed loop and/or a combination of both.

In one embodiment, an optical wheel 70 is connected directly or indirectly to and spins with the output shaft of motor 182. An optical sensor 72 is fixed to motor mount 148 of framework 140 is used in combination with optical wheel 70 to send a signal indicating to control server 170 (discussed below). The signal can be analog or digital and is indicative of the position of top 180 with respect to a home position. Optical wheel 70, in one embodiment, includes a circumferential series of notches of differing widths and frequencies, which create unique patterns of light detected by sensor 72 for various positions of top 180 with respect to the sensor 72 and/or the home position. Optical wheel 70 sensor 72 in one embodiment form an absolute or incremental encoder as known to those of skill in the art.

The signal is used in one embodiment in combination with a brake or clutch-brake assembly to stop motor 182 and top 180 at the desired and generated position. The brake and optical wheel 70 can also be used in combination with the gear drive motor or the stepper motor if needed. In one embodiment, the brake is a fail safe brake that holds top 180 frictionally in place if power is removed from the brake or upon a power down situation.

FIG. 11B illustrates a fully assembled top 180 from the topside or reverse side shown in FIG. 11A. FIG. 11B illustrates that panels 64*a* to 64*aa* are each separated from one another by an extruded brace 120. Also, a cover plate 124 is fitted at the end of each panel 64 to hold panels within braces 120. Panels 64*a* to 64*aa* are colored translucent or clear plexiglass in one embodiment and allow light from lights 80 (FIG. 10B) to illuminate the panels, selectively, continuously or semi-continuously.

Although not illustrated, panels 64*a* to 64*aa* display numbers or symbols corresponding to awards or outcomes that the bonus play may provide to the player. The symbols can represent any suitable type of outcome, such as a vacation give-away, merchandise, cash, monetary units, credits and the like. The replaceable nature of the panels enables the award pool to be readily updated so that the bonus game can periodically present a fresh and variable set of awards. If panels 64 are updated, the paytables of gaming devices 10 are updated accordingly. As discussed below, gaming system 100 provides a mechanism by which the new paytables can be registered with bonus server 170.

FIG. 11B illustrates a cap 186, which covers the top and center of top 180. Cap 186, in one embodiment, is a formed plated piece, which is at least substantially opaque. Alternatively, cap 186 allows light from lights 80 to illuminate the cap. Cap 186 hides the ends of panels 64 and provides an aesthetically pleasing finish to top 180, which is a visual centerpiece of the shared display 110 of gaming system 100 of the present invention.

FIG. 11C illustrates section XIC taken from FIG. 11B. Panels 64*a* and 64*b*, extruded brace 120 and cover plate 124 are shown in more detail. Extruded brace 120 defines grooves that accept panels 64*a* and 64*b*. The wedge shaped panels 64 can slide in and out when an associated cover plate 124 is removed from an outer mounting ring 122. Outer mounting ring 122 is fixed to the spoke-like braces 120. Outer mounting ring 122 extends around the entire periphery of top 180 and includes holes (where separate fasteners 118 are used) or studs 118 that mate with aligned holes of cover plate 124. A finishing or acorn nut threads onto studs or fasteners 118 to complete the fixing of plate 124 to outer mounting ring 122, which in turn locks a panel 64 in place. Cover plates 124 are sized to fit between two extruded braces 120. Sectioning cover plates 124 enables the operator to remove only a desired one or more cover plate 124 to remove and/or replace a desired one or more panel 64.

Integrated Indicator and Candle

Figure 12A:
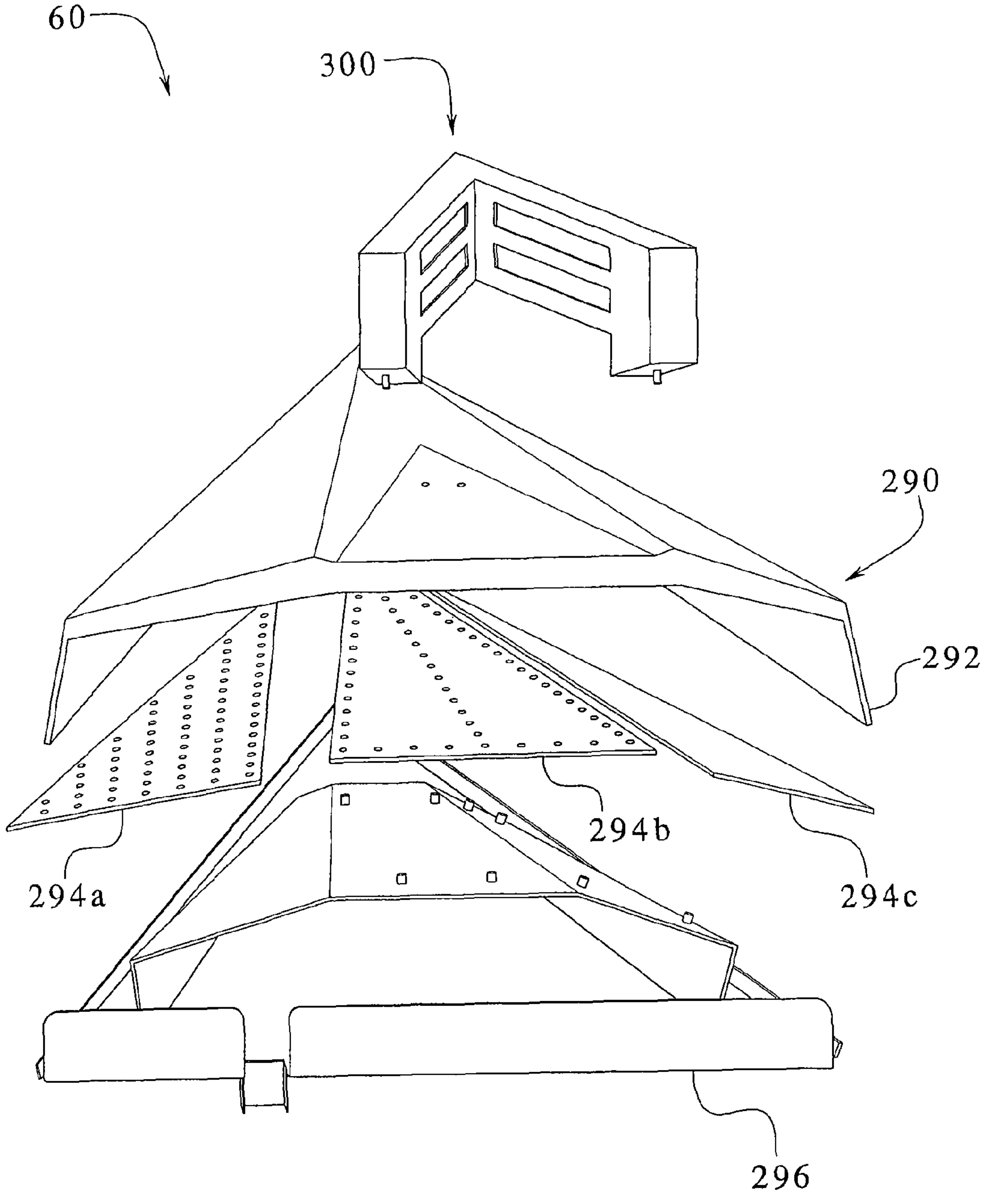
FIGS. 12A and 12B are perspective views of one embodiment of an integrated indicator and candle provided with the gaming devices operating with the shared display of the present invention.
Figure 12B:
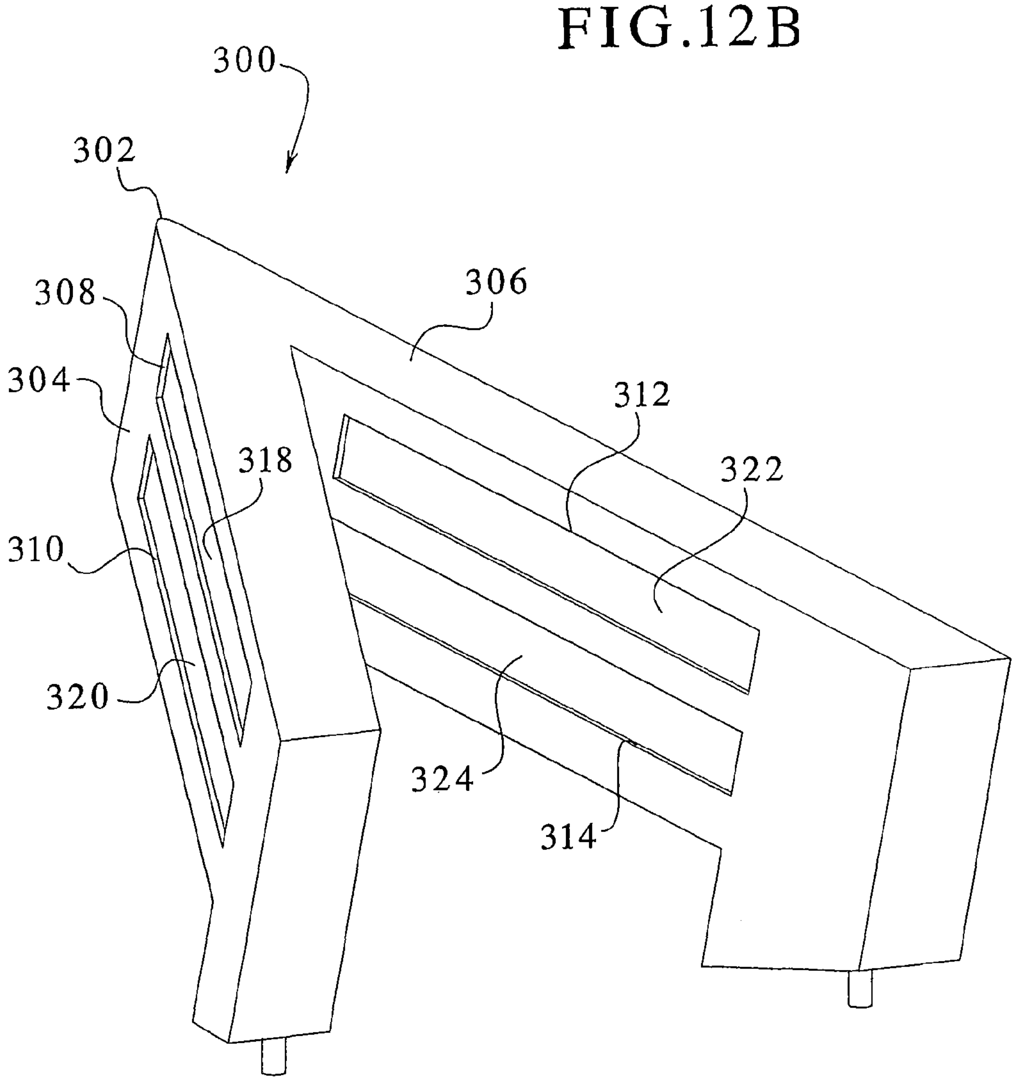

Referring now to FIGS. 12A to 12B, one embodiment for indicator 60 of the present invention is illustrated. Indicator 60 is an integrated apparatus, which includes a pointer 290 and a candle 300. The pointer 290 performs the functions described generally herein for indicator 60. That is, pointer 290 indicates one of the values 62 on panels 64 when shared display 110 stops spinning. Pointer 290 can be unlit, lit to an intermediate degree, lit intermittently (e.g., flashing), fully lit or any combination thereof based on the state of game play of the associated gaming device 10.

Candle 300 performs a separate function from pointer 290. As is known in the art, lights (typically called candles) are provided on the tops of gaming devices, such as slot machines. The conventional candles are round so that an attendant can see from any direction when the candle is lit. The candles are lit for a number of reasons. For example, if the machine enters a tilt state, the candle is lit to call an attendant over to address the problem. In certain cases, a player attempts to cash out an amount that is too large for the machine to pay or the machine runs out of money, in which case the candle is lit so that an attendant can make a hand payment to the player. The candles are also lit if the player requests service such as bar service. In any case, the candle informs the casino or gambling establishment that the gaming device or player needs attention so that an attendant or operator can respond efficiently.

It is therefore desirable to provide a candle that when lit can be seen from any direction and that is located in a conspicuous place on gaming device 10. The logical place to place the candle 300 is on the top of the cabinet of gaming device 10. That location however is occupied by pointer 290 of indicator 60 as shown herein. The present invention provides candle 300 which is integrated with pointer 290. The integrated candle 300 is lit on all sides and is shaped to correspond visually with the triangular or pointed shape of pointer 290. It should be appreciated that the candle may be configured in any suitable manner. It should also be appreciated that the candle and the pointer may be any suitable size and any suitable shape.

Pointer 290 includes a cover 292, one or more LED printed circuit board 294*a* to 294*c* and a base 296. Cover 292 is in one embodiment a colored, translucent piece of plastic or glass, which allows light from LED boards 294*a* to 294*c* to selectively illuminate cover 292 to varying degrees and at varying times. Cover 292 is also colored in one embodiment to match a color designated for the particular gaming device to which cover 292 is mounted. In one embodiment, system 100 employs a color scheme. For example, the color scheme may use three colors: red, yellow and blue. A third of the gaming devices are red gaming devices, a third are blue gaming devices and a third are yellow gaming devices. In such embodiment, cover 292 has or includes one of those colors.

LED boards 294*a* to 294*c* are powered from a source within the respective gaming device 10 in one embodiment. The control scheme of processor 12 of gaming device 10 controls the power to boards 294*a* to 294*c* to be (i) absent or non-powered, (ii) at an intermediate level or (iii) at a safe, maximum level, depending upon the state of gaming device 10 and a designated indicator condition for that state.

Cover 292 bolts to or otherwise attaches to base 296 and in turn sandwiches PCB boards 294*a* to 294*c* between cover 292 and base 296. In one embodiment, cover 292 is removable from base 296 with relative ease and without too much disassembly of other parts of gaming device 10. One or more PCB board 294*a* to 296*c* can thereby be swapped out if needed.

Candle 300 bolts to or fastens to cover 292. As seen in FIGS. 12A and 12B, candle 300 has a generally V-shaped housing 302, which conforms with and is aesthetically pleasing when displayed in combination with similarly shaped pointer 290. Housing 302 in one embodiment is made of sheet metal, such as sheet steel or aluminum. Alternatively, housing 302 is plastic. Housing 302 in the illustrated embodiment includes a side part 304, which generally defines the sides of housing 302. Housing 302 also includes a top part 306, which generally defines the top of housing 302. Side part 304 and top part 306 bolt together removably to allow access into candle 300. It should be appreciated that the candle and housing may be any other suitable shape.

Side part 304 defines a plurality of upper, outer apertures 308 and a plurality of lower, outer apertures 310. Top part 306 defines a plurality of inner, upper apertures 312 and a plurality of inner, lower apertures 314. Upper, outer apertures expose upper, outer lights 318. Lower, outer apertures 310 expose lower, outer lights 320. Upper, inner apertures 312 expose upper, inner lights 322. Lower, inner apertures 314 expose lower, inner lights 324.

Upper, outer lights 318 are illuminated at the same time as are upper, inner lights 322 to form light pair 318/322. Lower, outer lights 320 are illuminated at the same time as are lower, inner lights 324 to form light pair 320/324. Light pair 318/322 is illuminated for a first purpose and enables such lighting to be seen from any direction. Light pair 320/324 is illuminated for a second purpose and again enables such lighting to be seen from virtually any direction.

In one embodiment, light pair 318/322 is illuminated selectively for any type of casino service, such as an open door, tilt, hand pay, maintenance, etc. Light pair 318/322 is therefore normally off unless attention at gaming device 10 is needed.

Light pair 320/324 is lit, in one embodiment, to indicate a denomination of the corresponding gaming machine 10. Certain gaming devices accept tokens having a preset cash or denomination value. Light pair 320/324 indicates that value. For example, light pair 320/324 of candle 300 can provide green lighting for a nickel machine, purple lighting for a quarter machine, and orange lighting for a dollar machine, etc. To indicate a machine denomination, light pair 320/324 is lit constantly, while gaming system 100 is operable to provide a constant indication to players and passersby of the denomination of the respective gaming device 10. The present invention expressly contemplates providing system 100 with gaming devices 10 all having the same credit denomination or with gaming devices having differing credit denominations.

Spacer Assemblies

As seen in FIG. 10A, frame 140 separates and holds a plurality of spacer assemblies 150*a* to 150*i* (referred to collectively as space assemblies 150 or generally as spacer assembly 150). One spacer assembly 150 is shown in FIG. 13. Spacer assemblies 150 are located between and space apart gaming devices 10. To that end, frame 140, in one embodiment, is sized to attach to nine gaming devices 10*a* to 10*i* separated by nine spacer assemblies 150*a* to 150*i*. The diameter of frame 140 is chosen to enable top 180 (FIGS. 11A to 11C) to be divided into twenty seven equal and easily seen panels or display areas 64. The gaming systems 100*d* and 100*c* of FIGS. 7A, 7B, and 8A and 8B, respectively, are operable to be placed against a structure or wall of a gaming establishment can have the same approximate radius defined by frame 140. Only half the frame and five machines 10 are illustrated or provided in this embodiment.

Figure 13:
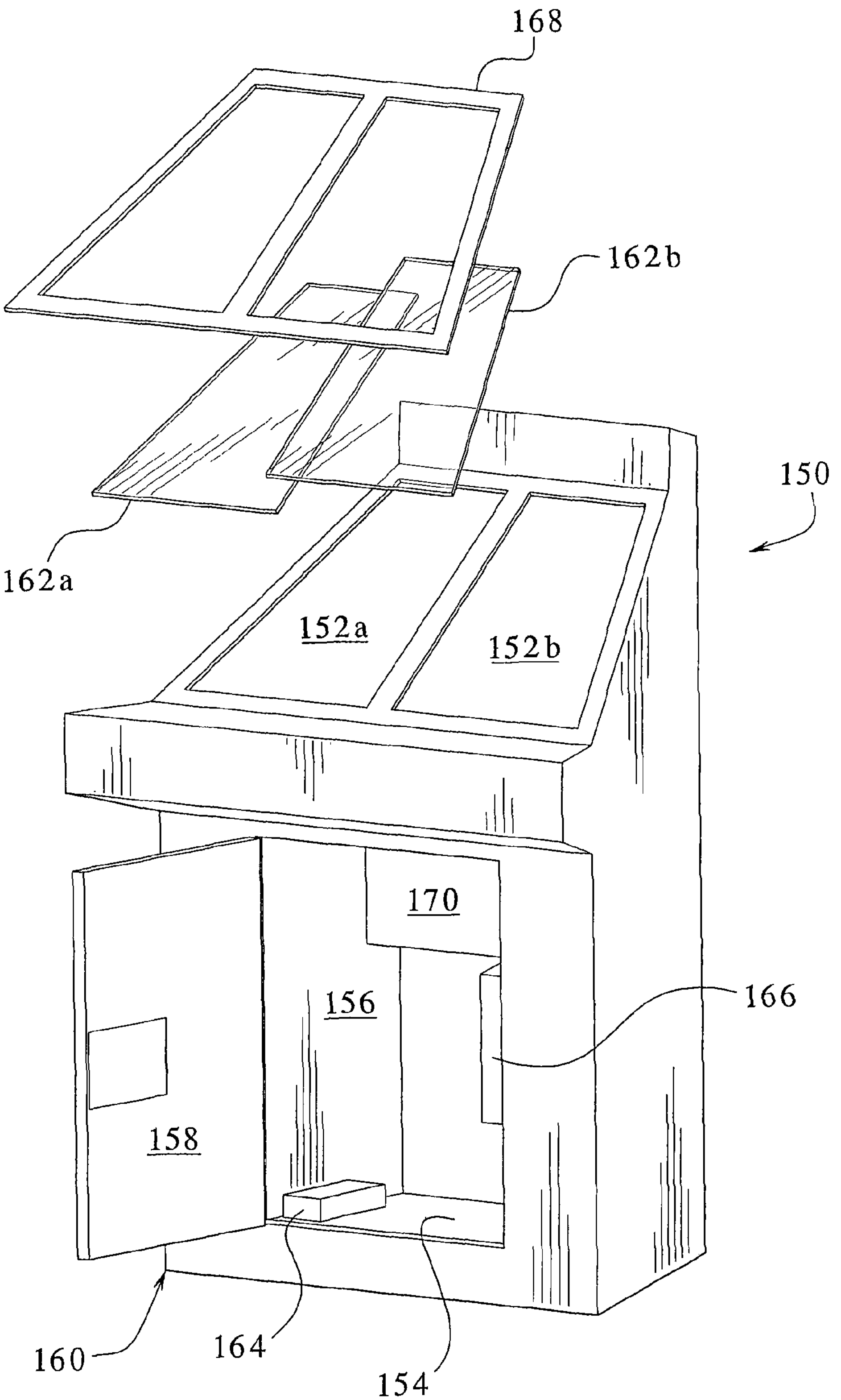
FIG. 13 is a partially exploded perspective view of one of the spacer assemblies shown in FIG. 10A.

Spacer assembly 150 shown in FIG. 13 includes a base 154, sidewalls 156, front and/or access panel 158 and display panels 162*a* and 162*b*. Base 154, sidewalls 156, access panel 158 and display panels 162*a* and 162*b* form a cabinet 160 of assembly 150. Display panels 162*a* and 162*b*, as illustrated in FIG. 9, are of different colors (e.g., one of the three colors) used for the nine gaming devices 10*a* to 10*i* of system 100*f* in FIG. 9. Display panels 162*a* and 162*b* also each display one of the numbers one to nine, which corresponds to one of the nine gaming devices 10*a* to 10*i*.

One of the nine spacer assemblies 150*a* to 150*i* includes a bonus server 170. Bonus server 170 is the brain box for the bonus system and includes a separate processor, memory device and random outcome generation program. Bonus server 170 is mounted to an inner panel or structural member, which in turn is mounted to a sidewall 156 and/or base 154.

As seen in FIG. 13, display panel 162*a* and an LED circuit board 152*a* operate together with a gaming device 10 located to the left of spacer assembly 150. Display panel 162*a* may be colored plexiglass or glass and have or display a first color (e.g., red) and a first number (e.g., the number one) corresponding to a first one of the gaming devices (e.g., gaming device 10*b*). LED circuit board 152*a* illuminates display panel 162*a* at selective times appropriate for the first gaming device 10. To that end, processor 12 of the first gaming device 10 is connected operably to LED circuit board 152*a* to cause board 152*a* to be illuminated at appropriate bonus game times and/or during a bonus period for the first gaming device. Alternatively, bonus server 170 is coupled operably to board 152*a* and causes the board to illuminate at appropriate times.

Display panel 162*b* and an LED circuit board 152*b* operate together with a gaming device 10 located to the right of spacer assembly 150. Display panel 162*b* is again colored plexiglass or glass and has or displays a second color (e.g., yellow) and a second number (e.g., the number two) corresponding to a second one of the gaming devices (e.g., gaming device 10*a*). LED circuit board 152*b* illuminates display panel 162*b* at selective times appropriate for the second gaming device 10. To that end, processor 12 of the second gaming device 10 is connected operably to LED circuit board 152*b* to cause board 152*b* to be illuminated at appropriate bonus game times and/or during a bonus period for the second gaming device. Alternatively, bonus server 170 is coupled operably to board 152*b* and causes the board to illuminate at appropriate times.

As illustrated, trimming 168 is provided to mount panels 162*a* and 162*b* to cabinet 160 of spacer assembly. Trimming 168 is polished metal in one embodiment or otherwise has a high quality finish. Trimming 168, similar to the apparatus discussed in connection with FIGS. 11B and 11C, enables panels 162*a* and 162*b* to be replaced easily if (i) they become damaged, (ii) for a design change, (iii) for an upgrade or for any other reason. Further, the color identification sequence between gaming machines 10 can change, necessitating a change in panels 162*a* and 162*b*.

Wiring/Power Connections

The wiring and connection of the various processors and controllers within each system in one embodiment is performed physically via a wire harness that is suitably connected or supported by frame 140 of FIGS. 10A, 10B, and 10C. It should also be appreciated that power is brought to the shared display systems of the present invention via one or more plugs or sockets as desired. For example, power could be brought to a single location within the spacer assembly 150 housing bonus server 170. From there, the power is split as needed to the remaining spacer assemblies 150, the gaming devices 10, the motor assembly for the shared display, as well as the toppers and upper video monitors 66 discussed herein.

In another embodiment, power is delivered along a wiring harness either (i) directly to gaming devices 10 and assemblies 150, (ii) directly to gaming devices 10 and from the gaming devices to respective assemblies 150, or (iii) directly to assemblies 150 and from the assemblies to respective gaming devices. In a further alternative embodiment, each gaming device 10 is powered separately and the assemblies 150 are each powered via a wiring harness, which enables the lights on the spacer assemblies 150 to be synchronized.

In the illustrated embodiment, spacer assembly 150 includes a first power supply 164, which receives house power or power from a step-down transformer located within system 100. Power supply 164 coverts and/or regulates the incoming power to an appropriate voltage (e.g. 24 VDC) for first LED printed circuit board 152*a*. The control circuit for board 152*a* (whether controlled by a gaming device processor 12 or bonus server 170) controls when LED board 152*a* receives power and becomes illuminated, e.g., is an on-off type control. A second power supply 164 (not illustrated) is provided within spacer assembly 150 for second LED board 152*b*, which is controlled in the same manner as first power supply 164.

In the illustrated embodiment, spacer assembly 150 includes an additional power supply 166, which receives house power or power from a step-down transformer located within system 100. Power supply 166 converts and/or regulates the incoming power to an appropriate voltage for bonus server 170.

Using the power structure for spacer assembly 150 as an example, it should be appreciated that gaming devices 10 can have a similar power structure, where separate power supplies are provided for (i) the gaming device brain box and (ii) other components within gaming devices 10, such as the lights, buttons, motors, etc. Isolating the brain box power prevents power loss to the brain box due to faults caused by the separately powered components.

Award Generation Method

This next section of the specification discusses control and award method applicable to each of the shared displays disclosed in FIGS. 4A to 9B, including shared displays 110 (referring collectively or generally to displays 110*a*, 110*b*, 110*c*, 110*d*, 110*e* and 110*f*) of systems 100 (referring collectively or generally to systems or gaming systems 100*a*, 100*b*, 100*c*, 100*d*, 110*e* and 100*f*). One issue solved by the present invention is the control of the payout percentage for the shared display 110 and its associated system 100.

With each generation of shared display 110, multiple outcomes, e.g., twenty-seven outcomes, are simultaneously generated. Some or all of those outcomes may be provided or paid by the respective gaming machines to the players (e.g., up to nine machines sharing display 110). In one embodiment, the outcomes include at least one relatively large value, such as one thousand credits, to interest players. Also, multiple intermediate values are provided. These outcomes are accounted for in the overall payout percentage of the constituent gaming machines 10. That is, the outcomes must fit within the payout scheme and mathematics of the constituent gaming machines 10. The present invention employs systems and methods for controllably and randomly providing the outcomes to the participating gaming machines and players.

In one embodiment, the outcomes are divided into groups. The groups in one embodiment each include the same number of outcomes as there are associated gaming devices, which is nine in the illustrated example. When an outcome from one of the groups is generated randomly for one of the gaming devices, one of the groups is also generated. The outcomes generated and associated for each of the gaming devices come from the generated group. Thus, by controlling or setting the expected value and the spread of values for each group, the system can ensure that each generation of shared display 110 has the possibility of providing a relatively large award to a participating gaming device 10, while also controlling the potential number of credits paid out for any given activation. For example, given a twenty-seven outcome wheel and nine equally spaced apart gaming devices, placing the outcomes of each group three values apart on top 180 of shared display 110 ensures that the gaming devices receive only values from one of the groups upon any single activation or random generation.

While the values of each group (e.g., nine) are evenly divisible into the total number of values (e.g., twenty-seven), the value groups can alternatively include (i) a non-evenly divisible number of values with respect to the total number of values, and (ii) different amounts of values from other groups. For example, a twenty-five panel wheel could be provided for a five gaming device system. In this system, each two gaming devices are spaced apart to have four panels between the two gaming devices. Here, a set A of values could have five values, a set B of values could have ten values and a set C of values could have ten values, wherein the sets are spaced apart repeatedly as set A, set B, set C, set B, set C. Sets B and C have a different number of values (ten) than does set one (five), which is not evenly divisible into the twenty-five total values. Nevertheless, if a value from set B is chosen randomly for any one of the gaming devices, another value from set B is automatically generated randomly each of the other gaming devices.

Figures 14, 15, 16:
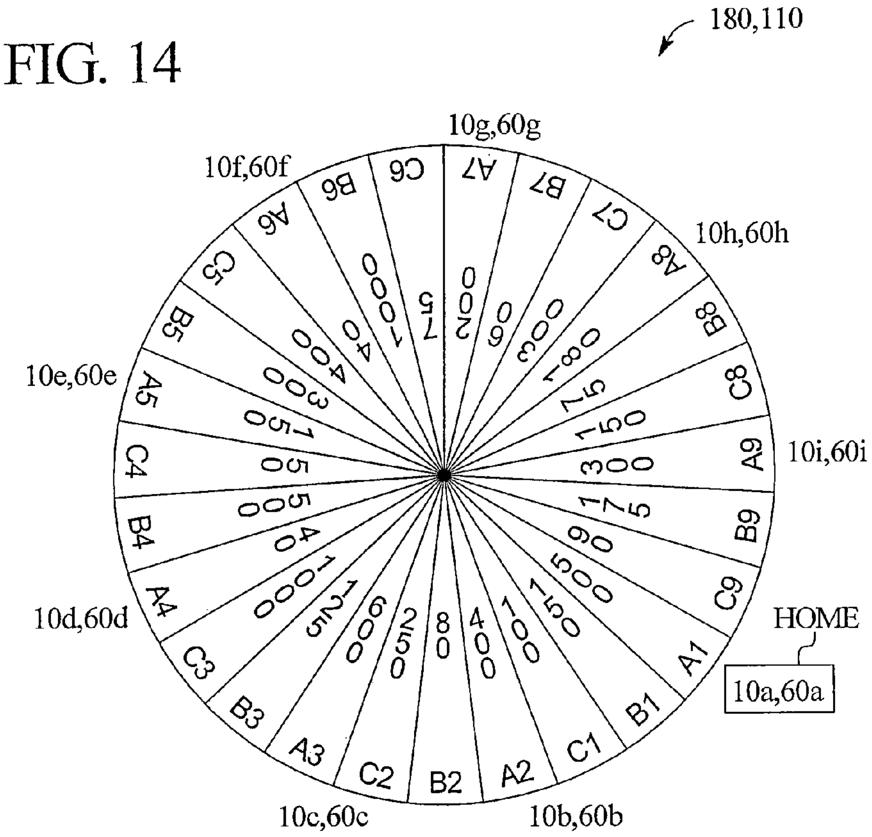
FIG. 14 is a schematic view of the shared display of one embodiment of the present invention showing a plurality of award areas having award values, and wherein the award areas have been grouped into groups or sets A, B and C for the purpose of generating random outcomes on the display for each of the associated gaming devices.
FIGS. 15 and 16 are schematic charts illustrating various random outcome determination schemes for the shared display of the present invention.

Referring now to FIG. 14, one embodiment for controllably and randomly providing outcomes from shared display 110 to participating gaming devices and players is illustrated. FIG. 14 shows a schematic representation of the upper side of top 180 of a shared display having twenty-seven panels or display areas, such as shared display 110 of FIG. 9. The award values of the twenty-seven award areas appear in the same order in FIG. 14 as on the wheel shown in upper video monitor 66 of FIG. 9. The twenty-seven panels are sequentially designated into one of groups A, B and C (not actually shown to players but useful for describing one award generation method of the present invention). The award areas are thus divided into groups A1 to A9, B1 to B9 and C1 to C9.

FIG. 15 shows the award values grouped together under columns A1 to A9, B1 to B9, and C1 to C9. The values are totaled and averaged for each group. That is, as seen in FIG. 15, the average value for the group A is about two-hundred sixty-eight, the average value for group B is about two-hundred seventy-four and the average value of group C is about two-hundred sixty-eight. The average values for groups or sets A to C are therefore approximately equal.

In one embodiment, when the average values of the groups are approximately equal, as in FIG. 15, the groups are weighted equally so that a "true wheel" or shared display is created. That is, each award area or panel has a one in twenty-seven chance of being generated. As seen in FIG. 14, gaming device 10*a*, having indicator 60*a* is set at the home position. In one embodiment, the random generation of the shared wheel 110 is the random determination of which value A1 to C9 to associate with the home position. In FIG. 15, for a true wheel, each award area or panel A1 to C9 has a one in twenty-seven chance of being rotated ultimately to the home position, which is indicated by indicator 60*a* of gaming device 10*a*.

It should be appreciated that due to the fixed relationship between the values on the individual sections of the top 180 of shared display 110, the determination of a value for the home position at gaming device 10*a* is also a determination for each of the gaming devices 10*b* to 10*i*, which are indicated by indicators 60*b* to 60*i*, respectively. Further, because the values in each group or set A to C are each spaced apart three spaces, the generation of any particular group A to C at the home position at gaming device 10*a* sets the group of values for each of the remaining gaming devices 10*b* to 10*i*. If, as seen in FIG. 14, (i) gaming device 10*a* indicates the A group value of five-hundred; (ii) gaming device 10*b* indicates the next and fixed A group value of four-hundred; (iii) gaming device 10*c* indicates the next and fixed A group value of six-hundred; (iv) gaming device 10*d* indicates the next and fixed A group value of forty; (v) gaming device 10*e* indicates the next and fixed A group value of one hundred fifty; (vi) gaming device 10*f* indicates the next and fixed A group value of forty; (vii) gaming device 10*g* indicates the next and fixed A group value of two-hundred; (viii) gaming device 10*h* indicates the next and fixed A group value of one-hundred-eighty; and (ix) gaming device 10*i* indicates the next and fixed A group value of three-hundred.

As seen in FIG. 15, the values are dispersed relatively evenly amongst the three group A to C. Each group includes some lower values and some higher values. For example, the two one-thousand values are split between sets B and C. The two five-hundred values are split between sets A and B. Each group also includes one or two low values, such as the forty, fifty or sixty values. In one embodiment, each group has the same or substantially the same expected value. It therefore makes little difference to the overall expected value of the outcomes to the gaming machine or to the variety of outcomes to generate any one of the groups of values more often than any other of the groups. In an alternative embodiment, the values are distributed differently or non-evenly. For example, one of the sets or groups includes a higher proportion of values at both extremes and less middle range values, while the other two groups, for example, include more middle range values. Here, the gaming device implementer may weight the different sets differently to generate outcomes that, on average, are more widely dispersed or values that tend to be bunched in the middle. The values for each group A to C in FIG. 15 have the same approximate expected value. Weighting differently the likelihood of generating any of the groups A to C does not significantly affect the overall expected value of the shared display.

Referring now to FIG. 16, an alternative embodiment is illustrated where the groups of values A to C have a different average value and are weighted differently to yield a desired total expected value. As illustrated, the average value of the values associated with group A is four-hundred. The average value of the values associated with group B is three-hundred-fifteen. The average value associated with the values of group C is only two-hundred. Next to each of the average values is a weight associated with the likelihood that any one of the groups A to C is generated randomly according to the random outcome generator or program discussed above. It is known in the art to weight award or outcome pools. The random generation program will include more entries for group C, which has a 50% likelihood of being generated, than a proportionate number of entries used for group A and group B, which include probabilities of 20% and 30%, respectively. The random number generation picks one of the entries, which are all weighted equally, but wherein the generation is more likely to be a group C entry than either a group A or group B entry because more group C entries exist.

The resulting expected value of group A as shown in FIG. 16 is eighty. The expected value of group B is ninety-five. The expected value of group C is one-hundred. The total expected value of all three groups added together is two-hundred-seventy-five, which is about the same as the total expected value of the groups in FIG. 15. It should be appreciated therefore that FIG. 16 shows one example of how the award values and generation likelihoods of the groups can be changed without varying the average overall expected value of the shared displays of the present invention.

The table of FIG. 16 shows a distribution that would not result in a "true" wheel because the values associated with group C are more likely to be generated than the values associated with either group A or B. Using a non-even distribution or "non-true" true is advantageous in certain instances. For example, a non-even distribution enables the game implementer to place one or more relatively very large value, low likelihood, awards on the shared display. That is, the "non-true" distribution provides multiple weighted and non-paying places for the very large award to be generated even if each of the gaming devices 10*a* to 10*i* is participating in one of the spins of the shared display of the present invention.

In one embodiment, the weighting is performed at the value group level, which makes the use of value groups A to C attractive. The weights are assigned to the groups A to C of values. In one such embodiment, the weights of the values within each group are equal. That is, if group A is generated, each of the values A1 to A9 has a one in nine chance of being generated. Likewise, if weighted groups B or C are generated under the configuration of FIG. 16, each of the values B1 to B or C1 to C9 are weighted equally or have a one in nine chance of being generated after the random generation of the group has occurred.

In another embodiment, the weighting is performed at the value group level and also at the individual value level. In this embodiment, weights are assigned to each value group, such as group A 20%, group B 30% and group C 50%. The gaming system generates one of the value groups based on the weight of the groups. If group A is generated, one of A1 to A9 is generated. However, in this embodiment, one or more of the values in one or more of the groups is weighted differently than another value in the group. For example, A1 could have a 15% chance of being generated while A2 has a 5% chance of being generated. In one embodiment, at least one of the values in each group is weighted differently than a value in same group. In this embodiment, the gaming system generates a group independently of the individual weights and then uses the individual weights to generate one of the values in the generated group.

In an alternative embodiment, the weighting is performed at the group level and at the individual value level which determines the overall group level weighting. That is, at least two, or more or all of the twenty-seven award values are weighted differently from one another to produce a resulting level of flexibility similar to that of FIG. 16. In this embodiment, each of the values within a group has weight which determines the overall weight of the group. For example, each of the values in each group is weighted. For purposes of illustration, in one embodiment there are 3 groups with 4 values in each group and the weights are: A1 5%, A2 10%, A 3% and A4 2%; B1 20%, B2 5%, B3 5%, and B4 5% and C1 5%, C2 10%, C3 20% and C4 10%. In this embodiment, group A has a 20% chance (5+10+3+2) of being generated, group B has a 35% chance of being generated and group C has a 34% chance of being generated. The weights of the individual values determine the group weights. In one embodiment, the gaming system completes a one step process by generating one of the values based on the weights. In one embodiment, at least one of the values in one of the groups is weighted differently than at least one of the values in another one of the groups.

It should thus be appreciated that the method of FIG. 15 makes two random determinations which includes: (i) selecting the group randomly; and (ii) selecting a value within the selected group randomly to be assigned to one of the machines (thus assigning the other eight values of the selected group to the remaining eight machines due to the fixed nature of the shared displays).

In an alternative embodiment (not illustrated), the gaming system weights group outcomes using a virtual reel strip. For purposes of comparison, the same groups A to C having the same values A1 to A9, B1 to B9 and C1 shown in FIG. 15 are used in this embodiment. Different groups having different values may be used alternatively. Values A1 to A9, B1 to B9 and C1 to C9 in the alternative embodiment which also correspond to those shown in FIG. 14.

In this alternative embodiment, the gaming system only makes one random determination such as by using a virtual reel strip. Each value or outcome of the shared display is represented by one or more positions on the virtual reel strip. In one embodiment, each of the values A1 to A9, B1 to B9 and C1 to C9 is placed on a single virtual reel strip in a proportion that weights the values A1 to A9, B1 to B9 and C1 to C9 in a manner desired by the game implementer. For example, the implementer may wish to have group A values generated randomly twenty percent of the time, group B values generated randomly thirty percent of the time and group C values generated randomly fifty percent of the time. In one embodiment, the virtual reel strip includes 270 total stops or positions. Each group has nine values, yielding thirty different group entries on the virtual reel strip. At the desired twenty percent, six of the thirty possible group entries are filled by group A values. That is, the values in group A are each included or positioned on the virtual reel strip six times. At the desired thirty percent, nine of the thirty possible group entries are filled by group B values. That is, the values in group B are each positioned nine times on the virtual reel strip. At the desired fifty percent, fifteen of the thirty possible group entries are filled by group C values. The values in Group C are each positioned fifteen times on the reel strip.

The six groups of A values, nine groups of B values and fifteen groups of C values may be dispersed as desired. This virtual reel strip embodiment thus enables a single random determination to be made in place of the two random determinations made in connection with the embodiment of FIG. 15. In one embodiment, each of the 270 positions or stops is as likely to be generated (by a random outcome generator) as any other position. The proportion of the values of the different groups provides the weighting as described above.

It should be appreciated that the virtual reel strip may include any suitable number of stops or positions. In one embodiment, the values or outcomes of the shared display are represented on the virtual reel strip by numbers such as 1, 2, 3, 4, etc. It should be appreciated that the random number generator and the virtual reel strip may be used with groups or without groups. In another embodiment, the values of each group may be weighted to produce an overall group value. That is, some of the values in one group may be positioned on the virtual reel strip more times than the other values in the same group on the virtual reel strip. The weight or the positioning of the individual values determines the group's weight as a whole. It should be appreciated that a virtual reel strip may be implemented in the present disclosure in any suitable manner.

Figure 17:
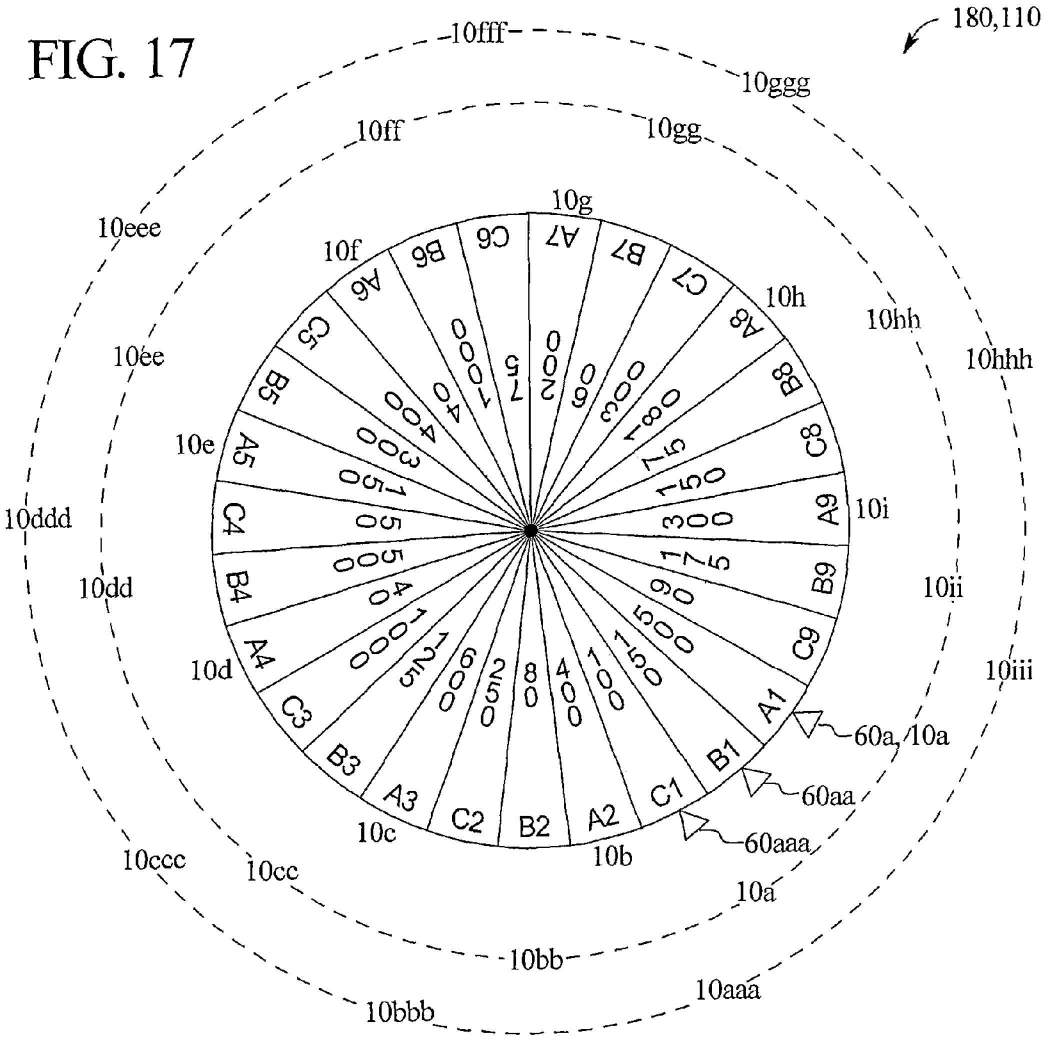
FIG. 17 is a schematic view of an alternative embodiment of a shared display showing a plurality of award areas having award values, and wherein each award area is associated with an individual gaming device.

Referring now to FIG. 17, an alternative embodiment of the present invention utilizes more than nine or each of the available twenty-seven outcome slots. In accordance with the wheel theme of the displays shown herein, it is contemplated to provide second and third rows of gaming devices or to group additional gaming devices in remote locations, which each consume one of the award areas or panels of the shared display 110 of the present invention. For ease of illustration, the second set of nine gaming devices 10*aa* to 10*ii* is located about a dashed inner circular line. The third set of gaming devices 10*aaa* to 10*iii* is located about a dashed outer circular line.

Both the positions along the inner and outer circular lines are spaced radially from the center of top 180 of shared display 110. It is not necessary, however, that each gaming device be physically coupled to a particular radial position about shared display 110. For example, indicators such as 60*aa* and 60*aaa* could be placed physically at the shared display 110 to associate with an award generation area. Those indicators 60*aa* and 60*aaa* are then remotely associated with gaming device 10*aa* or 10*aaa*, respectively, so that the players playing those gaming devices can determine whether they have won an award on shared display 110 and the value of such award. For example, remote large video monitors 66 could be placed within the casino or gaming establishment showing a live, simulated video of the spinning or generation of shared display 110, so that the remote players can see their indicated position on the remote video monitor. The remote players can see the entire generation of the outcomes and their results. It should be appreciated from FIG. 17, that on a shared display or a wheel having n symbol panels or award areas, such display can generate random outcomes for one to n different gaming devices 10.

As illustrated in FIG. 17, in the embodiment with twenty-seven different gaming devices 10*a* to 10*iii*, the distribution of the award values is different. A very high award value will be provided to one of the players if all twenty-seven machines are participating in a generation of shared display 110 regardless of how differently the values are weighted. Due to the fixed relationships between the values on the shared display 110, it is irrelevant how unlikely it is that a very large value will be rotated to the home position (e.g., gaming device 10*a*). The very large value is going to land in front of one of the indicators 60, which are associated with a gaming device that could be active. Thus, a wheel having a larger percentage of gaming devices and less unmanned gaming devices with which to generate very large awards can cause the game implementer to use a different set of award values, different probabilities for triggering the bonus game different requirements for being eligible for the bonus game or other suitable different mathematical configurations. For example, the implementer could use many very small awards and very few large awards. Such arrangement may not be as desirable when multiple players are part of the same generation of shared display 110 and are consistently receiving low value outcomes. In any case, it should be appreciated that the shared display as discussed includes a large variety of options, value ranges and weighting capabilities for the game implementer to fashion a game that is fun and exciting.

Referring now to FIG. 18, a gaming device environment 190 illustrates one implementation of the differently grouped gaming devices 10*a* through 10*iii* shown in FIG. 17. Gaming environment 190 shows a side-sectional fragmentary view of shared display 110 and one of its adjacent gaming devices 10*a*. A player 194*a* is currently playing gaming device 10*a*. Although not illustrated, gaming devices 10*b* through 10*i* are located around the perimeter of shared display 110 as has been shown and described herein.

A stage or platform 192 is provided that elevates the second or "B" group of gaming devices 10*aa* through 10*ii* (see FIG. 17) above gaming devices 10*a* through 10*i* (located adjacent to shared display 110). As illustrated, the second or "B" group of gaming devices 10*aa* through 10*ii* is also located further away from display 110 than is the first or directly adjacent "A" group of gaming devices 10*a* through 10*i*. The elevation of the "B" group of gaming devices 10*aa* through 10*ii* enables a second group of players 194*aa* to 194*ii* to see over gaming devices 10*a* to 10*i* and to readily view outcomes generated on shared display 110. The "B" group players can also view their associated outcomes on one of the large video monitors 66.

As seen in FIG. 17, gaming device 10*aa* of group "B" includes an indicator 60*aa* located at shared display 110. Player 194*aa* can locate indicator 60*aa* on the shared display to see which outcome of shared display 110 is generated in association with gaming device 10*aa*. In one embodiment, as seen in FIG. 17, gaming device 10*aa* is located radially inline with indicator 60*aa*. Player 194*aa* therefore looks straight ahead to easily locate and see indicator 60*aa*. Additionally or alternatively, gaming device 10*aa* is provided with indicia that matches or identifies indicia provided at or on indicator 60*aa*. For example, gaming device 10*aa* could have a same color or pattern as indicator 60*aa*. In another embodiment, gaming device 10*aa* has a same number or other identifier as that of indicator 60*aa*.

Gaming devices 10*aa* and 10*aaa* are not shown in cross section because they are located on a different radial axis extending from shared display 110 than is gaming device 10*aa*. For example, as shown in FIG. 17, gaming device 10*aa* is offset an amount in a clockwise direction from gaming device 10*a*. Gaming device 10*aaa* is offset in an amount in a clockwise direction from gaming device 10*aa*. In one embodiment, each gaming device 10*a* to 10*iii* (of groups "A" to "C") has a direct line of sight to display 110 without having to look over or around another player.

In an alternative embodiment, the elevated groups of gaming devices are not provided in the same shape or peripheral configuration as is shared display 110. For example, gaming devices 10*aa* to 10*ii* could be provided in a row, where players 194*aa* to 194 *ii* view the outcome of shared display 110 on one of the large displays 66. In this embodiment, the perimeter of shared display 110 is generally circular. As discussed herein, gaming devices 10*aa* to 10*iii* do not have to be located near shared display 110 and instead can be located at a remote location, wherein players 194*aa* to 194*iii* cannot physically see shared display 110.

Each of gaming devices 10*a* to 10*iii* includes a display device 16 upon which the player views the base game of the respective gaming device 10. In one embodiment, display device 16 shows an outcome of shared display 110 when the player has triggered the bonus, is no longer playing the base game and is participating in the bonus event.

The video display of the generation of shared display 110 on any one of the large displays 66 or on gaming device displays 16 can be an actual video, e.g., television display, from a feed broadcast at shared display 110. For example, one or more video cameras is provided at shared display 110 that records a part of, e.g., a third of, or captures all of shared display 110. Alternatively, large displays 66 or individual gaming monitors 16 display a computerized or otherwise simulated but accurate version of the outcome of shared display 110. The simulated version is true and accurate with respect to the resulting associated outcomes for gaming devices 10.

Platform 192 is structured so that group "C" gaming devices 10*aaa* through 10*iii* are located further from and elevationally higher than shared display 110 than are the gaming devices 10*aa* to 10*ii* of the "B" group. The present invention expressly contemplates providing as many elevated sections or rows as necessary to provide at least one gaming device for each outcome of shared display 110. For example, the three groups of nine gaming devices shown in FIG. 17 are located in the three separate sections or groups shown in the environment 190 in FIG. 18. The total twenty-seven gaming devices 10 are each associated with one of the twenty-seven total outcomes of shared display 110.

Queuing

If a first bonus triggering event occurs on one of the gaming machines for a first player, the first bonus event begins automatically (in a first triggering arrangement) or upon a player input (in a second triggering arrangement). If the first bonus event ends (e.g., the wheel stops spinning and an outcome is indicated on the wheel in association with each gaming machine) before a second or subsequent bonus triggering event occurs on a second or another gaming machine being played by a second or another player, that second or subsequent bonus triggering event occurs in the same manner because the shared bonus display (e.g., wheel) is not in use. If (i) the second or subsequent bonus triggering events occurs before the first bonus event ends; (ii) two or more players trigger the bonus before the second bonus begins or (iii) one or more players triggers the bonus but does not wish to take part in the next bonus spin, etc., then a suitable queuing method is employed. The gaming system of the present invention will employ one of the queuing methods on a consistent and expected basis. The queuing methods operate with one or both of the following triggering arrangements.

In a first type of bonus triggering arrangement, when a gaming device triggers the shared display bonus 110, the shared display begins to generate outcomes automatically without any input from the triggering or eligible player. The first arrangement gives control to the gaming devices 10 and does not allow players to wait before playing the bonus.

In a second type of bonus triggering arrangement, a player input is required to initiate the outcome generation of shared display 110. The second arrangement provides more player interaction. Here, each gaming device 10 is equipped with one or more input devices 30, such as an input device 30 operating with touch screen 42. These input devices initiate the bonus game and outcome generation of shared display 110. Requiring a player input opens different avenues for queuing as discussed below.

The following queuing methods, unless otherwise stated, can be implemented in combination with either the first or second bonus triggering arrangements.

A first queuing method operates the shared bonus display in a purely sequential manner. Each gaming device on which a bonus triggering event occurs waits until each of the previous display generations has been completed before having its generation occur. With this first queuing method, players of gaming machines that have triggered the bonus may have to wait relatively long or short periods of time to play or participate in the bonus event using shared display 110. The wait may depend on: (i) the number of associated gaming machines, (ii) the number of players playing the associated gaming machines, (iii) the rate of play of each of the players playing the associated gaming machines, (iv) the average expected hit frequency of the bonus triggering event, and (v) the actual hit frequencies of the bonus triggering events.

A long wait caused by several triggered bonus events may cause players to become dissatisfied with the system of the present invention. Such waits may also slow down play of the primary games of the gaming machines. Additionally, when the player has the ability to start the bonus game by activating an input device, one or more players may take a relatively long time to start the bonus event as discussed below. Accordingly, the present invention contemplates employing one of a plurality of non-purely sequential queuing methods to overcome these problems.

Figure 19:
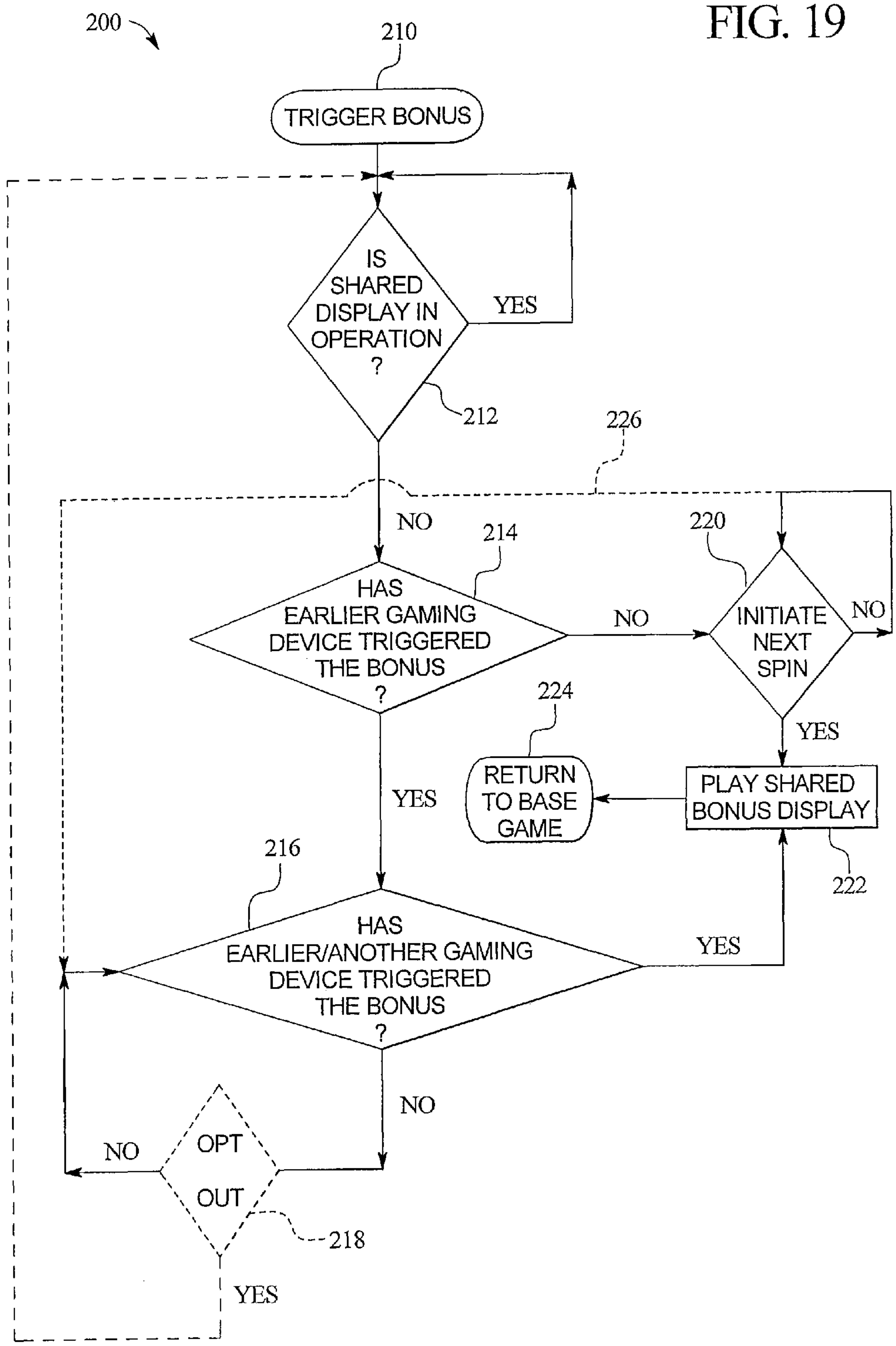
FIG. 19 is a schematic block diagram of one embodiment of a queuing method of the present invention.
Figure 20:
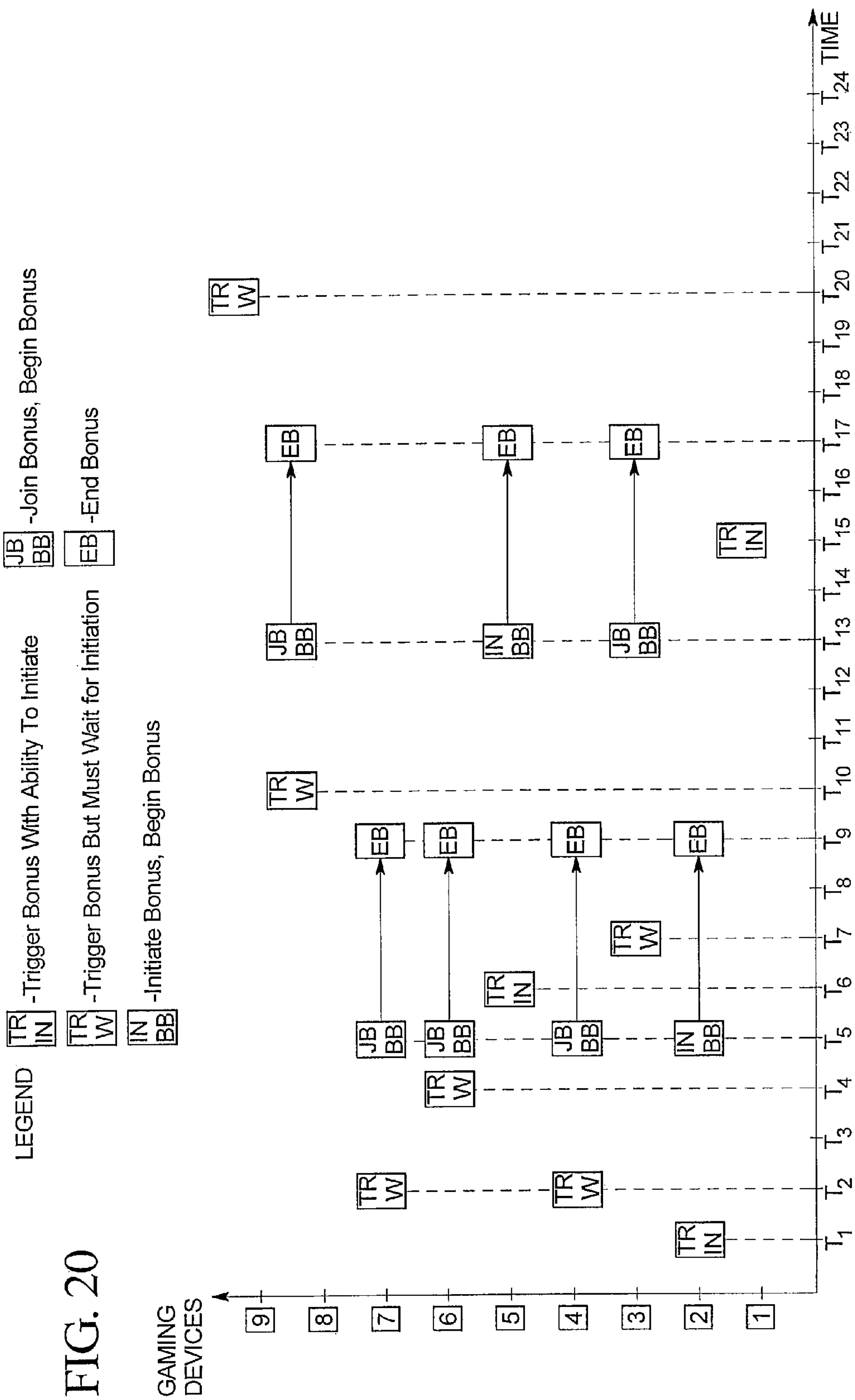
FIG. 20 is a time line further illustrating the queuing method of FIG. 19.

Referring now to FIGS. 19 and 20, a second queuing method is provided, which groups together the gaming machines that trigger the bonus event while a random generation of the shared display is occurring. In one implementation, if a first bonus game triggered by a first gaming machine is in progress, all gaming machines that trigger the bonus event while the game is in progress become grouped together and await the end of the first bonus event and a beginning of a second bonus event. After the end of the first bonus event, the grouped gaming machines will then simultaneously participate in the second bonus event or random generation of the shared display. The shared display generates outcomes for each of the associated gaming machines. Outcomes for the gaming machines actually participating in the second bonus event are given to or recorded by those gaming machines and can be redeemed by their respective players.

In the second queuing method, firm cut-off times are employed to delineate the groups of gaming machines that have triggered the bonus event. Any gaming machine that triggers the bonus event, after a predetermined time is grouped in a subsequent group of gaming machines. In various implementations, the time after which a triggering gaming device is grouped in a subsequent bonus is set at: (i) a fixed amount of time before a bonus event begins (e.g., one second); (ii) the exact point in time when a bonus event begins; (iii) within a predetermined time after a bonus event begins; or (iv) before a predetermined time before a current bonus event ends.

Each gaming machine that triggers the bonus is thus placed into a group based on when the gaming machine achieves the bonus triggering event and the status of the shared display, e.g., currently not running or currently generating outcomes. For example, if a first bonus triggering event occurs on one of the gaming machines, a first bonus event can begin automatically (in the first triggering arrangement) or upon a player input (in the second general triggering arrangement). If a second bonus triggering event occurs on a second one of the gaming machines for a second player before the cut-off time, the second bonus event is grouped in with the first bonus event and becomes part of the first bonus event.

If a second bonus triggering event occurs instead on a second one of the gaming machines for a second player after the cut-off time, the second gaming machine's bonus play bonus event is placed in a new or second group. The second bonus event is played after the end of the first bonus event. If a third bonus triggering event occurs on a third one of the gaming machines for a third player after the cut-off time, the third gaming device's bonus play is grouped and played with the second bonus event, which is played after the end of the first bonus event. Here, the second and third gaming machines play the second bonus event together. In this embodiment, gaming machines that trigger the bonus event at different times can be grouped together.

One of the embodiments for implementing the second queuing method is illustrated in FIG. 19 via the method 200. Here, the predetermined cut-off time is the time when the bonus event begins. Method 200 illustrates the second queuing method from the standpoint of one gaming device. Method 200 begins at step 210, where any one of the associated gaming devices 10 triggers the bonus game of the shared displayed 110 of the present invention. As discussed above, in one embodiment a particular symbol or combination of symbols appearing on an active payline of a slot machine triggers the shared display bonus. As also discussed above, in a first trigger arrangement the triggering of the bonus automatically causes shared display 110 to begin to generate outcomes. Method 200, on the other hand, involves the second triggering arrangement in which one of the players initiates the beginning of the outcome generation of shared display 110.

After triggering the bonus in step 210, the system determines whether shared display 110 is currently in operation, e.g., such as spinning to generate outcomes, as indicated by diamond 212. If the shared display is in operation, the method loops back to the input side of diamond 212 and that loop is repeated until shared display 110 has stopped moving and has generated outcomes in association with the gaming devices.

Next, it is determined whether an earlier gaming device has already triggered the bonus, as indicated by diamond 214. In one embodiment, the earliest triggering gaming device has priority over each later triggering gaming device in deciding when to begin the next bonus event of the present invention. If an earlier gaming device has triggered the bonus in connection with diamond 214, it is determined whether the earlier gaming device has initiated the bonus, as indicated by diamond 216. If the earlier gaming device has not initiated the bonus, the present gaming device has to wait for the earlier triggering gaming machine to initiate the bonus. The loop generated by diamond 216 is repeated until the earlier triggering gaming device initiates the bonus.

In an alternative implementation, the player is enabled to opt-out of the next generation of the shared display as indicated by diamond 218 shown in phantom. That is, if while waiting for the first triggering gaming device to initiate the next bonus generation, the current player decides not to participate in the next generation and wait for a later generation. The player can press an input device 30 (which can be a portion of one of the display device 16 operable with touch-screen 42) to inform gaming device 10 not to join the next bonus generation. If the player decides to opt-out of the next generation of shared display 110, the method 200 loops back to the input side of diamond 212 and the previously discussed steps are repeated as illustrated.

A player who opts-out as illustrated in block 218 in one implementation is able to option back into the next bonus as long as the earlier gaming device has not initiated the bonus as seen in diamond 216. To that end, gaming device 10 may provide on monitor or display device 16 operating with touch screen 42 one or more input devices 30 that appears when the gaming device triggers the bonus, as indicated by block 210. The one or more input devices enables the player to opt-out and opt-back-in at least one time and in one embodiment an unlimited number of times before the earlier triggering gaming device initiates the bonus. Alternatively, the toggle button (s) is electromechanical and provided on the console of gaming device 10.

Method 200 continues the above-described looping until one of two conditions occurs. First, the earlier player can decide to initiate the bonus, as indicated by diamond 216. If so, the current gaming device and current player play the bonus game of the shared display 110 of the present invention (with the earlier player) as indicated by block 222. Afterwards, the gaming device and player return to the base game with any bonus award provided via shared display 110 as indicated by oval 224.

A second condition occurs when no earlier gaming device has triggered the bonus of the present invention, as indicated by diamond 214. In such a case, the current player is the priority player who decides when the next bonus event takes place. In particular, the player decides whether to initiate the next spin as indicated by diamond 220. A loop is created about diamond 220 in which the player is prompted visually and/or audibly to initiate the next spin until the player initiates the generation of shared display 110. At that point the player as well as any other gaming devices 10 that have triggered the bonus will play the shared display bonus, as indicated by block 222. Afterwards, the player(s) returns to the base game with any award from the bonus, as indicated by oval 224.

The player initiation gives players control of when to start the bonus event and provides more player interaction, which is desirable. However, the player input adds complexity to the queuing method because a first player who triggers the bonus event before a second player does so may wait a relatively long time to activate the bonus, causing delay for all people in the relevant bonus.

The delay of the start of the bonus event causes delays for all machines entering the current bonus group. This delay may extend not only to play of the bonus game and the shared display but also to delay of play in the primary game. Accordingly, the present invention contemplates queuing methods that account for a player's delay or failure to activate an input device to cause the bonus event to begin.

One solution is illustrated in FIG. 19 by an alternative embodiment of the method 200 indicated by phantom line 226. Here, if the player who has the ability to initiate the next bonus spin does not initiate the bonus, as indicated by diamond 220, the method 200 enables another gaming device or any other gaming device that has triggered the bonus (a later triggering gaming device), to initiate the bonus game of the shared display 110 of the present invention. That is, line 226 extends from a decision by the priority player not to initiate the bonus back to diamond 216, where a decision by another player to initiate the bonus takes priority away from the original player and commits the original player to participation in the next bonus play or next shared display generation (the word "another" is therefore added behind the word "earlier" in diamond 216). Therefore, if a particular player who has control over the initiation of the shared display bonus will not initiate such generation, a different player who has subsequently triggered the bonus can instead initiate the bonus.

Referring now to FIG. 20, a timeline is provided that further illustrates the method 200 of FIG. 19, and in particular, from a standpoint of all nine gaming devices in the above described example. In FIG. 20, the gaming devices are represented along the Y-axis, while times T1 to T24 are represented along the X-axis. A legend is also provided. In the legend, the letters TR/IN stand for a triggering of the bonus in which the triggering gaming device has the ability to initiate the bonus. The letters TR/W stand for a triggering of a bonus in which the triggering gaming device has to wait for another gaming device to play the bonus. The letters IN/BB indicate an initiation of the bonus and when the bonus event (e.g., spinning of shared display 110) actually begins. The letters JB/BB indicate an automatic joining of the bonus by a later triggering gaming device when the bonus begins. The letters EB stand for an ending of the bonus.

Using the above designations, times T1 to T24 illustrate one sequence of game play of Gaming Devices One to Nine. Time increments T1 to T24 can be any suitable increments of time. As seen, at time T1 Gaming Device Two triggers the bonus and has the ability to initiate the generation of shared display 110 because Gaming Device Two is the first gaming device to trigger the bonus.

At time T2, Gaming Devices Four and Seven trigger the bonus but must wait for Gaming Device Two to initiate the bonus. Again at time T4, Gaming Device Six triggers the bonus but has to wait for Gaming Device Two to initiate the bonus. At time T5 Gaming Device Two initiates the bonus and the bonus begins. At that same instant T5, Gaming Devices Four, Six and Seven automatically join the bonus. As discussed above in connection with FIG. 19, in one alternative implementation of method 200, any of the Gaming Devices Two, Four, Six and Seven are enabled to initiate the bonus, so that Gaming Devices Four, Six and Seven do not have to wait until time T5 for Gaming Device Two to initiate the bonus.

In another alternative implementation of method 200, any of the Gaming Devices Two, Four, Six and Seven can opt-out of the next generation of shared display 110 at any time prior to time T5. For example, if the player at Gaming Device Two desires to continue to play the base game and wait for a later time at which to play the bonus game, the player at Gaming Device Two can choose to do so. The players at Gaming Devices Four, Six and Seven can also choose to wait. It should be appreciated that in this alternative embodiment, it is possible for a player to allow the gaming device to accumulate two or more triggering events and, for example, participate in two back-to-back bonus generations.

In the illustrated embodiment, shared display 110 generates outcomes over four time increments from time T5 to time T9, at which point the bonus ends for each of Gaming Devices Two, Four, Six and Seven. As discussed herein, shared display 110 generates an outcome associated with each of the Gaming Devices One to Nine. However, only the outcomes associated with the Gaming Devices Two, Four, Six and Seven in this instance are actually provided or downloaded from bonus server 170 of shared display 110 to the processors 12 of the individual gaming devices 10.

Between generation times T5 and T9, Gaming Device Five triggers the bonus at time T6, while Gaming Device Three triggers the bonus at time T7. Gaming Devices Three and Five do not join the ongoing first generation of shared display 110 and have to wait for the second bonus generation. Because each of the Gaming Devices Two, Four, Six and Seven have cleared the queue, Gaming Device Five becomes the new controlling or priority gaming device with the ability to initiate the second bonus. Gaming Device Three triggering at time T7 has to wait for Gaming Device Five to initiate the bonus in one embodiment. Also, Gaming Device Eight at time T10 (after the first generation of shared bonus 110 has ended) triggers the bonus and has to wait for Gaming Device Five to initiate the bonus. Gaming Device Five can initiate the second bonus at any time after time T9, the end of the first bonus generation. In an alternative embodiment, either Gaming Devices Three or Eight can initiate the second bonus at any time after time T9.

At time T13, Gaming Device Five initiates the second bonus. Gaming Devices Three and Eight are joined in second the bonus automatically. The bonus spans from time T13 to time T17 as illustrated. During that time, namely at time T15, Gaming Device One triggers the bonus. At time T17, the second bonus generation ends and each of the Gaming Devices Three, Five and Eight is provided with an outcome or award from shared display 110 (each of Gaming Devices One to Nine is associated with an outcome however).

At time T20, Gaming Device Nine triggers the bonus. Because Gaming Devices Three, Five and Eight have cleared the queue, Gaming Device One receives priority and has control over when the next bonus event initiation takes place. In one embodiment, Gaming Device Nine has to wait for Gaming Device One to initiate the bonus. It should be appreciated that the illustrated sequence is repeated for Gaming Devices One through Nine, different ones of which can trigger the generation on shared display 110 at any time based on trigger hit frequency, amount of play, speed of play, or any other suitable game characteristic or function.

A third queuing method contemplated by the present invention is used in combination with second triggering arrangement, where the player activates an input device to start or initiate the bonus event for that player or gaming device. In the third method, groups of participating gaming devices are again employed, however, players are enabled to selectively join (rather than automatically join) a group that will play the next bonus event. Each player after triggering the bonus event commands the gaming device to join a group by inputting a command to do so. The groups may be likened to trains leaving a station at a specified time. A player who has triggered the bonus or shared display 110 can leave with the next train (play the next bonus spin) or wait for a later occurring bonus spin. A player who delays bonus play, however, does not impede other players who want to play the bonus.

Figure 21:
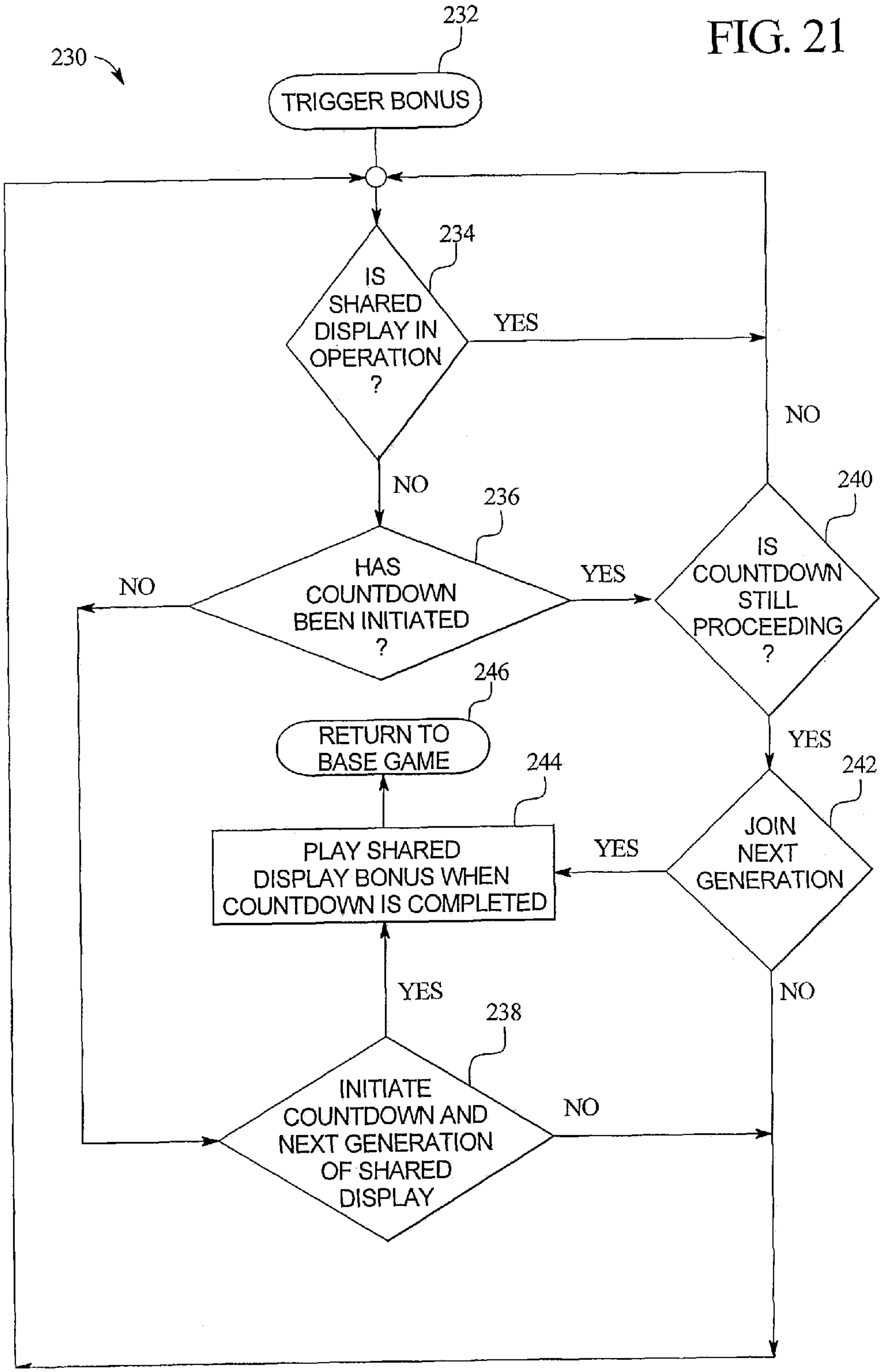
FIG. 21 is a schematic block diagram of another embodiment of a queuing method of the present invention.
Figure 22:
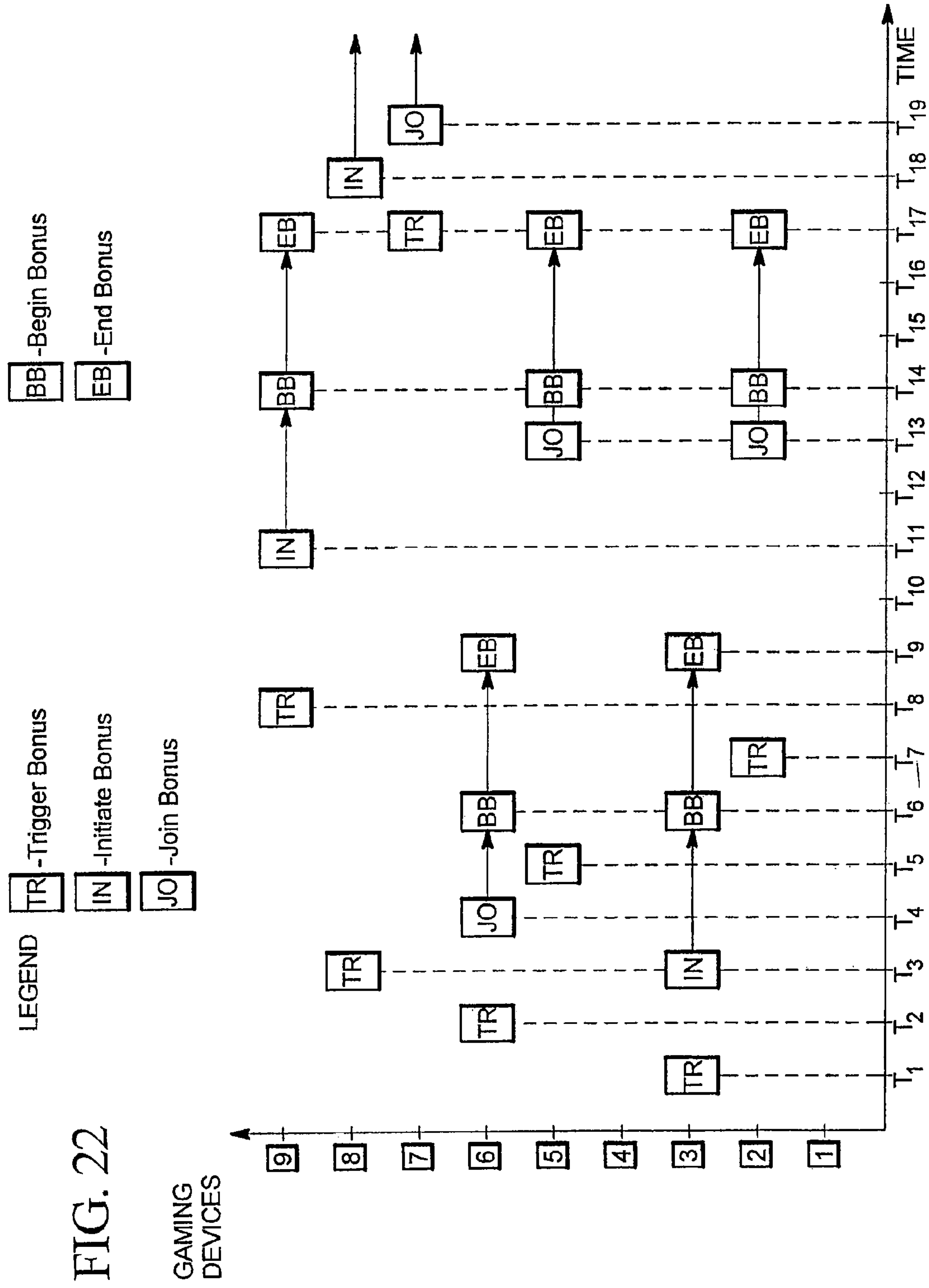
FIG. 22 is a time line further illustrating the queuing method of FIG. 21.

As illustrated by FIGS. 21 and 22, when a bonus event has been initiated and is currently being played, each gaming machine on which a bonus triggering event subsequently occurs awaits the end of that bonus event. Once that bonus event ends, any one of the gaming machines on which a bonus triggering event has occurred can initiate the next bonus event. Thus, any one of the gaming machines on which a bonus triggering event has occurred can initiate the bonus event if both: (a) no bonus event is currently being played, and (b) no bonus event is currently initiated.

In this third queuing method, if one of the gaming machines on which a bonus triggering event has occurred initiates the bonus event, then the other gaming machines on which a bonus triggering event has occurred cannot initiate the bonus event, but can join the initiated bonus event. More specifically, in one embodiment, during a fixed period of time after the player of one of the gaming machines (which has achieved the bonus triggering event) activates an input device to initiate the bonus event, any or all of the other gaming machines on which a bonus triggering event has occurred can join in the group to play the bonus event.

In one such embodiment, this queuing method employs a bonus event countdown indicator. The countdown indicator is displayed by the gaming machines 10 that have triggered the bonus event and/or by one, or more or all of the large overhead monitors 66. The countdown indicator displays a count or countdown to the end of the period of time during which the triggering gaming devices can join the next random outcome generation of the shared display. During the countdown, players can decide to join the bonus event, which has been initiated by another player. The bonus event occurs after the end of the countdown, the shared display simultaneously generates outcomes associated with each associated gaming device. However, only outcomes generated for participating gaming devices, e.g., those that have either initiated or joined the bonus event, actually receive the generated outcomes. Any player who elects to not join the group participating in the initiated bonus event still has an outcome generated for that player, but waits to join a subsequent bonus event to be provided with an outcome that is actually received by the gaming device and downloaded to the player's credit meter.

In this third embodiment, any player playing a gaming machine that triggers the bonus event during the countdown may also join the group of that bonus event, assuming the player selects to do so within the countdown period. That is, the player does not have to trigger the bonus before the countdown begins. Any player that does not join the group for that bonus play by initiating the bonus event (i.e., the first player) or during the countdown must wait for a subsequent bonus event.

It should also be appreciated that when the countdown is complete (e.g., hits zero), at least one gaming machine is guaranteed to be in the bonus event because one gaming machine must initiate the bonus event and the countdown to start the bonus event. This third embodiment enables players to bypass a first player who will not initiate the bonus event even though the gaming machine being played by that first player has triggered the bonus event prior to the triggering gaming machines played by other players. One player is prevented from delaying play of the bonus event for other eligible players because any of the eligible players can initiate the bonus event. An eligible player may delay his or her own bonus play but not the bonus play of other players.

Referring now to FIG. 21, one embodiment of the third queuing method is illustrated by method 230. As discussed above, method 200 of FIGS. 19 and 20 in one embodiment is an opt-out method (method 200 does not require the opt-out option). Method 230 of FIGS. 21 and 22 on the other hand is an opt-in method. In method 230 upon triggering the bonus, as indicated by oval 232, it is determined whether shared display 110 is in operation as indicated by diamond 234. If shared display 110 is in operation, a loop back to the input side of diamond 234 occurs, which continues until shared display 110 is no longer in operation.

When shared display 110 is no longer in operation, it is determined whether a countdown initiated by another gaming device that has triggered the bonus has been initiated as indicated by diamond 236. Method 230 includes a countdown that begins when any of the gaming devices 10 initiates the bonus game of the present invention. That is, after any of gaming devices 10 triggers the bonus no action is taken by shared display 110 until one of the triggering players selects or activates an input 30 (such as an area of display device 16 operable with touchscreen 42) that initiates the countdown and the next generation of shared display 110.

If the countdown has not been initiated as indicated by diamond 236, the system determines whether the current player initiates the countdown and the next generation of shared display, as indicated by diamond 238. That is, when the current bonus game triggers the bonus, if (i) the shared display is not in operation and (ii) no countdown has already been initiated, then the current player may initiate the countdown and the next generation of shared display 110. Upon doing so, the current player along with any other eligible gaming device that (i) has triggered the bonus (before or after the current player's trigger) and (ii) that opts-in during the countdown period can collectively play the shared bonus. The bonus starts when the countdown is completed, as indicated by block 244. Afterwards, each of the participating players returns to their respective base game, as indicated by oval 246.

If (i) the player has triggered the bonus, (ii) the shared display is not currently in operation and (iii) the countdown has been initiated previously, as indicated by diamond 236, it is determined whether the countdown is still proceeding, as indicated by diamond 240. Method 230 contemplates a time gap between when the countdown ends and when the shared display begins spinning or generating outcomes. Accordingly, the determination in connection with diamond 240 is made. Alternatively, if the shared display begins generating outcomes at the instant the countdown is completed, the determination in connection with diamond 240 is not necessary.

If the countdown is still proceeding as indicated by diamond 240, it is next determined whether the player wants to join the next generation of shared display 110, as indicated by diamond 242. If the player decides not to join the next generation of shared display 110, as indicated by diamond 242, or if the player decides not to initiate the countdown and the next generation of shared display 110, as indicated by diamond 238, the sequence starts over with a determination whether shared display 110 is in operation, as indicated by diamond 234.

If however the player decides to join the next generation of shared display 110, as indicated by diamond 242, and does so within the countdown, as indicated by diamond 240, then the player joins the next generation of the shared display, which occurs when the countdown is completed as indicated by block 244. The player and any other players that have triggered or joined the bonus generation receive any bonus awards from such generation and return to base game play, as indicated by oval 246 (all gaming devices are associated with an outcome of shared display 110 as discussed herein).

Referring now to FIG. 22, a timeline is illustrated showing a sequence for Gaming Devices One to Nine according to the method 230 of FIG. 21. FIG. 22 includes a legend. In the legend, the letters TR indicate a time at which the bonus is triggered by one of the gaming devices 10. The letters IN indicate a time at which one of the gaming devices initiates the bonus. The letters JO indicate a time at which one of the gaming devices joins a next random generation of shared display 110. The letters BB indicate at time at which the shared display 110 begins to generate outcomes. The letters EB indicate a time at which the generation of shared display 110 ends.

As seen in FIG. 22, at time T1 Gaming Device Three triggers the bonus. At time T2 Gaming Device Six also triggers the bonus. At time T3 Gaming Device Three initiates the bonus, and Gaming Device Eight also triggers the bonus. The initiation of the bonus at time T3 by Gaming Device Three begins a countdown period that lasts for three time increments. At the time of the initiation of the countdown Gaming Devices Six and Eight are eligible to join the bonus. At time T5, during the countdown, Gaming Device Five also triggers the bonus and also becomes eligible to join the next generation of shared display before the countdown ends.

The countdown ends and the bonus begins at time T6. Only Gaming Device Six has joined the next generation of shared display 110, which occurs at time T4 within the countdown period. Accordingly, while shared display 110 simultaneously generates separate outcomes for each of the associated Gaming Devices One to Nine, only the outcomes generated for Gaming Devices Three and Six are actually paid by those gaming devices upon receipt of the appropriate signals from bonus server 170. This is true even though Gaming Devices Five and Eight are also eligible to join the next generation. For whatever reason, the players of Gaming Devices Five and Eight have decided to wait to play the bonus game of the present invention.

The bonus generation consumes three time periods from time T6 to time T9. At time T7, Gaming Device Two triggers the bonus. At time T8 Gaming Device Nine also triggers the bonus. At time T9, the first bonus generation ends and Gaming Devices Three and Six are provided awards and cleared from the queue.

Even though Gaming Device Nine is the last eligible gaming device to have triggered the bonus, because each of the eligible gaming devices has the opportunity to initiate the next shared display 110, Gaming Device Nine at time T11 is able to initiate the next bonus. At time T11 the gaming devices that are eligible to join the bonus with Gaming Device Nine are Gaming Devices Two, Five and Eight. The second countdown period also lasts for three time increments from time T11 to time T14. During that time, namely at time T13, gaming devices 2 and 5 join the second generation of shared display 110, which begins at time T14.

The second generation of shared display 110 consumes three time periods from time T14 to time T17. At time T17 each of Gaming Devices Two, Five and Nine receive outcomes or awards (although all nine gaming devices are associated with outcomes from shared display 110). Gaming Devices Two, Five and Nine are cleared from the queue. At time T17 Gaming Device Seven also triggers the bonus. At time T18, Gaming Device Eight which triggered the bonus back at time T3 finally decides to play the bonus game and initiates a third countdown period. At time T19, Gaming Device Seven which has just triggered the bonus decides to join in the next generation of shared displayed 110.

While it is possible (and the present invention includes) to begin a next countdown period before the end of a current bonus generation, it is believed that a separation of the two events is desirable. In one embodiment therefore, a current bonus generation must end before a new countdown period can begin.

The opt-in method 230 illustrated in FIGS. 21 and 22 is desirable for a number of reasons. First, it allows any player to wait until a desired time to join the bonus. Method 230 does not require the player to press an input to opt-out or otherwise be automatically joined in the bonus. Further, method 230 does not present an adverse situation where eligible players who want to initiate or join a bonus have to wait for another triggering player to initiate the bonus.

It is believed that the countdown sequence will display well on the large overhead monitors 66. To that end, it is expressly contemplated to provide queuing information from any of the queuing methods described herein, such as methods 200 and 230, on the overhead monitors 66. In particular, in connection with method 230, the countdown is shown in large numbers, perhaps with accompanying audio so that not only are the eligible players made aware that they can join the next spin, players of the other gaming devices will feel a sense of excitement as will passersby. The countdown can also be displayed on a portion of each of the individual display devices 16. For eligible gaming machines the individual displays can be enhanced. Furthermore, for eligible gaming machines the input to join the bonus can be enhanced via any visual technique to make joining the bonus easy for a player who might be excited and having difficulty finding the input to join the countdown.

Various ones of the queuing methods discussed above enable the player to accumulate multiple bonuses and participate in a plurality of shared wheel bonuses at a desired time, potentially participating in two or more bonuses back-to-back. For this reason and because in general players may wish to continue base game play while participating in a bonus game, the present invention in one embodiment provides an option to the player to continue base game play even while shared display 110 is generating an outcome for the player during a bonus spin. For example, besides the actual random generation of shared display 110, the bonus sequence may include any one or more of the following: (i) an introduction to the bonus (e.g., from a character or characters associated with a theme of the individual gaming devices 10 and shared display 110, e.g., countdown has ended bonus wheel is about to spin); (ii) a recognition or celebration of an outcome or award received by one or more of the gaming devices 10; and (iii) a credit roll-up transferring credits to credit displays 20 of the winning gaming devices 10. For whatever reason, a player participating in the bonus may wish not to actively view a part or all of the overall bonus sequence.

To that end, gaming device 10 may provide on monitor or display device 16 operating with touch screen 42 one or more input devices 30 that appears when the gaming device triggers the bonus, as indicated by block 210. Alternatively, the toggle button(s) 30 is electromechanical and provided on the console of gaming device 10. The one or more input devices 30 enable the player to toggle through a number of screens on display 16 including for example: (i) a straight bonus screen showing a real time representation of shared display 110 and an outcome of its generation; (ii) a straight base game screen showing and enabling base game play (if the player desires to play the base game and monitor progress of the bonus generation via overhead display 66 or the actual shared display 110); or (iii) a hybrid or picture-in-picture screen showing a real time representation of shared display 110 and enabling base game play. In one embodiment, the default or starting screen is the straight bonus screen and the player toggles to the hybrid or straight base game screen from the bonus screen as desired.

The hybrid screen could devote more space to the base game and show a smaller version of the bonus, devote roughly half of monitor or display device 16 to both the base or bonus game or apportion any suitable space to the base and bonus games. The toggle display input 30 provides the player with much flexibility. For example, the player can continue gaming until the end of the bonus and toggle to the bonus screen. It should be appreciated such functionality provides the player with the opportunity of triggering a second, third, etc. bonus while participating in a first bonus. In any case, the functionality allows the player who does not want to wait through bonus play to potentially benefit monetarily from such play and at the same time continue base game play.

Bonus Server/Bonus Server States

Referring now to FIG. 3C, a bonus server 170 operating with associated gaming devices 10 according to one of the queuing methods described above is illustrated schematically. For ease of description, the bonus server operation is generally described in connection with the countdown queuing method discussed in connection with FIGS. 21 and 22. However, the bonus server teachings are applicable to each of the queuing methods discussed herein.

Bonus server 170, like central Controller 56 of FIG. 3B, is linked via a communications link 58 to each of the gaming devices 10 (referring collectively to gaming devices 10*a* to 10*i*, etc.) in a spoke and hub type fashion as shown in FIG. 3C. Here, it is not necessary that gaming devices 10*a* to 10*c*, communicate with one another via the serial link 96 shown in FIG. 3B. It is possible, however, to provide serial link or loop 96 so that, for example, two players playing the same system can transfer credits or other information to one another. Such transfer or communication is alternatively handled over spoke and hub links 58 by sending the credits or information to central controller 56, which then communicates the credits or information to the recipient gaming device accordingly.

Bonus server 170 shown in FIG. 3C also handles each of the functions of display controller 68 shown in FIG. 3B. That is, bonus server 170 controls the display motor controller 74 that drives shaft 182 of top 180 of shared display 110*f*. Bonus server 170 also updates the large video displays 66, the topper lights 76, the topper motor controller 78, if one is used, sound card 84 and speakers 86.

Bonus server 170 in FIG. 3C includes some of the components shown in FIG. 3A, namely, a processor 12 and a memory device 14. Memory device 14 of bonus server 170 stores a random outcome generator or random number generation program. Bonus server 170 is a separate gaming device with respect to the associated primary gaming devices 10. That is, bonus server 170 generates outcomes using a processor 12 and memory device 14 that are separate and independent from the processors and random outcome generators used to generate outcomes for the primary gaming devices 10. It is believed that such separation of outcome generation between the shared display and the gaming devices will meet approval under the standards and regulations of various gaming commissions. It should be appreciated that the separate random outcome generation for the shared display can alternatively occur in central controller 56 or random display controller 68 shown above in connection with FIG. 3B.

Bonus server 170 is linked to the processors 12 of the constituent gaming devices 10 via any of the different types of communication links discussed above in connection with FIG. 3B including, but not limited to, a high speed internet link, a fiber optic link, Ethernet or the like. In one embodiment, as illustrated in FIG. 3C, bonus server 170 communicates directly with each of the spacer assemblies 150 (FIG. 13) via communications link 98*a*. In an alternative embodiment, spacer assemblies 150 communicate instead with respective gaming devices via communications links 98*b*. In either embodiment, spacer assemblies 150 have their own processing capabilities. In a further alternative embodiment, spacer assemblies do not have data processing ability and instead simply receive electrical commands from bonus server 170 or controllers/processors within gaming devices 10 to illuminate lights, make sounds, etc., located on or in the assemblies 150.

Bonus server 170, in one embodiment, is built using a suitable protocol and corresponding to an open source library. Different protocols may be used alternatively. Bonus server 170 is in one embodiment an antiviral toolkit pro ("AVP") brain box based device having any one or more of the following responsibilities: (i) communicating with the display motor controller 74, e.g., via a universal serial bus ("USB"); (ii) communicating with the e.g., nine gaming devices 10 via the protocol; (iii) driving the overhead signage, e.g., large video displays 66; (iv) registering and un-registering client gaming devices 10; (v) presenting the bonus (lights, sounds, etc) at the large displays 66 and topper lights 76; (vi) determining randomly the bonus outcome; and (vii) receiving bonus triggering information from the client gaming devices 10 and records those client gaming devices as active participants in a current bonus.

As discussed herein, one of the problems solved by the present invention is the implementation of a large scale gaming system involving multiple gaming devices and a separate random outcome bonus generator and display. One solution as shown above is to structure the system in a modular format so that it can be shipped and moved to the casino floor in an efficient and relatively convenient manner. A related solution is to make the software system modular by providing a client/server software system that enables different numbers of client gaming machines to be connected to the server. Such flexibility enables gaming establishments to add machines to the system over time as desired, to meet demand or for whatever reason. Also, the client/server configuration allows for machines to be easily swapped out, e.g., for maintenance purposes, or for upgrades. To the above-described ends, in one implementation of the system 100 of the present invention, an attendant inputs or configures several pieces of information into or within bonus server 170 before the bonus server can register client gaming devices 10 and activate system 100.

One important piece of information is the paytable information of the client gaming devices 10. Verifying that a gaming machine 10 has an appropriate or proper paytable prevents client gaming devices 10 having the wrong pay tables from being connected to system 100 and allowed to participate in the bonus event. Gaming machines 10 having an improper paytable will not be verified and will not operate with system 100. System 100 can be configured however to enable the paytables of gaming devices 10 to upgraded and for bonus server 170 to be correspondingly upgraded to look for the new paytable. Such flexibility allows for the base game to be modified, e.g., new symbols/pays to be added, for certain symbols/pays to be removed, for individual bonus games to be added or changed, etc.

Also, the casino attendant enters the maximum and minimum number of client gaming machines that can, or must, be connected to system 100. To activate bonus server 170 for the nine game embodiments shown above, for example, the attendant could enter the maximum number of gaming devices as nine and the minimum as one. System 100 can then operate with any number of client gaming devices 10 from one to nine. Also, system 100 can be reconfigured with a new maximum to add gaming devices if necessary at a later time. For example, the gaming establishment can add remote gaming devices to the shared bonus display, which communicate with controller 170 via the communication protocol.

Each individual gaming device 10 needs to know which position (or remote location) the gaming device has with respect to shared display 110. An attendant enters the location information for each machine into the memory 14 of each machine. The client gaming machines 10 then include the location information in their request to bonus server 170 for registration onto bonus server 170. Bonus server also uses the location information during bonus play.

The registration request from each client gaming machine includes (i) paytable identification, (ii) location information (with respect to shared display 110), and (iii) an IS04217 code denoting the currency type used for the particular implementation of system 100. Once receiving the registration request, bonus server 170 (i) matches the paytable identification to a preconfigured bonus server paytable identification; (ii) ensures that the location information for the requesting client gaming machine 10 has not already been registered by a different client gaming machine; (iii) ensures that the location information for the requesting client gaming machine 10 is not valid; and (iv) ensures that the reported ISO4217 code is supported. If all registration request information is approved, bonus server 170 registers the requesting client gaming device. The bonus server 170 does not register non-compliant requests and the associated non-compliant gaming devices cannot be played.

Client gaming machines 10 register with bonus server 170 in one embodiment each time they establish or reestablish connection with the bonus server. During any registration period, the client gaming machines 10 do not allow game play. In one embodiment, bonus server 170 waits after a power loss or surge until each of the previously registered client gaming machines 10 re-registers before activating and allowing any game play. In one embodiment, if connection is lost during game play, the client gaming machine 10 completes the current game before disabling any further game play (machine can remain active to payout a credit balance, etc.). If gaming device 10 triggers the bonus during the final game, bonus server 170 enters a tilt state and informs the player that the connection with the bonus server is currently down.

Once a minimum required number of client gaming machines 10 has registered with bonus server 170, ((i) either the minimum number of client gaming machines 10 for initial registration or (ii) all previously registered gaming machines 10 after power or communications failure), bonus server 170 issues a "bonus server state change" message to the client gaming machines indicating that the bonus server is active and in an idle state. The bonus server 170 at this point allows the client gaming devices 10 to begin game play.

In one embodiment, (i) bonus server 170 can unregister one or more of the client gaming machines 10 and (ii) client gaming machines 10 can unregister themselves from bonus server 170. There are several reasons why a client gaming machine 10 may need to unregister from bonus server 170. Examples include replacing the client gaming machine 10 and changing the bonus parameters at server 170 to allow fewer clients. In one embodiment, an attendant is allowed to manually unregister a client gaming machine 10 that has experienced a non-recoverable condition (e.g., a dead brainbox) from bonus server 170.

The bonus server 170 and corresponding bonus game play operate according to preset states in one embodiment. The bonus server states provide an efficient method for (i) synchronizing multi-client bonus plays and (ii) recovering from lost connections and/or power. In one embodiment, while bonus server 170 is active, the bonus server resides in one of the following states based on conditions existing in the associated gaming devices 10: (i) bonus server 170 idle, (ii) bonus server 170 counting down (according to queuing method discussed above in connection with FIGS. 21 and 22), (iii) bonus server 170 in bonus, (iv) bonus server 170 paying bonus, and (v) bonus server 170 in tilt.

Only bonus server 170 initiates state transitions in one embodiment. Further, any messages sent by either bonus server 170 or the client gaming machines 10 are acknowledged by the recipient. Such handshaking enables the bonus server 170 to change states only after the bonus server receives confirmation from all client gaming machines 10 that the client gaming machines have received the bonus server's "state change" message.

In one embodiment, when a client gaming machine 10 triggers the bonus, the client gaming machine 10 issues a "bonus event notification" to bonus server 170. The bonus server's response to the "bonus event notification" includes the bonus server's current state so the client gaming machine 10 can determine what information to display to the player. That is, the client gaming machines 10 also reside in one of a multiple of client gaming machine states based on results in the primary game played on the client gaming machine 10 and the current state of the bonus server 170. For example, if client gaming machine 10 triggers the bonus, the gaming machine changes (i) to a first state if no other gaming machine has initiated or is playing the bonus, (ii) to a second state if another gaming machine has initiated but is not yet participating in the bonus and (iii) to a third state if another gaming machine is currently participating in the bonus. Examples of states of individual gaming devices 10 are discussed below in connection with FIGS. 23 to 34.

In one embodiment, bonus server 170 is idle when the server is not currently presenting a bonus and is not in a tilt state. If a client gaming machine 10 sends a "bonus event notification" message when bonus server 170 is in the idle state, that is, no other bonus activity is taking place, the client gaming machine is able to prompt its player to initiate the bonus. For example, the client gaming machine prompts its player to initiate a bonus countdown as discussed in detail below. In one embodiment, as long as bonus server 170 is in the idle state, bonus server 170 will respond to each client "bonus event notification" message by enabling any of the client gaming machines to prompt the associated player to initiate the bonus. In this manner, and as discussed in detail below, in one embodiment it is possible for multiple clients gaming machines 10 to simultaneously prompt associated players to initiate the bonus countdown or bonus play.

When a player initiates a bonus, the client gaming machine 10 sends an "enroll in bonus" request to bonus server 170. The bonus server's response includes (i) the current state of bonus server 170, (ii) whether or not bonus server 170 accepts or rejects the client gaming machine's request to enroll in the bonus, and (iii) in the event of a rejection, the reason the request has been denied. Once enrolled in the bonus, the respective client gaming machine 10 changes its state and player prompting accordingly, so that the player is notified and provided an opportunity to join the current bonus.

When a countdown is provided, server 170 sends a "bonus server count" message to the client gaming machines 10 that have enrolled in the bonus. The "bonus server count" message is sent and updated for each second that is counted down. The enrolled client gaming machines 10 use the "bonus server count" information to adjust the player prompts on individual monitors 16 or display devices.

If during the bonus server "counting down" state another client gaming machine 10 sends the "bonus event notification" message, bonus server 170 (i) responds to the new client gaming machine 10 that the server is in the "counting down" state and (ii) thereafter includes the new client gaming machine 10 in all subsequent "bonus server count" messages. As with the other client gaming machines 10 in the countdown, the new client gaming machine 10 prompts its player with a choice to join the current bonus. When any eligible player decides to join the current bonus, the corresponding client gaming machine 10 sends an "enroll in bonus" message to the bonus server 170.

Once the countdown reaches zero, bonus server 170 sends the "state change" message to the enrolled client gaming machines 10 indicating that the bonus server 170 is transitioning to the "bonus server in bonus" state. Bonus server 170 then performs the actual bonus presentation and associated random outcome determination.

Client gaming machines 10 that could have but did not enroll in the current bonus change the player prompt to inform the player that a bonus is currently in progress and to wait until the conclusion of the current bonus or shared display generation. If, during the "bonus server in bonus" state, another client gaming machine sends a "bonus event notification" message to bonus sever 170, the server responds to the requesting client gaming machine 10 that the server is in the "bonus server in bonus" state. The requesting client gaming machine 10 thereafter informs the player that a bonus play is currently in progress and to wait until the conclusion of the current bonus play.

When bonus server 170 has completed bonus play, the bonus server sends a "state change" message to the enrolled client gaming machines indicating that the bonus server is transitioning to the "paying bonus" state. Bonus server 170 then sends each enrolled client gaming machine 10 a "bonus outcome" message, which includes (i) a bonus outcome identification, (ii) an amount to pay or a prize string, and (iii) an ISO 4217 defined currency code. Prize strings are sent for non-monetary prizes, e.g., a Caribbean Vacation.

The "bonus outcome" message, in one embodiment, also includes a bonus outcome identification field. The outcome identification field is stored in non-volatile memory in the memory devices 14 of both the bonus server 170 and client gaming machines 10 as game history. In one embodiment, the bonus outcome identification field is session specific, not gaming device specific, and is therefore the same for each of the enrolled client gaming machines 10 that have participated in a specific bonus play. Once all relevant client gaming machines 10 acknowledge receipt of the "bonus outcome" message and the bonus outcome identification field, bonus server 170 sends the "state change" message to client gaming machines 10 indicating that the bonus server 170 is transitioning to the "bonus server idle" state.

Any condition that prevents bonus server 170 from presenting a bonus results in the bonus server entering the "bonus server tilt" state. Bonus server 170 sends the "state change" message to client gaming machines 10 indicating (i) that the bonus server 170 is transitioning to the "bonus server tilt" state and (ii) information regarding the nature of the tilt.

Bonus server 170 and client gaming machines 10 store bonus state information in non-volatile memory. The bonus server additionally stores a list (and dates/times) of previously registered client gaming machines 10 in non-volatile memory. When recovering from a power loss, client gaming machines 10 reregister with server 170. In one embodiment, only when all client gaming machines 10 which were previously registered with server 170 have re-registered with the server will bonus server 170 reactivate bonus and continue an interrupted bonus session or allow a new bonus session to occur. In one embodiment, if power loss occurs during a presentation, that presentation is continued when power is restored. In one embodiment, system 100 does not prompt the player to restart or rejoin the bonus.

In one embodiment, if any client/server connection is lost without the client gaming machine 10 first unregistering with the bonus server 170, the bonus server issue the "state change" message to all client gaming machines 10 indicating that the gaming server 170 is in a "bonus server tilt" state. In an embodiment, any client that receives the "bonus server tilt" state message during game play is allowed to complete a play before halting further play and sending a tilt message to the player. If the client triggers a bonus event during the final allowed game, the client gaming machine 10 enters a tilt state and informs the player that the connection with the bonus server is currently down. In one embodiment, if a client gaming machine 10 in a tilt state cannot reconnect with bonus server 170 automatically, an attendant can manually unregister the client gaming machine 10 from the bonus server to enable bonus play on other client gaming machines 10.

Bonus server 170 conveys detected wheel errors to the client gaming machines 10 when the errors occur. In one embodiment, the client gaming machines 10 enter a tilt condition until the wheel error is corrected. In another embodiment, bonus server 170 directs the client gaming machines 10 to operate according to a non-bonus paytable, which bypasses the shared display bonus and enables the players to continue playing the client gaming machines 10 until the wheel error is fixed (and/or enables or continues to enable one or more non-shared display bonus). In one embodiment, the "state change" message can report the following errors: (i) wheel tilts (as currently defined in AVP); (ii) wheel moved while stationary; (iii) wheel stalled while moving; (iv) wheel could not find stop; (v) optic sequence error; (vi) wheel disconnected; (vii) wheel communications timed out; and (viii) wheel waiting for recovery.

Individual Gaming Device States

As discussed above, bonus server 170 employs or resides in one of a plurality of states, which helps to organize the outcomes or present conditions resulting from play of a plurality of different associated gaming devices. The outcomes or conditions may occur at different times, but such outcomes may lead to a sharing of a common bonus event. The bonus server states are saved in non-volatile memory, so that the bonus server knows precisely the relationship that the bonus sever 170 had with each of the constituent gaming devices 10 immediately proceeding a power down or loss of communication condition. Just as it is desirable for bonus server 170 to have such organization and ability, it is also desirable for each of the processors 12 of each of the constituent gaming devices 10 to have such organization and to also know its relationship or state with respect to bonus server 170 upon regaining power or communication with the bonus server.

The previous section described various bonus server states. This section will highlight at least some of the states in which the individual gaming devices 10 may reside during base game play and play with the shared bonus display of the present invention. The following section is not meant to provide an exhaustive list of the potential states of gaming devices 10, just as the previous section does not enumerate all of the possible states for bonus server 170. Instead, these sections highlight the interaction between the bonus server and the individual gaming devices and provide to those of skill in the art one example of how the myriad of combinations of game play conditions between the bonus server and individual gaming devices can be categorized and organized for (i) display, lighting and sound control and (ii) power down and lost communication recovery.

The illustrated states yield a complex but organized gaming system that is believed to be highly entertaining for players because the players share in a common random outcome (e.g., position of the wheel) but also participate in individual gaming. The bonus server and individual game states provide a consistency to the bonus experience, so that players will readily learn the organizational scheme and be able to easily coordinate play of the individual game and play of the shared display bonus. The shared display system 100 also provides the game implementors with opportunities not previously available to coordinate visual and audio displays that occur at both the independent and bonus game levels as well as at a third level, which is most aptly described as a transitional level between individual game play and bonus play. The bonus server and individual gaming device states enable the game implementors to take full advantage of the audio and visual output opportunities to provide a gaming experience that is fun and exciting for the player.

Referring now to FIGS. 23 to 34, chart 250 of FIG. 23 illustrates eleven individual gaming device states enumerated under a state category 252. The state listed under category 252 is reflective of the state of gaming device 10*a* illustrated in one of the corresponding FIGS. 24 to 34. That is, the state listed under category 252 is the state of one of the gaming devices 10 during a particular period of base and bonus game play.

Chart 250 also shows the condition of machine indicator 60. For example, when gaming device 10*a* is in the "base game" state shown under column 252, indicator 60 is off or not illuminated. Similarly, the condition of various features on overhead display 66 are shown for a given state of gaming device 10. For example, simulated or plasma pointers for gaming device 10*a* are provided in connection with (i) a simulated wheel on overhead large display 66 and (ii) a corresponding message. According to column 252, for example, the plasma pointers for are dimmed but outlined in a color corresponding to gaming device 10*a* when gaming device 10*a* is in the "base game" state. The message shown in connection with one of the pointers changes depending upon the state of the individual game. Chart 250 also shows the corresponding message or display provided on video monitor 16 at gaming device 10*a*. For example, in the "base game" state, gaming device 10*a* plays or displays the base game.

It should be appreciated that overhead display 66 presents a dynamic and real time mix of messages and visual displays that change based on the respective states of the constituent gaming devices. For example, large display 66 presents the message "good luck" next to the plasma pointer for gaming device 10*a* when it is in the "base game" state. The corresponding pointer is dimmed but has a colored outline. Large display 66 also shows a separate message generalizing the bonus state for all players.

The eleven states shown in FIG. 23 are now discussed, each in connection with a corresponding one of the FIGS. 24 to 34. FIGS. 24 to 34 show a schematic representation of the player interface portion of system 100, including a representation of a large overhead display 66 and the individual displays for gaming devices 10*a* to 10*i*. Also, indicators 60*a* to 60*i* are shown in association with each of the respective gaming devices 10*a* to 10*i*.

As shown, indicators 60*a*, 60*c* and 60*f* are grouped together by a first color, such as red. Those gaming devices appear on large displays 66 with pointers or indicators having the corresponding color. Likewise, gaming devices 10*b*, 10*e* and 10*h* are grouped together by a second color. That second color is used in connection with the pointers of gaming devices 10*b*, 10*e* and 10*h* on large displays 66. Still further, gaming devices 10*c*, 10*f* and 10*i* are grouped together under a third color. That third color is used to represent gaming devices 10*c*, 10*f* and 10*i* on large display 66.

Figure 24:
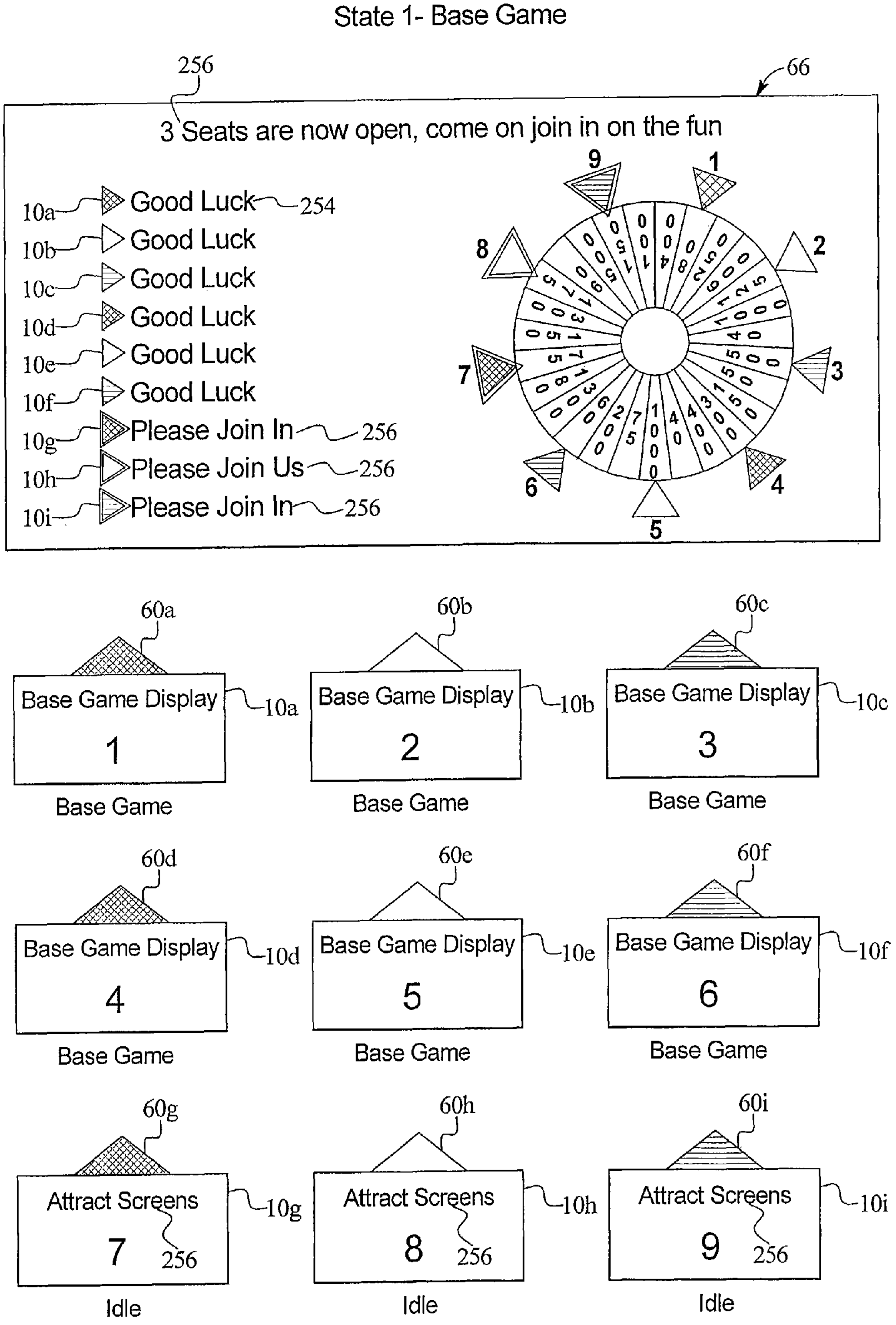
FIGS. 24, 25, 26, 27, 28, 29, 30, 31, 32, 33 and 34 illustrate in more detail the specific states summarized in FIG. 23.

It should be appreciated that the colors are also used with the appropriate display panel 162*a* or 162*b* shown in connection with FIG. 13 and spacer assembly 150. That is, the display panel 162*a* or 162*b* residing next to gaming device 10*a* shown in FIG. 24 is colored the same as the indicator 60*a* and the simulated pointers shown on overhead display 66. For reference, if the display panel 162*b* of spacer assembly 150 is located next to gaming device 10*b* shown in FIG. 24, it has the same color as indicator 60*b* and the simulated pointers for gaming device 10*b* shown in overhead display 66.

Referring now to FIGS. 23 and 24, when gaming device 10*a* is in a "base game" state, its colored indicator 60*a* is off. The simulated pointers on large display 66 for gaming device 10*a* are dimmed but show a corresponding color outline. A message 254 is provided next to one of the simulated pointers and wishes the player good luck. As seen in connection with gaming device 10*a* in FIG. 24, the player of Gaming Device One is currently playing the base game.

Display 66 also shows messages for gaming devices 10*b* to 10*i*. In particular, the "good luck" message 254 is provided in association with gaming devices 10*b* to 10*f*, which are each occupied and in the "base game" state. "Attract" messages 256 are provided in association with gaming devices 10*g* to 10*i*, which can be any suitable messages intended to attract passersby to the open gaming machines 10*g* to 10*i*. Individual gaming devices 10*g* to 10*i* also display on monitors 16 appropriate attract screens 256.

Figure 25:
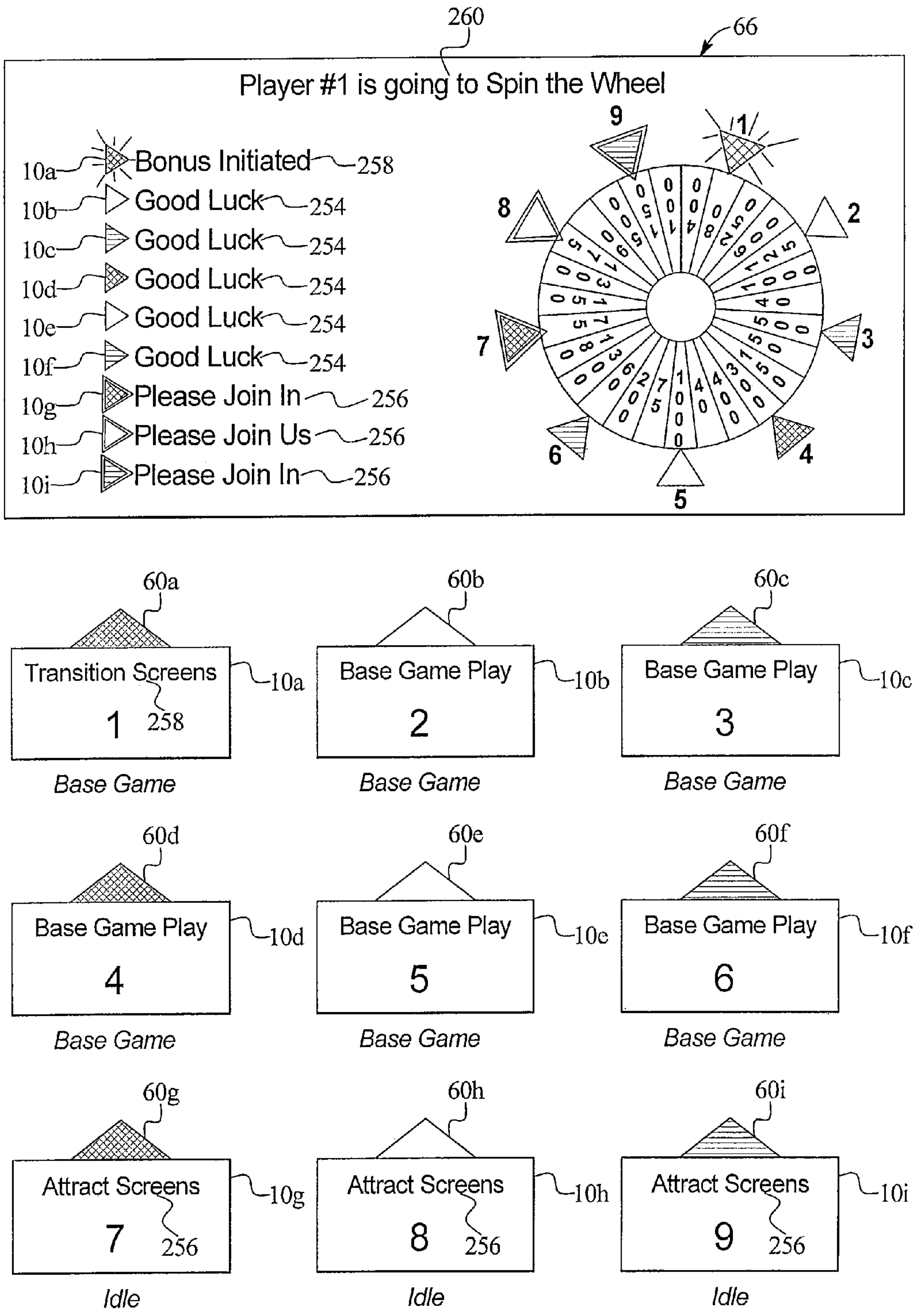

Referring now to FIGS. 23 and 25, a "bonus initiation" state for gaming device 10*a* is illustrated. In the "bonus initiation" state, indicator 60 is off and the simulated indicators on overhead display 66 are dimmed but flash slowly. A "bonus initiation" message 258 is provided in association with one of the simulated pointers. Transition screens 258 are displayed on video monitor 16 of gaming device 10*a*. Transition screens 258 include any suitable audio, visual or audiovisual display. In one preferred embodiment, the initiation or transition sequence is consistent with a theme of system 100. For instance, game show hosts may appear on the individual video monitor of gaming device 10*a* and explain that the bonus has been triggered. Such characters can remain to explain the particulars of the employed queuing method.

Overhead display 66 also displays a message 260 informing each gaming device 10*a* to 10*i* that the player of gaming device 10*a* is about to spin the wheel. The "good luck" message 254 is provided in association with occupied gaming devices 10*b* to 10*f*. "Attract" messages 256 are provided in association with unoccupied gaming devices 10*g* to 10*i*. Individual gaming devices 10*g* to 10*i* also display on monitors or display devices 16 appropriate attract screens 256.

Figure 26:
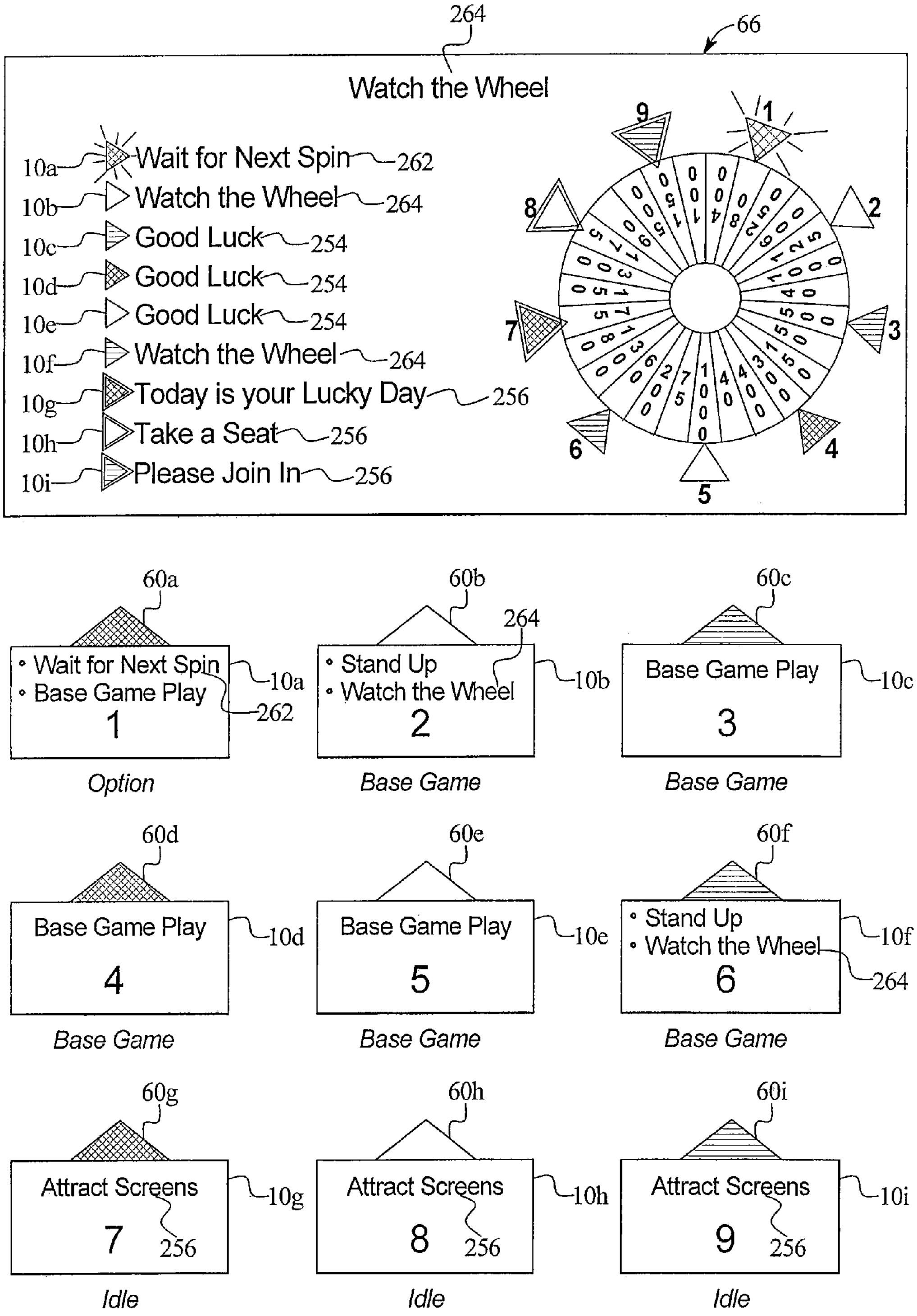

Referring now to FIGS. 23 and 26, a "bonus initiated while the wheel is currently spinning" state for gaming device 10*a* is illustrated. Here indicator 60*a* is off and the plasma pointers are dimmed. Overhead message 262 for gaming device 10*a* informs the player to wait for a next spin. Gaming device 10*a* shows an appropriate transition screen 262, which also informs the player to wait for a next spin. As seen in connection with gaming device 10*a* and FIG. 26, the player during this period is also able to play the base game, perhaps in split screen format with message 262.

As seen in overhead display 66 of FIG. 26, a "watch the wheel" message 264 is provided for gaming devices 10*b* and 10*f*, which are currently playing the bonus. Video monitors 16 for gaming devices 10*b* and 10*f* also direct players to watch shared display 110 via message 264. Video monitors 16 for gaming devices 10*b* and 10*f* can also display a simulated generation of shared display 110.

Gaming devices 10*c* to 10*e* are currently playing the base game and are provided the "good luck" message 254 on overhead display 66. Gaming devices 10*h* to 10*i* are unoccupied and suitable "attract" messages 256 are provided on overhead display 66. Attract screens 256 are displayed on video monitors or display devices 16 of gaming devices 10*h* and 10*i*.

Figure 27:
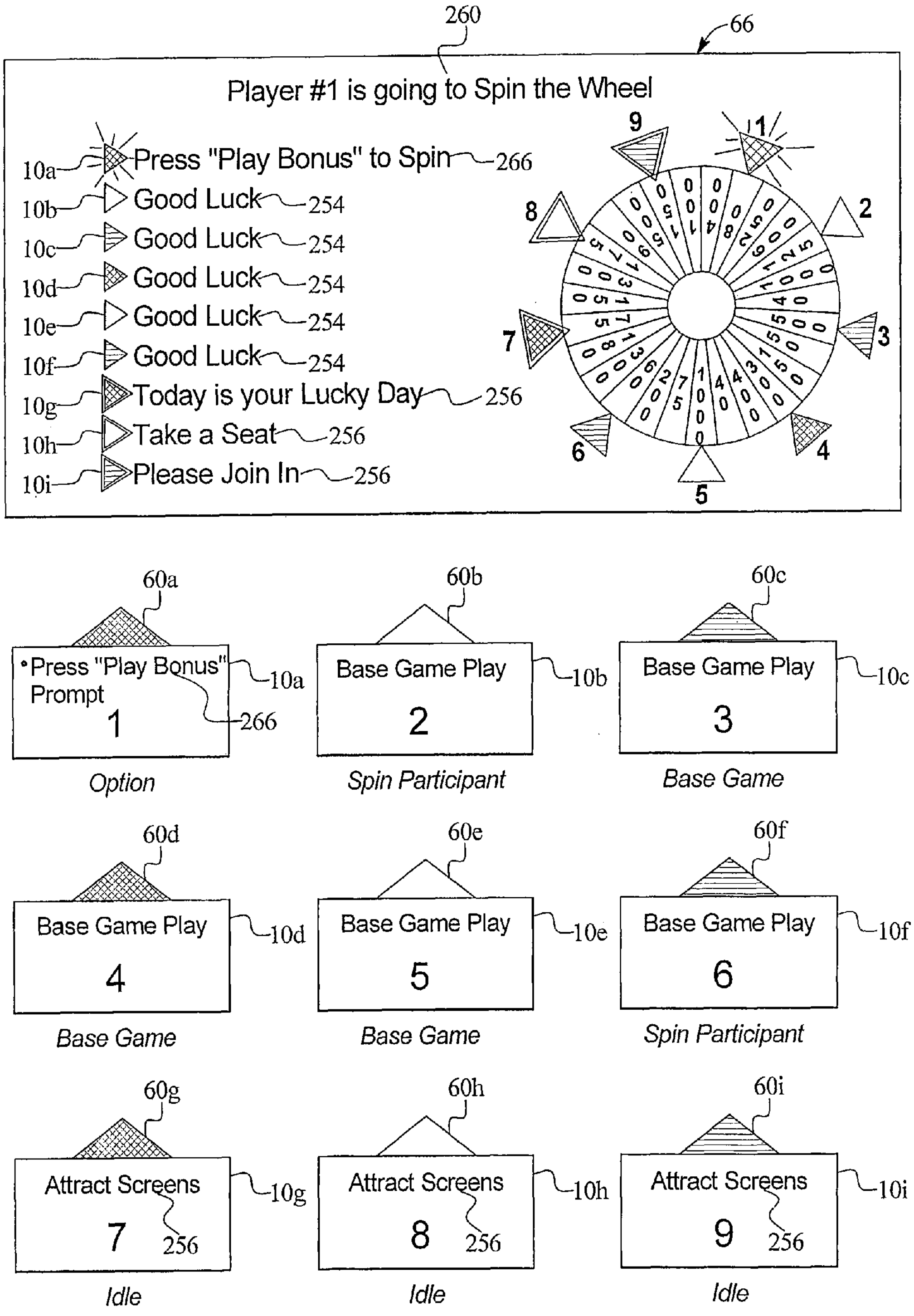

Referring now to FIGS. 23 and 27 a "bonus eligible" state for the case in which the queuing method does not provide a countdown is illustrated. Here, shared display 110 begins to generate outcomes (e.g., spin) when the player of gaming device 10*a* initiates the bonus. That is, the player of gaming device 10*a* has priority as illustrated in connection with FIGS. 19 and 20.

Indicator 60*a* is lit dimly and overhead pointers of gaming device 10*a* are lit dimly and flashing. Plasma message 266 informs the player of gaming device 10*a* to press a play bonus input device 30 to initiate the bonus. The individual monitor 16 of gaming device 10*a* also provides the press bonus input prompt 266. While gaming device 10*a* receives the above described messages, gaming devices 10*b* to 10*f* playing the base game are provided a "good luck" message 254. Overhead display 66 also provides the attract screens 256 to passersby for gaming devices 10*g* to 10*i*, as do the individual monitors or display devices 16 of gaming devices 10*g* to 10*i*.

Figure 28:
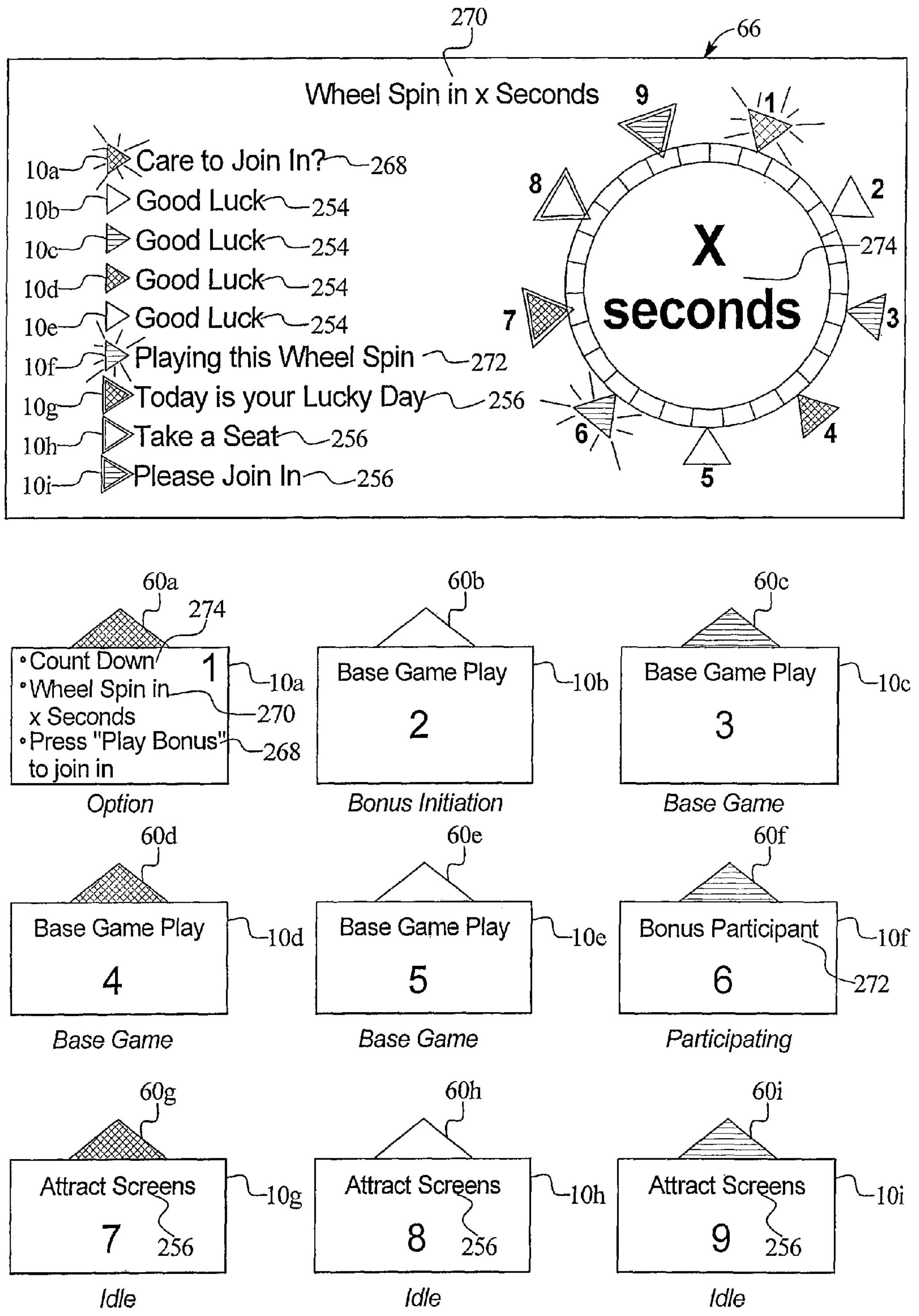

Referring now to FIGS. 23 and 28, a "bonus eligible" state with a countdown shown in connection with FIGS. 21 and 22 is illustrated. Here, the player of gaming device 10*a* does not have priority. Indicator 60*a* is lit dimly and overhead pointers of gaming device 10*a* are lit dimly and flashing.

As seen in FIG. 28, the player at gaming device 10*f* has priority and has initiated the bonus. Overhead display 66 accordingly provides a "care to join in" message 268 to the player of gaming device 10*a*. Large display 66 shows a "wheel spin in X seconds" message to 270. Overhead display 66 shows a large version of the countdown 274, which is visible to all players of system 100 and to passersby.

Message 270 is reiterated on video monitor 16 of gaming device 10*a*. Further, a "press play bonus to join" message 268 is provided on video monitor 16. Countdown 274 is also displayed at video monitor 16 of gaming device 10*a*. FIGS. 23 and 28 illustrate the potential complexity involved with the coordination of messaging for the shared display, wherein three separate messages are provided to gaming device 10*a* and multiple simultaneous messages are displayed on large display 66. The coordination becomes even more complex as more and more gaming devices become eligible to join the countdown. Bonus server 170 and processors 12 have to react quickly during the countdown to update a player who triggers the bonus.

Large video monitor 66 displays the "good luck" message 254 to gaming devices 10*b* to 10*e*, which are currently playing the base game. A "playing this wheel spin" message 272 is provided on large monitor 66 in connection with gaming device 10*f*, which has committed to playing the next bonus game. Video monitor 16 of gaming device 10*f* also shows the "bonus participant" message 272, which informs the player that the player is about to play the bonus. "Attract" messages 256 are provided locally and remotely for unoccupied machines 10*g* to 10*i*.

Figure 29:
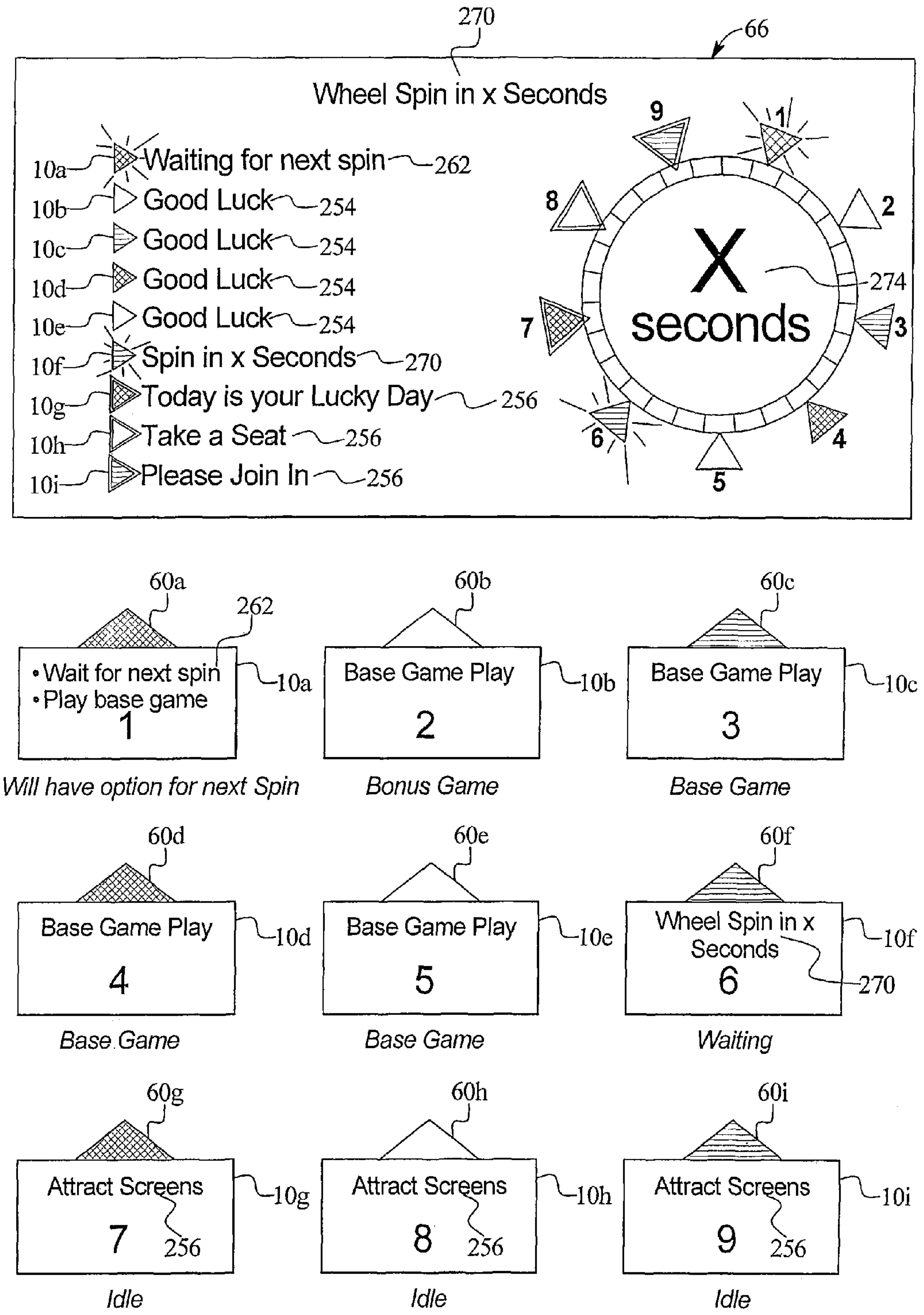

Referring now to FIGS. 23 and 29, a "decline bonus option" state for when a countdown is provided is illustrated for gaming device 10*a*. Here, the player has selected not to play the next bonus even though countdown 274 is proceeding. Indicator 60*a* is lit dimly and overhead pointers of gaming device 10*a* are lit dimly and flashing.

The "wait for next spin" message 262 is provided for gaming device 10*a* locally and on large video monitor 66. An overall message 270 is provided on large display 66 for the current group of players informing them that the wheel will spin in X seconds. The countdown 274 is displayed also with the simulated wheel on large video monitor 66. "Good luck" messages 254 are provided for players playing the base game.

Gaming device 10*f* is provided the "wheel spin in X seconds message" 270 both locally and at video monitor 66. Unoccupied gaming devices are provided with "attract" screens and large overhead display 66 provides "attract" messages 256 to encourage passersby to play those machines.

Figure 30:
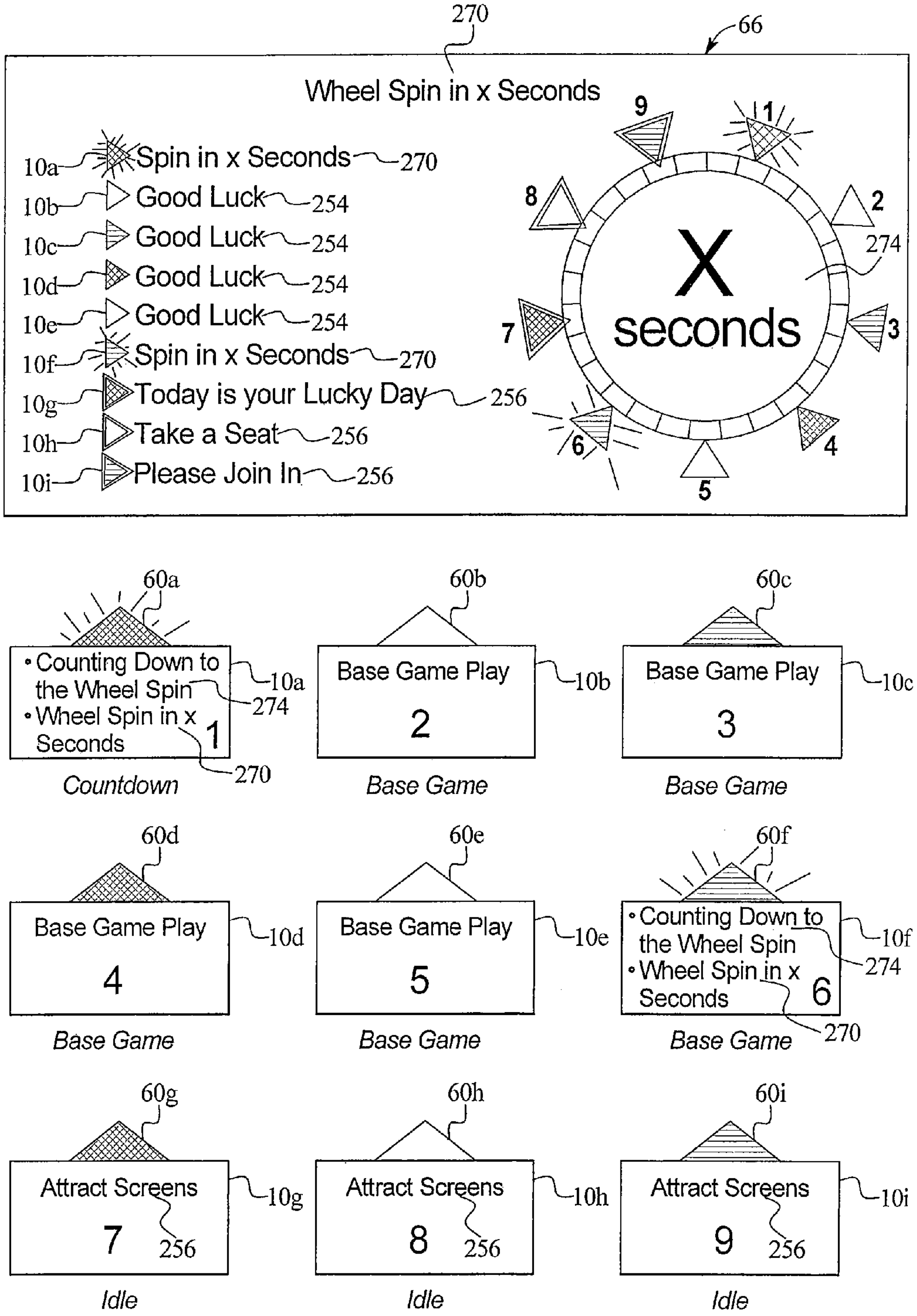

Referring now to FIGS. 23 and 30, the "bonus participant" state for gaming device 10*a* is illustrated. Here, indicator 60*a* is lit more brightly as are simulated pointers. The video indicators also flash slowly. Gaming device 10*a* is provided with a "wheel spin in X seconds" message 270 both locally and at video monitor 66. Further a global message 270 is provided informing the group of players that the wheel will spin in X seconds. Countdown 274 is displayed at large video monitor 66 and at video monitor 16 of gaming device 10*a*.

Large video monitor 66 provides the "good luck" message 254 to machines 10*b* through 10*e*. The player at gaming device 10*f* is also provided the "spin in X seconds" message 270 and is shown the countdown 274 on local monitor 16. Gaming devices 10*g* to 10*i* remain unoccupied and provide suitable "attract" screens 256. Large display 66 provides "attract" messages for those gaming devices.

Figure 31:
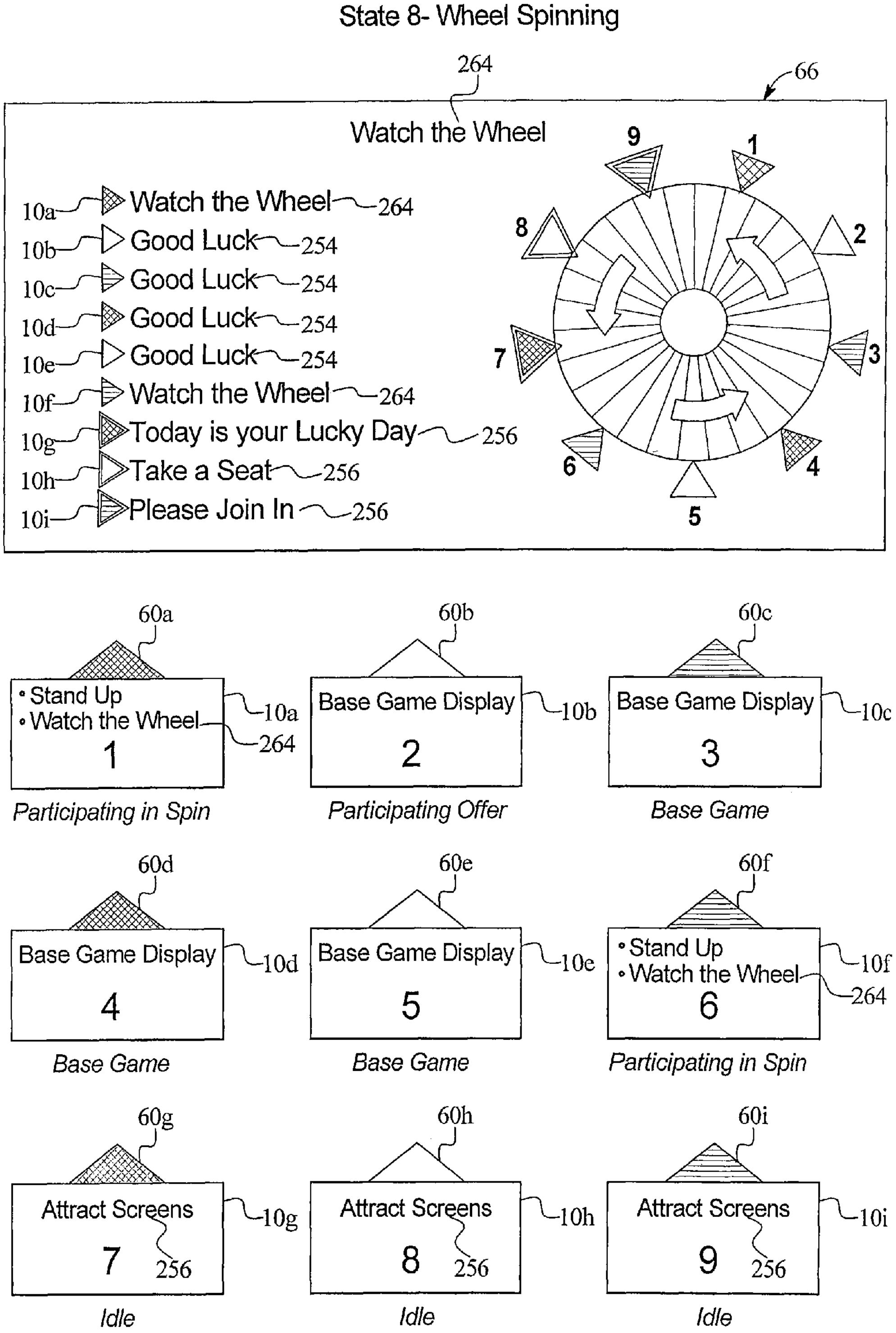

Referring now to FIGS. 23 and 31 a "wheel spinning" state for gaming devices 10*a* is provided. Here, both gaming devices 10*a* and 10*f* are currently participating in the bonus period. Those gaming machines are both provided a "watch the wheel" message 264 locally at video monitor 16 and remotely at large display 66. In one embodiment, a replication of the spinning of the wheel or shared display 110 is provided on monitors 16 of gaming devices 10*a* and 10*f*. Indicators 60*a* and 60*f* are lit fully as are the respective simulated pointers.

Large monitor 66 informs each of the players playing shared system 100 and passersby to watch the wheel via message 264, which is currently physically and virtually in action. Base game players are wished good luck at video monitor 66 and suitable "attract" screens are provided for gaming devices 10*g* to 10*i* both locally and remotely.

Figure 32:
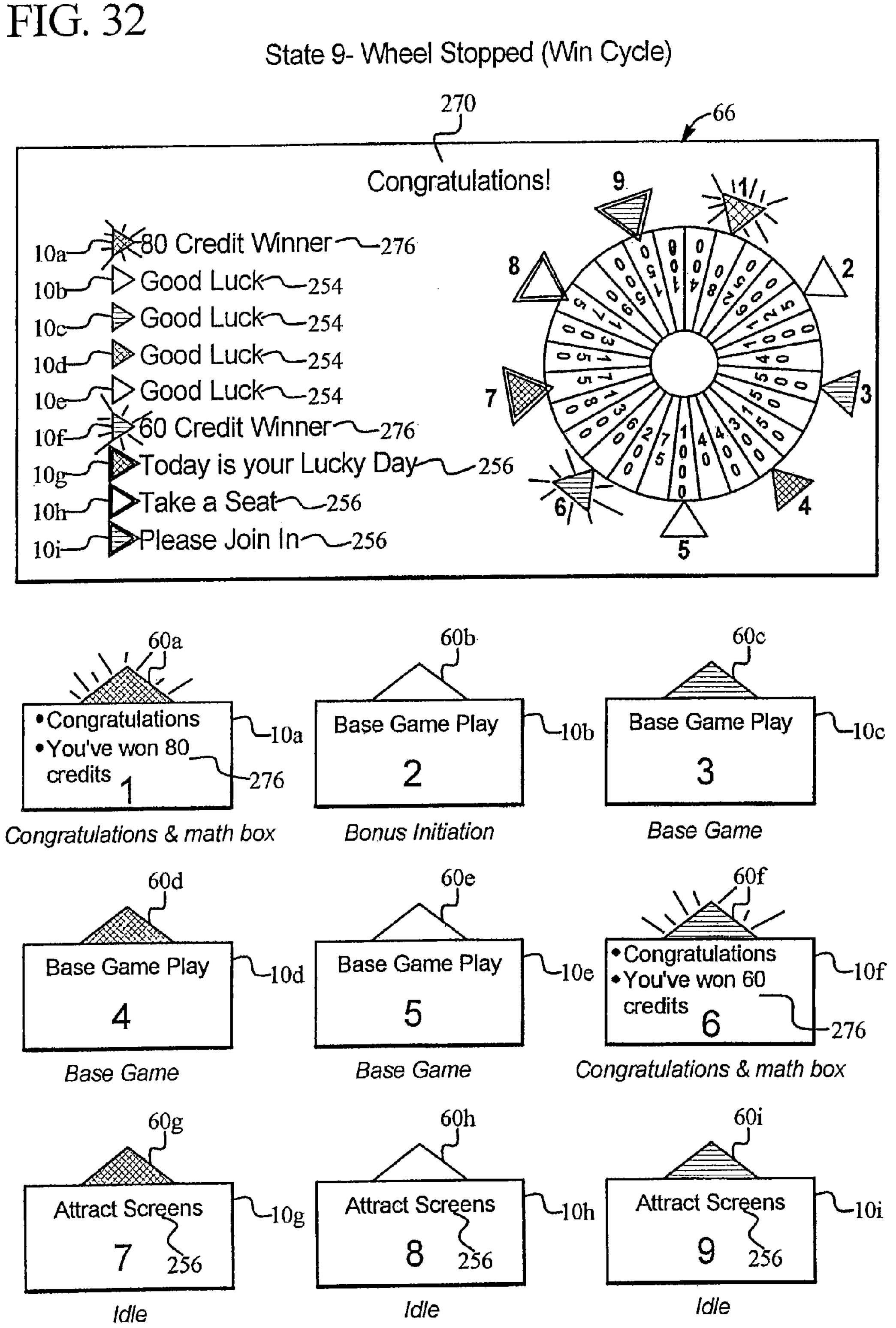

Referring now to FIGS. 23 and 32, a "wheel stops spinning" or "win" state for gaming device 10*a* is illustrated. Indicator 60*a* and the virtual indicators on large display 66 are in a full color flash. Messages 276 are provided locally and remotely, which congratulate both winning players at gaming devices 10*a* and 10*f*. The individual monitors 16 or those gaming devices also show the respective players the outcome or awards received from the bonus play. Players playing the base game are provided "good luck" messages 254 on overhead display 66. Local and remote "attract" messages 256 are provided for unoccupied gaming devices 10*g* to 10*i*.

Figure 33:
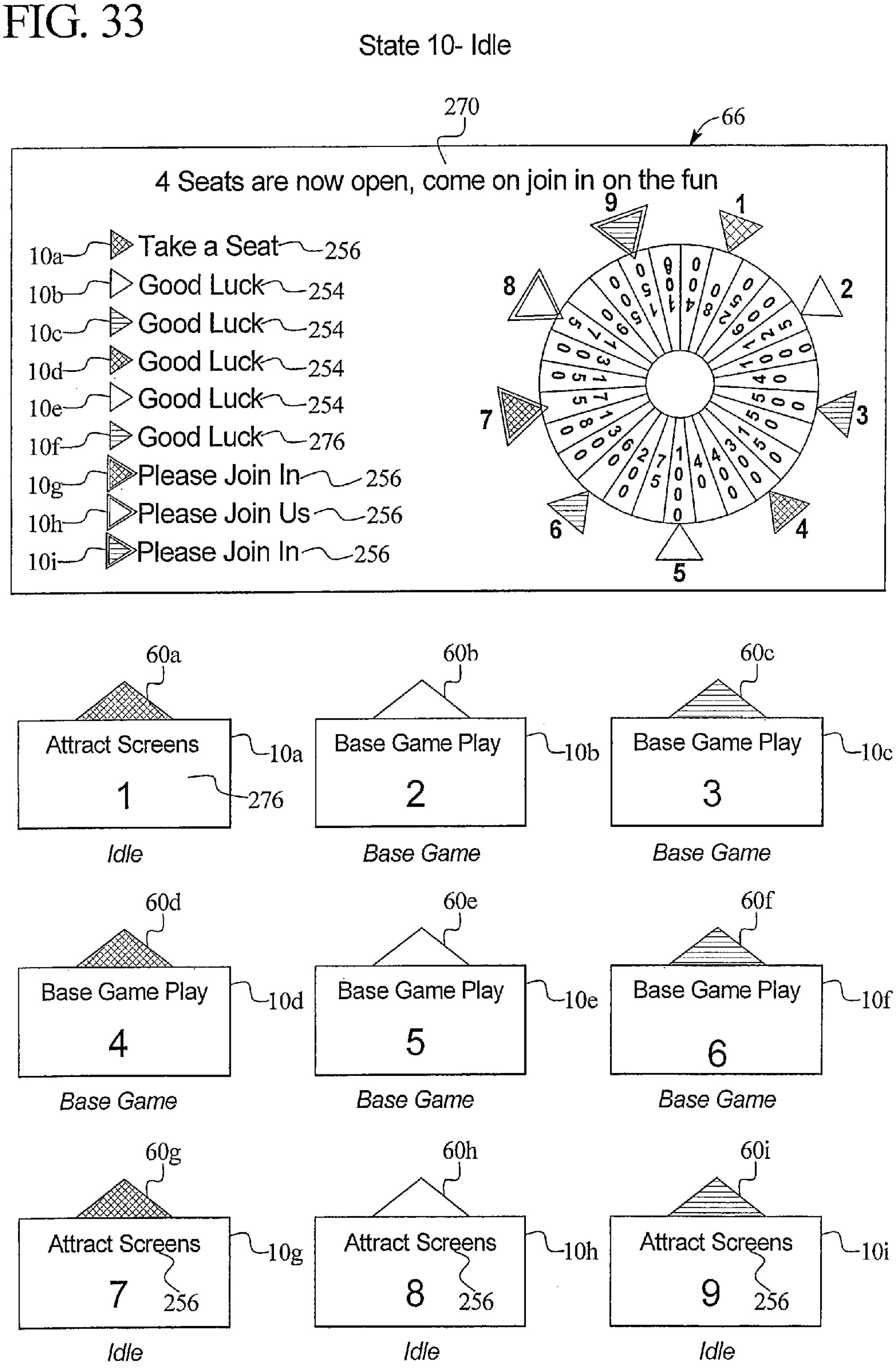

Referring now to FIGS. 23 and 33, an "idle" state for gaming device 10*a* is illustrated. Indicator 60*a* is off and the simulated pointers on large display 66 are dimly outlined. "Attract" messages 256 are provided locally and remotely for gaming device 10*a* and other unoccupied gaming devices 10*g* through 10*i*. "Attract" messages 256 can vary on overhead display or monitor 66 as illustrated. "Good luck" messages 264 are provided on overhead display or monitor 66 for each gaming device currently playing the base game.

Figure 34:
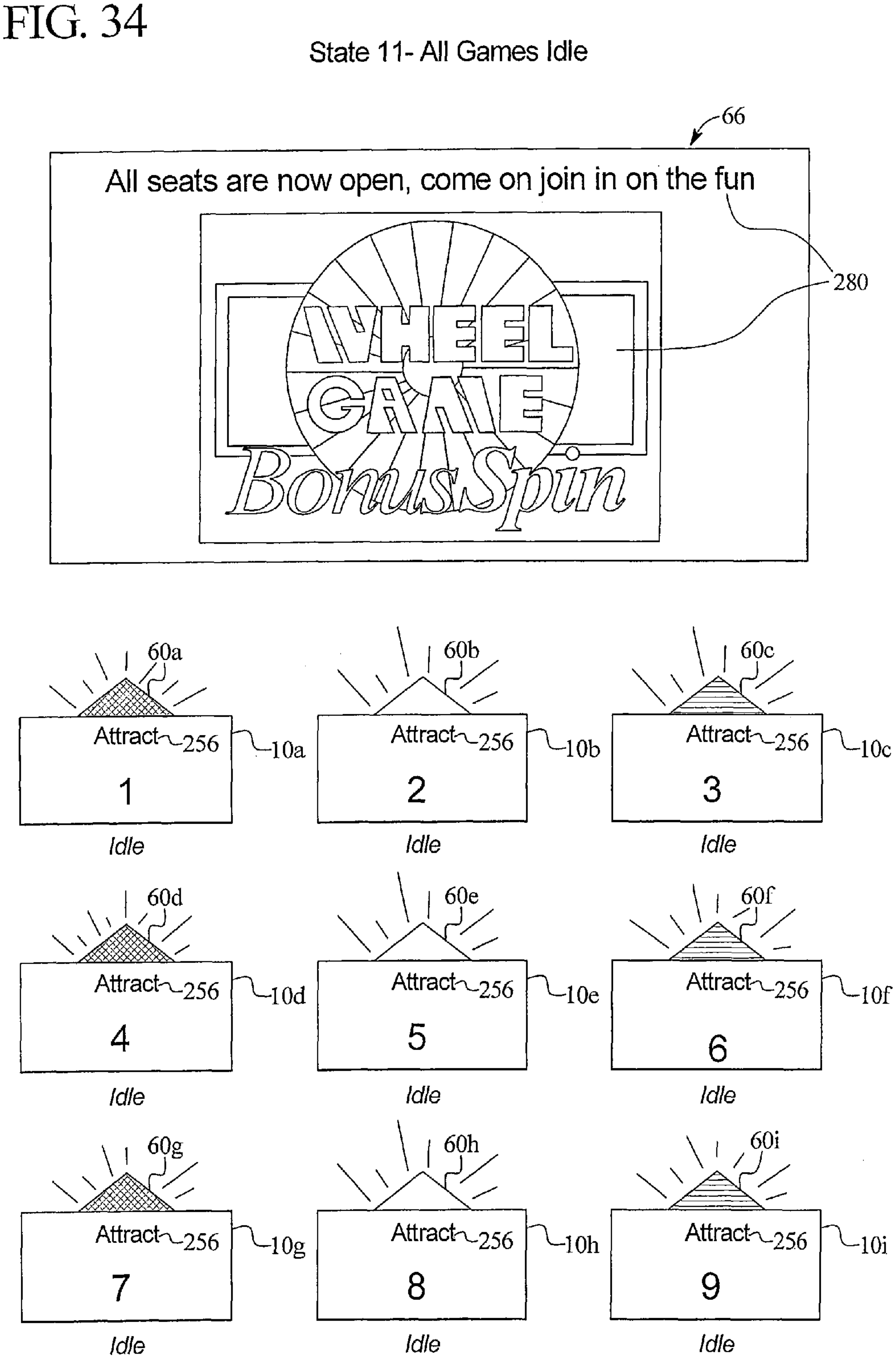

Referring now to FIGS. 23 and 34 an "all games idle" state for gaming device 10*a* as well as each of the other gaming devices 10*b* though 10*i* is illustrated. The indicators 60 for each of the gaming devices flash in sync with other flashing indicia located locally or remotely on large display 66. Large display 66 displays no simulated pointers at this juncture. Further, the shared display or wheel is not shown on overhead display 66. Instead, a "full attract" screen 280 is shown to passersby. Suitable "attract" messages or screens also appear on individual monitors 16 of gaming devices 10*a* to 10*i*.

Only Triggering Players Receive Associated Outcomes/Awards

In one embodiment, the shared multi-outcome symbol display 110 of system 100 awards outcomes only to gaming device(s) 10 that have triggered the bonus event and are participating in the bonus event under the employed queuing method (the "triggering machine(s)"). Under normal gaming operation, shared display 110 does not rotate or generate outcomes until the bonus is triggered. However, system 100, including any associated topper, can flash messages, provide audio, visual or audiovisual displays, etc., to attract players to the respective bank of machines.

Each of gaming devices 10 operates a base game, which can be any of the types of games described above. The occurrence of any suitable type of event or condition, e.g., (i) a particular symbol or combination of symbols being generated (e.g., along an active payline), (ii) a particular set of generated outcomes, (iii) a credit amount being obtained through player winnings, (iv) a number of failed and/or successful plays, (v) a wager or wager component (e.g., maximum paylines or maximum bet) requirement, (vi) a side wager requirement, (vii) an nth game played, (viii) a separate random determination (ix) another triggering event (x) or any combination thereof event can set shared display 110 in motion.

Shared display 110 spins in any direction for any number or partial number of turns and at any suitable speed and acceleration until finally coming to a stop. At that point, in one embodiment, each indicator 60 of each associated gaming device 10 is associated with or indicates one of the outcomes 62 on shared display 110. As discussed above, those outcomes 62 in one embodiment are spatially fixed with respect to one another. If only one of the gaming devices 10 has triggered the shared display 110, then only that triggering gaming device actually receives the indicated outcome as an award or part of an award. It is expressly contemplated to modify the outcome, for example via a multiplier, to produce an overall award for the player.

As enumerated above, any of the systems described above can have certain eligibility requirements to initiate the movement or generation of shared display 110. For example, a person may have to wager the maximum allowable wager, such as max lines and max bet per line, on a slot machine to be eligible to trigger the shared display 110. Alternatively, the system could limit triggering machines to only those being wagered on at a certain rate or number of games per minute. The system could require that the player first wager a total amount, such as $50, before being eligible to initiate shared display 110.

Only Triggering Players Receive A Shared Outcome/Award

In another embodiment, the shared multi-outcome symbol display 110 of system 100 awards outcomes only to gaming device(s) 10 that have triggered the bonus event and are participating in the bonus event under the employed queuing method (the "triggering machine(s)". In this embodiment, unlike the previous one, the triggering machines share a single outcome or award or a same outcome or award (e.g., if outcome or award has multiple components).

Again, under normal gaming operation, shared display 110 does not rotate or generate outcomes until the shared display bonus is triggered. However, the associated system, including any associated topper, can flash messages, provide audio, visual or audiovisual displays, etc., to attract players to the respective bank of machines.

Again, each of gaming devices 10 operates a base game, which can be any of the types of games described above. The occurrence of any suitable type of event or condition listed above can set the shared display in motion. The shared display or wheel spins in any direction for any number or partial number of turns and at any suitable speed and acceleration until finally coming to a stop. At that point in one embodiment, a single or shared indicator 60 (or indicators 60) associated with each gaming device 10 is associated with or indicates one of the outcomes 62 on the shared display.

The shared display, as before, can have outcomes 62 that are spatially fixed with respect to one another. The same outcome or outcomes in this embodiment are associated with each gaming device, and each gaming device that has triggered the gaming device either (i) receives the same generated outcome or (ii) receives at least approximately a same and evenly divided portion of the outcome. If only one of the gaming devices 10 has triggered the shared display, then only that triggering gaming device actually receives the indicated outcome as an award or part of an award.

One possibility for the present shared display embodiment is to provide the vertically disposed shared display or wheel 110*e* discussed above in connection with system 100*e* of FIGS. 8A and 8B. Instead of providing five separate indicators 60*a* to 60*e*, one for each gaming device 10*a* to 10*e*, a single indicator is provided for each of the gaming devices 10*a* to 10*e*. Here, when wheel 110*e* stops spinning, the indicator points to one of the values 62, which is either (i) provided to each of the gaming devices 10 that has triggered the bonus or (ii) split among the gaming devices that have triggered the bonus. In an alternative implementation multiple indicators 60 are provided where the outcomes indicated by each of the multiple indicators 60 are summed or averaged, after which the sum or average is either (i) provided to each of the gaming devices 10 that has triggered the bonus or (ii) split among the gaming devices 10 that have triggered the bonus.

Gaming Devices Linked by Triggering Event

The above sections illustrate embodiments in which only triggering players actually receive an award from shared display 110. The present invention also includes splitting any total award amongst each of the eligible gaming devices such as those currently being actively played at the time the event is triggered or such as those having a positive credit balance at the time the event is triggered. The gaming system may determine whether a gaming machine is active in any suitable manner.

The split of the award, in one embodiment, is made evenly amongst each of the eligible machines. In another embodiment, the split is based mathematically upon the outcomes from shared display 110 associated with the eligible machines. For example, the outcomes could each be percentages of a whole, wherein a predetermined or randomly determined total amount is divided for each eligible machine into the percentages indicated by the shared display outcomes.

If certain non-eligible gaming devices in the bank (e.g., those not being played or otherwise not eligible based on any suitable requirement, e.g., a wagering requirement) exist, the collective percentage of each of the non-eligible gaming devices can be distributed evenly in one embodiment to each of the eligible gaming devices 10. For example, if four of ten gaming devices are not being played and those four gaming devices had a total percentage of the pot of thirty percent, each of the six gaming devices being played would each receive an additional five percent of the total pot in addition to the percentages indicated by shared display 110 for each of the six eligible gaming devices. Alternatively, the excess is paid to the triggering player(s).

In one embodiment, the player triggering the event achieves some larger percentage of the total award, wherein the award is established by the outcome of the shared display 110 indicated by the triggering device. Each of the remaining gaming devices receives a portion of the total award less the triggering event machine award. For example, if six players are currently playing a linked bank of machines and one player triggers the bonus and ultimately an outcome of one hundred from shared display 110, system 100 awards the triggering player, e.g., half that amount or fifty credits, and then divides the remaining fifty credits over the remaining five machines and provides each non-triggering player ten credits. The above example is applicable whether machines are banked by electromechanical output device 110*a*, over a LAN, over a WAN or any combination thereof.

In another example, shared display 110 is operated when a particular number of a particular bonus symbol is collected in the base game. For example, when one hundred bonus symbols are collected from all active games, the bonus begins. When the shared display stops and yields an outcome, e.g., one hundred credits, the one hundred credits are distributed among each of the eligible gaming devices. The one hundred credits could be split: (i) evenly among the eligible gaming devices; (ii) corresponding to the percentage of bonus symbols contributed by each eligible gaming device (percentages from non-eligible gaming devices divided and provided to the eligible gaming devices as discussed above); (iii) more to the triggering gaming devices(s), less to eligible but non-triggering gaming device(s); (iv) based on each eligible player's wager (e.g., betting one coin yields one bonus symbol towards the one hundred needed bonus symbols for each bonus symbol generated, while betting five coins yields five bonus symbols towards the one hundred needed bonus symbols for each bonus symbol generated, and wherein one hundred credits are then split corresponding to the percentage of bonus symbols contributed by each eligible gaming device); and (v) more to gaming devices 10 having a player's card or preferred status player's card inserted therein.

Gaming Devices Contributing Wager Portions to A Pool

One way to enable each of the gaming devices of a bank of gaming devices 10 (banked via e.g., electromechanical output device 110*a*, over a LAN, over a WAN or any combination thereof) to share in the winnings from the achievement of a triggering event is to build a pool of funds. For example, each player could contribute ten percent of the player's wager to a fund or pool. That fund or pool grows until any one of the gaming devices of the bank achieves the triggering event. At that point, the fund is distributed to each of the gaming devices of the bank.

In one embodiment, the fund or pool is distributed to eligible machines, e.g., those currently being played, according to the percent contribution of the fund by the particular gaming device. It is possible that contribution percentage of any participating machine is made up of funds from multiple players over multiple plays of the gaming device. The player currently playing the gaming device reaps the benefit of such prior play.

In one example, assume that five out of a total of ten linked gaming machines are currently being played. Assume that the total fund is one hundred credits when one of the linked gaming devices triggers the triggering event. Assume that none of the non-played gaming machine has any contribution to the one hundred credits and that the five gaming devices have each contributed respectively, 30 percent, 20 percent, 20 percent, 15 percent and 15 percent, respectively. The players would win, respectively, 30 credits, 20 credits, 20 credits, 15 credits and 15 credits whether the players in fact each contributed those amounts or not. In that example, no generation takes place via shared display 110. Shared display 110 is not needed. The present invention therefore expressly contemplates a progressive game in which each of the participants shares in a bonus trigger, which is triggered by any one of the participant games. If the triggering event is relatively difficult, it should be appreciated that the pool can build to be much larger than the actual contribution made by any of the participant games. It would therefore be highly desirable to play such a gaming machine and to hope that as many players as possible are also playing such a gaming machine to increase the odds of obtaining the bonus triggering event.

The situation where a percent of the overall pool resides on a gaming device that is not being played when the bonus event is triggered can be handled in a multitude of ways. As described above, one way is to add up all the percentages or contributions of the ineligible games and the total amount evenly or unevenly to eligible games that are being played. Another possibility is to subtract the portion of the overall pool that resides on ineligible gaming devices and (i) leave the contributions on the ineligible gaming devices for the next trigger or (ii) use that portion to seed the next succeeding pot or pool. For example, if $500 of a $2,000 pot is currently residing on ineligible machines, system 100*a* of the present invention could either leave the $500 on the machines that currently hold that portion or distribute the $500 evenly, unevenly or randomly over each of the gaming machines linked in the bank after the current bonus payout is made.

Wager Funded Pool Operated with Shared Multi-Outcome Symbol Display

The shared multi-outcome symbol display 110 is operable with the wager funded pool the present invention. In one embodiment, upon the achievement of a bonus triggering event by gaming device 10, the pool is distributed to each of the currently played gaming devices via any of the methods described above. Additionally, shared display 110 is operated and displays an outcome for each of the participant gaming machines. In one embodiment, the outcome achieved by the triggering machine is used to modify or multiply each participating gaming device's wager pool distribution. For example, if the player triggering the bonus event achieves a 3× outcome, each person's wager pool distribution is multiplied by three. In another embodiment, each person's contribution is modified by the outcome generated for that persons' gaming device. For example, while the gaming device achieving the triggering event receives a random outcome of 3×, a different gaming device receives an outcome of 5×. That second gaming device obtains an overall award of that game's distribution multiplied by five, while the bonus triggering game obtains an overall award of the bonus triggering game's distribution multiplied by three. In any of the embodiments herein, a separate or additional award can be provided either from a pool or otherwise to the triggering gaming device.

Individually Built and Maintained Wager Pools

In a further alternative embodiment, each linked gaming device builds its own separate and distinct pool. In that way, when the triggering event is achieved by any of the participant games any gaming device not currently being played is not effected, nor is the pool of any eligible gaming device. The eligible gaming devices pay out either (i) a portion of the individual pool, (ii) the entire pool, (iii) the portion or entire pool modified by an outcome used for each of the participant games or (iv) an outcome generated for the particular game as described above. The outcome generation can be shared or individual. The triggering event is shared.

For example, in one embodiment each gaming device 10 builds its own pool and displays its own outcome generation upon a triggering event achieved by any of the participant gaming devices being played, such as any participant game being played in any of the Gaming Devices One to Four in FIG. 9. In such a case, play of each gaming device in the network is interrupted at a convenient point, such as after a slot machine play is finished. Using a stand-alone gaming device 10 that provides a second display, the second display device can commence and display the bonus sequence, while gaming is still taking place on the base game display 16. An announcement is made on one of the individual display devices and/or speakers 50 that the bonus has somewhere been triggered. For example, a talk show host can appear on the video monitor and explain that the player is currently playing in cooperation with other players within that casino or perhaps multiple casinos. The game show host can then direct the video towards a random outcome operator who spins a wheel for example. The video wheel spins and ultimately generates an outcome. Each player each receives an award that includes a partial or total distribution from the individual pool for that gaming device modified according to the outcome shown in the video display.

The outcome shown in the video display can be (i) the same for each of the participant gaming devices over the entire network, (ii) the same for a casino or conglomeration of satellite banks of devices, (iii) the same for each gaming device of a bank of devices, (iv) the same for a subset of banks of devices, or (v) different for each gaming device, e.g., show a separate random generation for each gaming device. The present invention expressly contemplates that the shared display of the present invention can be simulated, mechanical, electromechanical or any combination thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:

a plurality of gaming machines, each gaming machine including:

(i) a cabinet;

(ii) a primary display device supported by the cabinet, said primary display device configured to display a primary game operable upon a wager;

(iii) at least one input device supported by the cabinet, said at least one input device configured to enable the wager to be made on the primary game; and (iv) at least one processor configured to control the primary game; and a shared display device including a single component having a plurality of sections which are each associated with one of a plurality of different awards, each of the sections displaying one of the awards, each of the displayed awards being individually awardable to one of the players of the gaming machines, and each section having a predetermined relationship with respect to each other section such that each of the displayed awards has a predetermined relationship with respect to each of the other displayed awards, wherein after an occurrence of a triggering event at one of the gaming machines, (a) the gaming machine where the triggering event occurred enables a player of said gaming machine to initiate a play of the shared display device, (b) after an initiation of the play of the shared display device, for a time period, any other eligible gaming machine enables the player of said gaming machine to selectively participate in said play of the shared display device, and (c) said play of the shared display device including said single component of said shared display device moving to cause a display of an indication of at least one of the displayed awards in association with at least one of the gaming machines, and said shared display device indicating different ones of the displayed awards in association with different ones of the gaming machines.

2. The gaming system of claim 1, wherein the primary display device of each gaming machine is a video display device.

3. The gaming system of claim 1, wherein the shared display device is configured to simultaneously indicate a different one of the displayed awards in association with each of the different ones of the gaming machines.

4. The gaming system of claim 1, which includes a multiple section dome-shaped see-through cover that is configured to be positioned adjacent to the cabinets of the gaming machines.

5. The gaming system of claim 1, wherein the plurality of gaming machines are arranged in a shape selected from the group consisting of: a circle, a semi-circle, an oval, a rectangle, a triangle, a hexagon, an octagon, a pentagon, a diamond, a linear configuration, an indented oval, and a curved configuration.

6. The gaming system of claim 1, wherein the single component of the shared display device has a shape selected from the group consisting of: a cone, a semi-circle, a circle, an oval, a rectangle, a triangle, a hexagon, an octagon, a pentagon, a diamond, a linear configuration, an indented oval, and a curved configuration.

7. A gaming system comprising:

a plurality of gaming machines, each gaming machine including:

(i) a cabinet;

(ii) a primary display device supported by the cabinet, said primary display device configured to display a primary game which is operable upon a wager;

(iii) at least one input device supported by the cabinet, said at least one input device configured to enable the wager to be made on the primary game; and (iv) at least one processor configured to control the primary game;

a shared mechanical display device, said shared mechanical display device configured, after an occurrence of a triggering event at one of the gaming machines, to move a single component to simultaneously display awards each in association with different ones of the gaming machines, each of said displayed awards individually awardable to players of the gaming machines, said single component of the shared mechanical display device including a plurality of sections, each of said displayed awards displayed in a different one of the sections, each section having a predetermined relationship with respect to each other section such that each displayed award has a predetermined physical relationship with respect to each of the other displayed awards based at least in part on locations of the sections, wherein after the occurrence of the triggering event at one of the gaming machines and prior to the movement of said single component, the gaming machine where the triggering event occurred enables a player of said gaming machine to initiate said movement, and thereafter, for a time period, any other eligible gaming machine enables other players of said gaming machines to selectively participate in said movement; and a dome-shaped see-through cover positioned over the shared mechanical display device.

8. The gaming system of claim 7, which includes a secondary display device configured to be mounted above the dome-shaped see-through cover, said secondary display device configured to operate at least in part in conjunction with the shared mechanical display device.

9. The gaming system of claim 7, wherein the dome-shaped see-through cover is positioned adjacent to the cabinets of the gaming machines.

10. The gaming system of claim 7, wherein the plurality of gaming machines are arranged in a shape selected from the group consisting of: a circle, a semi-circle, an oval, a rectangle, a triangle, a hexagon, an octagon, a pentagon, a diamond, a linear configuration, an indented oval, and a curved configuration.

11. The gaming system of claim 7, wherein the single component of the shared mechanical display device has a shape selected from the group consisting of: a cone, a semicircle, a circle, an oval, a rectangle, a triangle, a hexagon, an octagon, a pentagon, a diamond, a linear configuration, an indented oval, and a curved configuration.

12. A gaming system comprising:

a plurality of gaming machines, each gaming machine including:

(i) a cabinet;

(ii) a primary display device supported by the cabinet, said primary display device configured to display a primary game which is operable upon a wager;

(iii) at least one input device supported by the cabinet, said at least one input device configured to enable the wager to be made on the primary game; and (iv) at least one processor configured to control the primary game; and a shared mechanical display device including a single component configured to display a plurality of awards, each of the displayed awards individually awardable to players of the gaming machines, said shared mechanical display device configured, after an occurrence of a triggering event at one of the gaming machines, to move the single component to simultaneously display the awards each in association with different ones of the gaming machines based at least in part on locations of indicators associated with each of the gaming machines relative to said single component of the shared mechanical display device, and prior to the movement of the single component, the gaming machine where the triggering event occurred enables a player of said gaming machine to initiate said movement, and thereafter, for a time period, any other eligible gaming machine enables other players of said gaming machines to selectively participate in said movement.

13. The gaming system of claim 12, which includes a secondary display device configured to be mounted above a dome-shaped see-through cover which covers the shared mechanical display device, said secondary display device configured to operate at least in part in conjunction with the shared mechanical display device.

14. The gaming system of claim 12, wherein the plurality of gaming machines are arranged in a shape selected from the group consisting of: a circle, a semi-circle, an oval, a rectangle, a triangle, a hexagon, an octagon, a pentagon, a diamond, a linear configuration, an indented oval, and a curved configuration.

15. The gaming system of claim 12, wherein the single component of the shared mechanical display device has a shape selected from the group consisting of: a cone, a semicircle, a circle, an oval, a rectangle, a triangle, a hexagon, an octagon, a pentagon, a diamond, a linear configuration, an indented oval, and a curved configuration.

* * * * *

UNITED STATES PATENT AND TRADEMARK OFFICE

CERTIFICATE OF CORRECTION

PATENT NO. : 8,057,308 B2
APPLICATION NO. : 11/830085
DATED : November 15, 2011
INVENTOR(S) : Joseph E. Kaminkow et al.

It is certified that error appears in the above-identified patent and that said Letters Patent is hereby corrected as shown below:

IN THE CLAIMS:

In Claim 1, column 73, line 10, delete “one of the”.

In Claim 1, column 73, line 23, replace “the” with --a--.

In Claim 1, column 73, line 26, replace “including” with --includes--.

In Claim 1, column 73, lines 30-31, replace “indicating” with --indicates--.

In Claim 3, column 73, line 37, replace “a” with --the--.

In Claim 3, column 73, line 38, replace “one” with --ones--.

Signed and Sealed this
Thirty-first Day of January, 2012

David J. Kappos
*Director of the United States Patent and Trademark Office*